(12) United States Patent
Thomas

(10) Patent No.: US 11,945,486 B2
(45) Date of Patent: Apr. 2, 2024

(54) SELF-ELEVATING PLATFORM

(71) Applicant: Michael Wayne Thomas, Redmond, WA (US)

(72) Inventor: Michael Wayne Thomas, Redmond, WA (US)

(73) Assignee: Home to Auto, Inc., Redmond, WA (US)

( * ) Notice: Subject to any disclaimer, the term of this patent is extended or adjusted under 35 U.S.C. 154(b) by 688 days.

(21) Appl. No.: 17/150,468

(22) Filed: Jan. 15, 2021

(65) Prior Publication Data
US 2022/0227404 A1 Jul. 21, 2022

(51) Int. Cl.
B62B 5/02 (2006.01)
B62B 3/02 (2006.01)

(52) U.S. Cl.
CPC . B62B 3/02 (2013.01); B62B 5/02 (2013.01)

(58) Field of Classification Search
CPC .... B62B 3/02; B62B 5/02; B62B 5/00; B62B 3/00; B62B 3/06; B62B 5/0069; B62D 57/024; B62D 57/032; B62D 61/12
USPC .......................................................... 280/35
See application file for complete search history.

(56) References Cited

U.S. PATENT DOCUMENTS

| | | | | |
|---|---|---|---|---|
| 7,246,671 | B2 * | 7/2007 | Goren | B62D 61/12 180/209 |
| 8,418,787 | B2 * | 4/2013 | Bouhraoua | B62B 5/02 180/8.2 |
| 9,132,848 | B2 * | 9/2015 | Sekine | B62B 5/0069 |
| 9,149,399 | B2 * | 10/2015 | Segawa | A61G 5/107 |
| 11,198,218 | B1 * | 12/2021 | Gorkavyi | B25J 19/02 |
| 11,554,943 | B2 * | 1/2023 | Schwalbach | B62B 3/02 |
| 2006/0151218 | A1 * | 7/2006 | Goren | A61G 5/068 180/24.07 |
| 2012/0175172 | A1 * | 7/2012 | Bouhraoua | B62B 5/0033 280/5.28 |
| 2013/0180787 | A1 * | 7/2013 | Bouhraoua | B62D 61/12 180/24.06 |
| 2014/0265254 | A1 * | 9/2014 | Sekine | B60L 1/003 280/638 |
| 2015/0061240 | A1 * | 3/2015 | Segawa | A61G 5/061 280/5.28 |
| 2022/0097785 | A1 * | 3/2022 | Kim | B25J 13/085 |
| 2022/0161837 | A1 * | 5/2022 | Ota | B62D 57/024 |

* cited by examiner

*Primary Examiner* — James A Shriver, II
*Assistant Examiner* — Hilary L Johns
(74) *Attorney, Agent, or Firm* — Vernon Francissen

(57) ABSTRACT

Technologies are shown for self-elevating platform carts that can transport a load from an initial surface to a destination surface that can be at a higher level, lower level or same level across a horizontal distance and/or barrier. One example extends a front height support to contact the destination surface and extends a rear height support control to contact the initial surface. A main lift is retracted and the system moved forward until main wheels on the main lift contact the destination surface. The main lift is extended and the extensible support beams and height supports are retracted. Another example traverses intermediate surfaces using a vertical stabilizer to stabilize the main lift on surfaces at different levels. The main lift can be the only power lift for the cart.

27 Claims, 60 Drawing Sheets

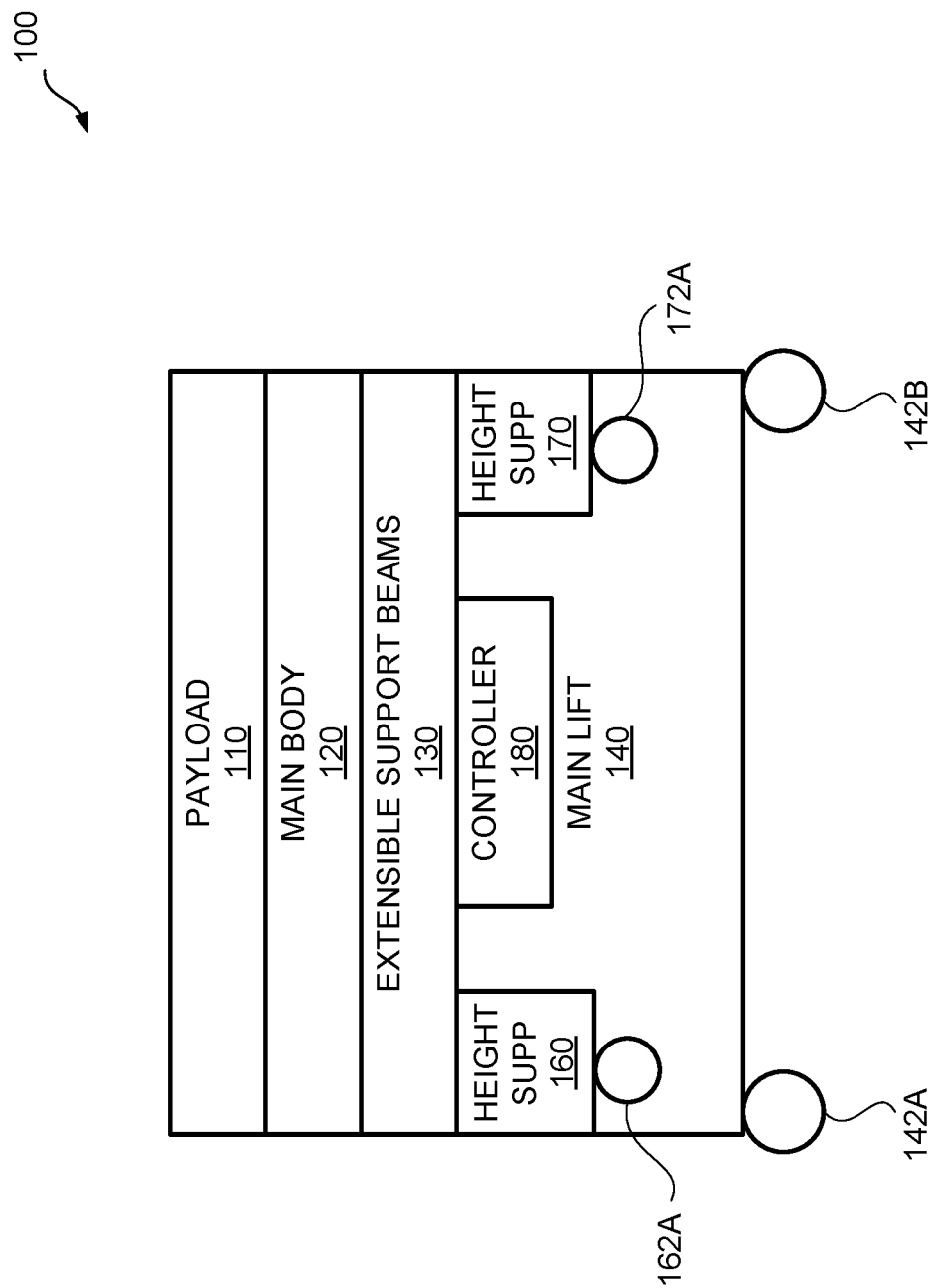

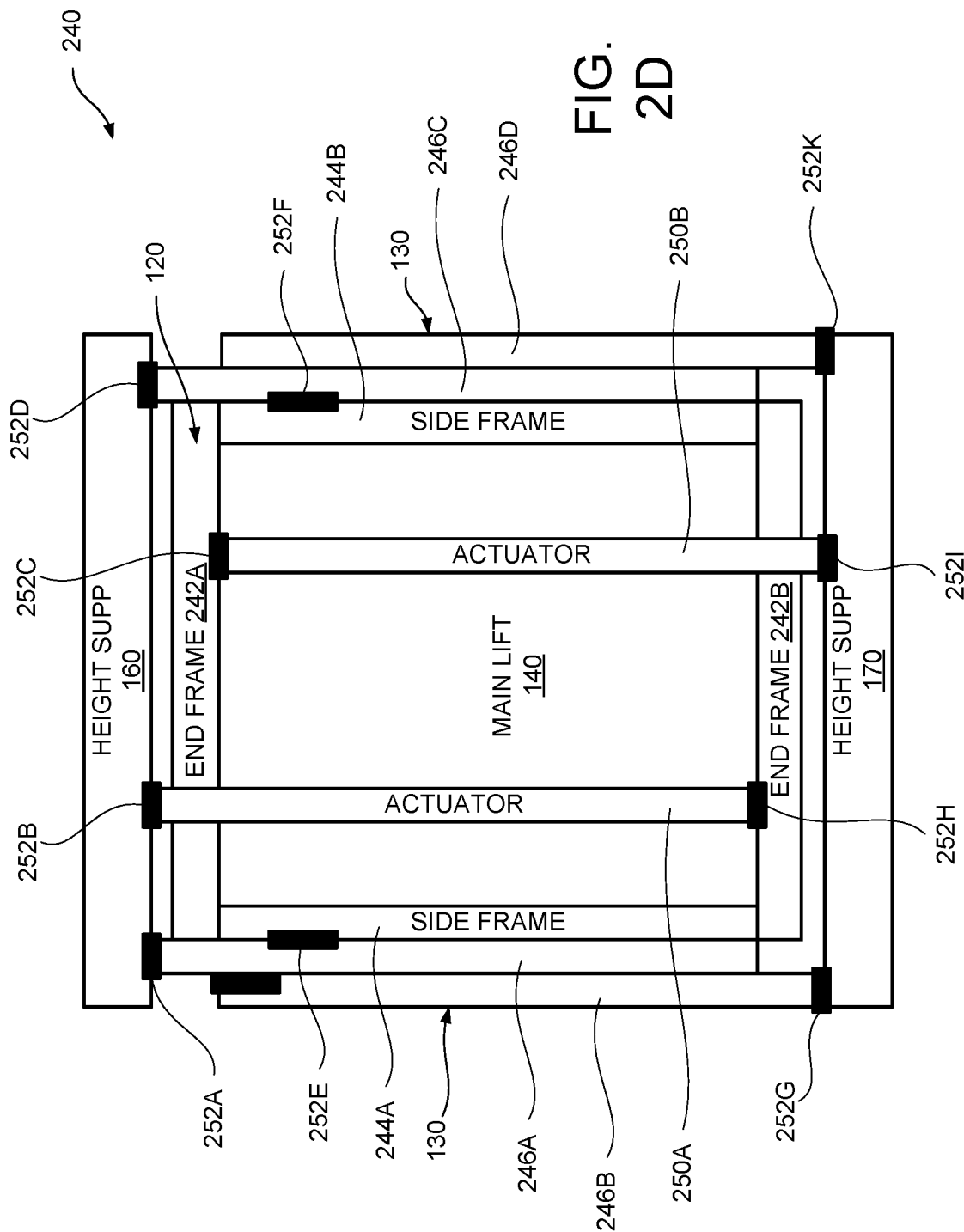

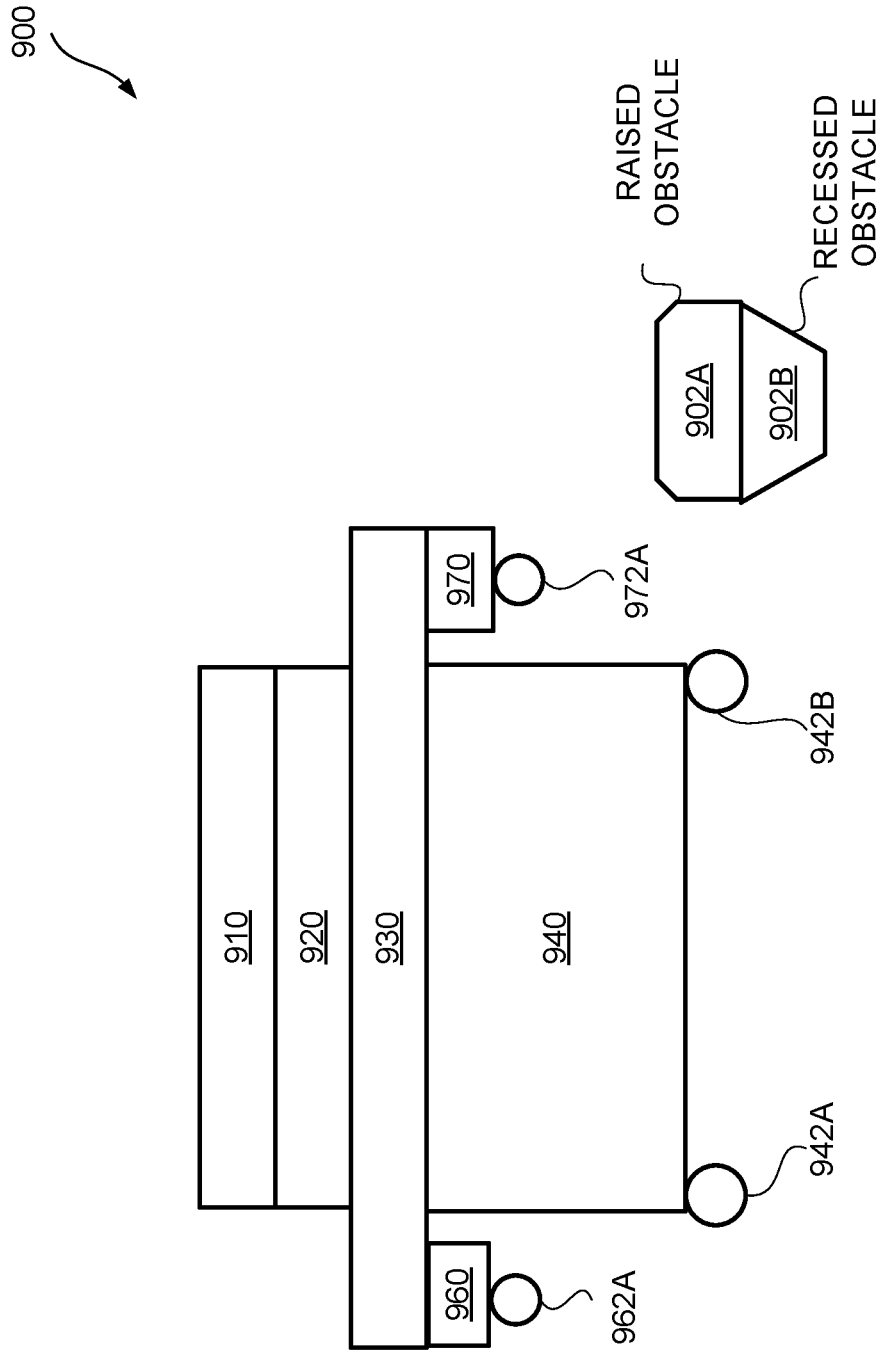

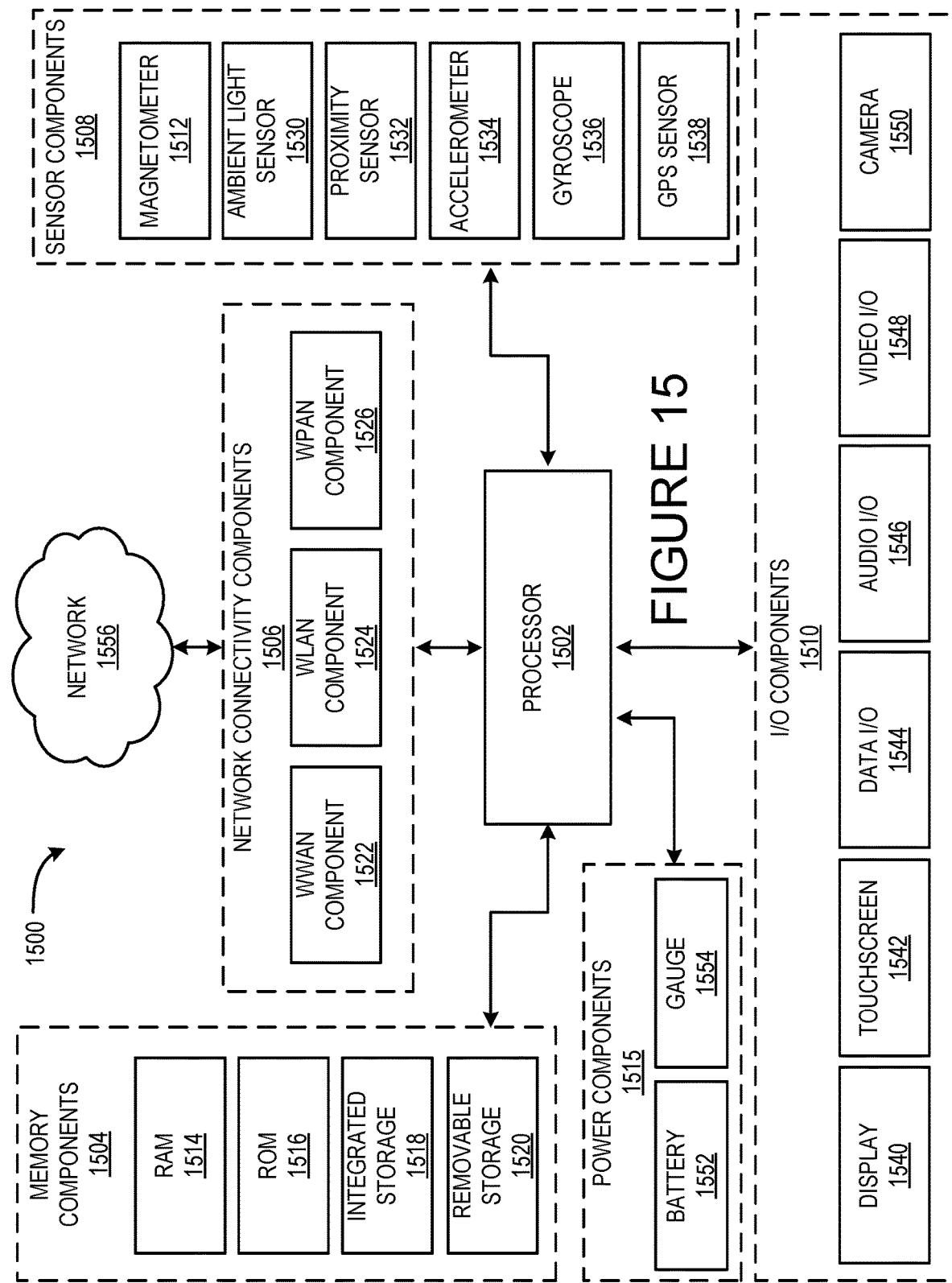

SELF-ELEVATING PLATFORM

BACKGROUND

People frequently need to transport loads from one level to another. For example, people often need to move groceries or other goods from a sidewalk up a flight of stairs to a house. Conventional transport equipment, such as carts or hand trucks, are frequently used, but typically need to be pulled up the stairs by a user. The amount of weight that can be moved in this manner is limited by the strength of the user.

It is with respect to these and other considerations that the disclosure made herein is presented.

SUMMARY

Technologies are disclosed for a self-elevating platform that can move a load between two surfaces that are separated horizontally and can be at different vertical levels. The disclosed technologies can operate autonomously or semi-autonomously and maintain stability of the platform while raising or lowering a load platform.

Examples of the disclosed technology concern systems and carts for carrying a payload from one surface to another. Examples of the disclosed technology generally include a main body structure, a payload platform for carrying a payload that is attached to the main body and a main lift attached to the main body that can be actuated to retract and extend to lower or raise the main body, where the main lift includes main wheels.

In certain examples, extensible support beams are connected to the main body that can be actuated to extend in forward and backward directions with respect to the main body and the extensible support beams can support a weight of the cart or system. In some examples, a front height support is connected to the extensible support beams so that the front height support can be extended forward with respect to the main body, the front height support having front wheels and being capable of supporting at least part of the weight of the cart or system.

A back height support can be coupled to the extensible supports beams such that it can be extended backward with respect to the main body. The back height support also having back wheels and being capable of supporting the weight of the cart or system in cooperation with the first height support. The back height support can be configured to be actuated to vertically extend or retract the back wheels of the back height support.

Examples of the disclosed technology include a controller module that can actuate the main lift, the extensible support beams and the second height support. The controller module can perform methods for self-elevating platform control from an initial surface to a destination surface.

One example of the method for platform control can extend the extensible support beams forward to position the front wheels of the first height support over the destination surface and extend the rear height support until the back wheels contact the initial surface. The main lift can be retracted and the main body shifted forward on the extensible support beams. The main lift can be extended until the main wheels contact the destination surface. The back height support can be retracted and the extensible support beams can be retracted.

In certain examples, one or more of the front or back wheels can be actuated by the controller module to move the system or cart forward or backward.

In particular examples, the front height support can be actuated by the controller module to vertically extend or retract the front wheels. The controller module can be configured to extend the front height support until the front wheels contact the destination surface.

In some examples, when the destination surface is at a lower level than the initial surface, the method for self-elevating platform control can include extending the extensible support beams in the back direction to position the back wheels over the destination surface, retracting the main lift, and extending the back height support until the back wheels contact the destination surface. In these examples, the method can also include shifting the main body in the backward direction on the extensible support beams, extending the main lift until the main wheels contact the destination surface after the system has been moved in the backward direction until the main wheels are positioned above the destination surface, retracting the back height support, and retracting the extensible support beams.

The extensible support beams, in some examples, can include a first set of extensible support beams that are connected to the front height support and slidably connected to the main body, e.g. using linear guides, to permit lateral motion in the forward and backward directions and vertical support. A first actuator can be coupled between the front height support and the main body and configured to apply force in the forward and backward directions. A second set of extensible support beams can be connected to the second height support and slidably coupled to the main body, e.g. using linear guides, to permit lateral motion in the forward and backward directions and vertical support. A second actuator can be connected between the back height support and the main body and configured to apply force in the forward and backward lateral directions.

In various examples, the load platform can be a cargo box, a platform, a person carrier or a cargo box have a side that can be lowered to facilitate removal of items.

In many examples, the main lift can include a power actuator capable of lifting and lowering the weight of the system and the front and back height supports are configured to simply maintain height support of the weight of the system.

Certain examples of the disclosed technology can be configured to climb or descend intermediate steps between an initial surface and a destination surface. In some of these examples, a vertical stabilizer can be attached to the main lift and configured to be actuated to vertically extend and retract a first set of the main wheels to stabilize the main lift on two different surfaces at different levels.

In some of these examples, relating to climbing upward when the system is positioned on an initial surface with at least first, second and third step surfaces, where the first step surface is higher than the initial surface, the second step surface is higher than the first step surface, and the third step surface is higher than the second step surface, the method for self-elevating platform control can include shifting the main body in the forward direction on the extensible support beams until the first set of main wheels are above the first step surface and a second set of main wheels are above the initial surface, extending the main lift until the first set of main wheels contacts the first step surface, adjusting the vertical stabilizer until the second set of main wheels contacts the initial surface, extending the main lift to raise the main body up from the first step surface.

These examples can also include shifting the main body in the forward direction on the extensible support beams until the first set of main wheels are above the first step surface and the second set of main wheels are above the second step surface and extending the main lift until the first set of main wheels contacts the second step surface. If the second set of mains wheels is not in contact with the first step surface, these examples can also include adjusting the vertical stabilizer until the second set of main wheels contacts the first step surface, extending the main lift to raise the main body up from the second step surface, retracting the extensible support beams to move the second height support in the forward direction until the second height support is adjacent to the main lift and above the first step surface, and extending the second height support until the second wheels contact the first step surface.

In further examples, the method for self-elevating platform control can include extending the front height support until the front wheels make surface contact and determining whether the contacted surface is the third step surface. If the third step surface is determined to be the contacted surface, then these further examples can include retracting the main lift, retracting the vertical stabilizer to retract the second set of main wheels, shifting the main body in the forward direction on the extensible support beams until the first and second sets of main wheels are above the third step surface, extending the main lift to raise the main body up from the third step surface, retracting the front height support to an inactive position, retracting the back height support to an inactive position, and retracting the extensible support beams to move the back height support in the forward direction until the back height support is adjacent to the main lift.

In particular examples, the system can include sensors configured to sense surfaces proximate to the system, and determining whether the contacted surface is the third step surface involves using sensor data from the sensors to determine whether the contacted surface is the third step surface.

In other examples, relating to descending when the system is positioned on the initial surface, the first step surface is lower than the initial surface, the second step surface is lower than the first step surface, and the third step surface is lower than the second step surface, the method for self-elevating platform control can include retracting the main lift to lower the main body towards the initial surface, extending the front height support until the front wheels contact the initial surface, extending the extensible support beams with the back height support, extending the back height support until the back wheels contact the second step surface, shifting the main body in the backward direction on the extensible support beams until the first set of main wheels are above the first step surface and the second set of main wheels are above the second step surface.

These example can also include a first retracting of the vertical stabilizer, extending the main lift until the first set of main wheels contacts the first step surface, adjusting the vertical stabilizer until the second set of main wheels contact the second step surface, retracting the extensible support beams with the front height support until the front height support is adjacent to the main lift, retracting the front height support, retracting the back height support, retracting the main lift, extending the front height support until the first wheels contact the first step surface, extending the extensible support beams with the back height support, extending the back height support until the back wheels contact the third step surface, shifting the main body in the backward direction on the extensible support beams until the first set of main wheels are above the second step surface and the second set of main wheels are above the third step surface, a second retracting of the vertical stabilizer, and extending the main lift until the first set of main wheels contacts the second step surface.

In certain ones of these examples, when the third step surface may be the destination surface, the method for self-elevating platform control can include determining whether the third step surface is the destination surface and, if the third step surface is determined to be the destination surface, then extending the main lift to contact the third step surface, retracting the back height support, retracting the front height support, and retracting the extensible support beams to move the front height support in the forward direction until the front height support is adjacent to the main lift.

In other examples relating to descending multiple steps when the system is positioned on the initial surface, the first step surface is lower than the initial surface, the second step surface is lower than the first step surface, and the third step surface is lower than the second step surface, the method for self-elevating platform control can include retracting the main lift until the front wheels of the front height support contact the initial surface, extending the extensible support beams with the back height support, and extending the back height support until the back wheels contact the second step surface.

These examples can also include shifting the main body in the backward direction on the extensible support beams until the first set of main wheels are above the first step surface and the second set of main wheels are above the second step surface, a first retracting of the vertical stabilizer, extending the main lift until the first set of main wheels contacts the first step surface, adjusting the vertical stabilizer until the second set of main wheels contact the second step surface, retracting the extensible support beams with the front height support until the front height support is adjacent to the main lift, retracting the back height support to an inactive position, and retracting the main lift until the front wheels of the front height support contact the second step surface.

These examples can further include extending the extensible support beams with the back height support, extending the back height support until the back wheels contact the third step surface, shifting the main body in the backward direction on the extensible support beams until the first set of main wheels are above the second step surface and the second set of main wheels are above the third step surface, a second retracting of the vertical stabilizer, extending the main lift until the first set of main wheels contacts the second step surface, adjusting the vertical stabilizer until the second set of main wheels contact the third step surface, extending the extensible support beams with the back height support, shifting the main body in the backward direction on the extensible support beams until the first and second sets of main wheels are above the third step surface, a third retracting of the vertical stabilizer, extending the main lift until the first and second sets of main wheels contact the third step surface, and retracting the extensible support beams with the front height support until the first height support is adjacent to the main lift.

In another example of a self-elevating platform cart for traversing a barrier in accordance with the disclosed technology, the method for self-elevating platform control, when an initial surface is on one side of a raised or recessed barrier and a destination surface is on another side of the barrier, involves extending the extensible support beams in the forward direction to position the front wheels over the destination surface, extending the front height support until the front wheels contact the initial surface, extending the back height support until the back wheels contact the initial surface, retracting the main lift, shifting the main body in the forward direction on the extensible support beams, extending the main lift after the system has been moved in the forward direction until the main wheels are positioned above the destination surface, retracting the back height support, retracting the extensible support beams with the back height support until the back height support is adjacent to the main lift, and retracting the front height support.

In still another example of a self-elevating platform cart for transporting a load onto a raised platform in accordance with the disclosed technology, the cart has a fixed support beam connected to the main body and configured to support a weight of the system. A front height support with front wheels is connected to a first end of the fixed support beam. A combined vertical height of the fixed support beam, the main lift and the first height support is constructed to be greater than an anticipated height of a top surface of the raised platform and a combined vertical length of the front wheels and the front height support is selected such that the main lift can retract the main wheels to at least the anticipated height of the top surface of the raised platform. A back height support with back wheels is also attached to a second end of the fixed support beam. The second height support is constructed to support the system at a height such that the main lift can retract the main wheels to at least the anticipated height of the top surface of the raised platform.

In these examples of a self-elevating platform cart for transporting a load onto a raised platform, when an initial surface is adjacent to a raised platform and a destination surface is a top surface of the raised platform the method for self-elevating platform control, when the first wheels of the first height support contact the destination surface, retracting the main lift and, when the main wheels are positioned over the destination surface, extending the main lift.

In certain ones of these examples of a self-elevating platform cart for transporting a load onto a raised platform, the main lift is constructed to extend to lift the front and back wheels above the initial surface and the method for self-elevating platform control can further involve extending the main lift to lift the front and back wheels above the initial surface and retract the main lift until the front wheels contact the destination surface and the back wheels contact the initial surface.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1A is a schematic diagram showing an illustrative example of a side view of a self-elevating platform cart for moving a payload from a first level to a second level;

FIG. 2D is a schematic diagram showing an illustrative example of a top view of an extensible support structure with actuators in accordance with certain examples of the disclosed technology;

FIG. 9A is a schematic diagram showing a side view of another illustrative example a self-elevating platform cart configured to traverse a raised or recessed barrier in accordance with certain examples of the disclosed technology;

FIG. 15 is a computer architecture diagram illustrating a computing device architecture for a computing device capable of implementing aspects of the techniques and technologies presented herein.

DETAILED DESCRIPTION

Figure 1B:
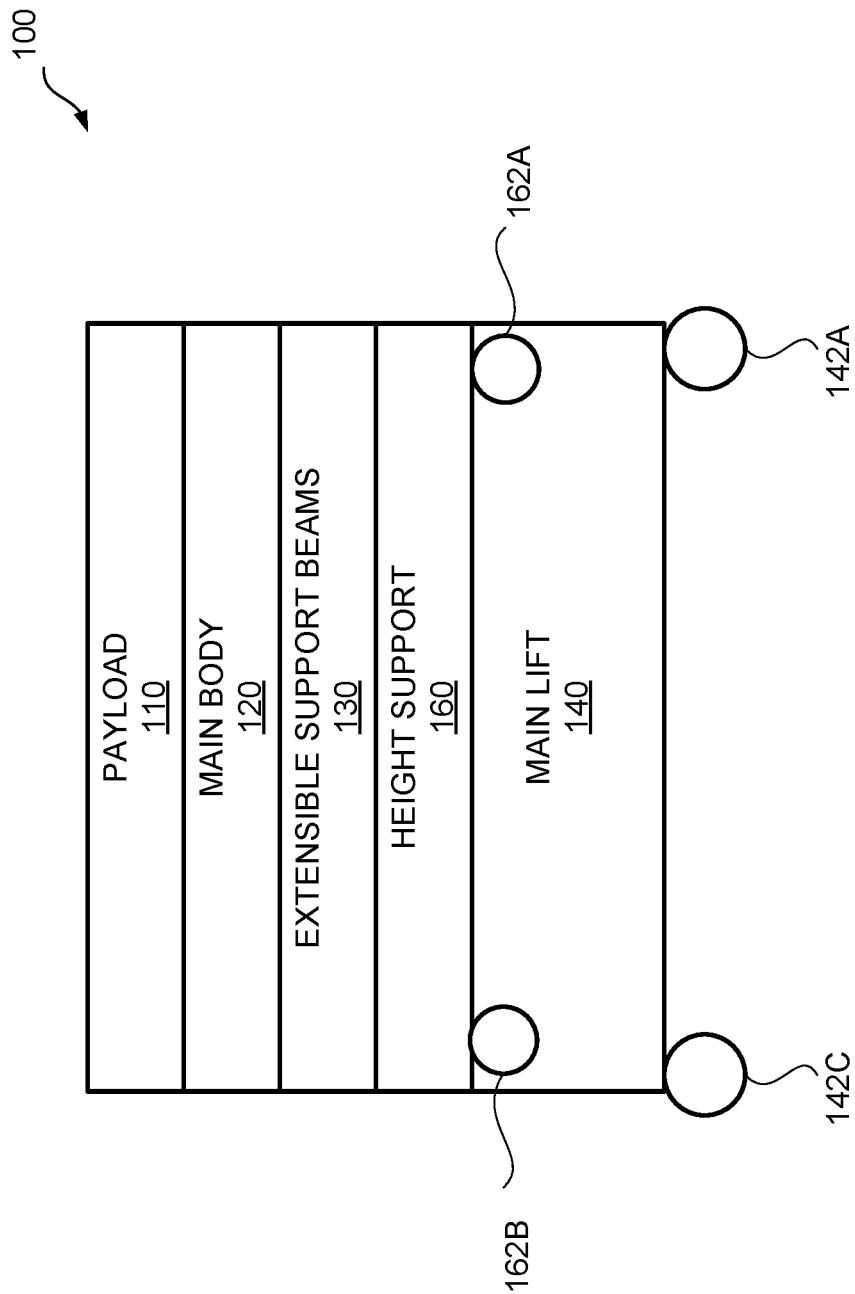
FIG. 1B is a schematic diagram showing an illustrative example of an end view of the example of a self-elevating platform cart of FIG. 1A.

The disclosed technology generally involves a self-elevating platform that can semi-autonomously or autonomously move a load, such as equipment on a platform, groceries in a cargo box, or a person in a personal carrier, between two surfaces separated by a horizontal distance, such as between a ground surface and a stair landing, a vehicle, or loading dock or from one side of a barrier to the other side. In one example, a main lift mechanism can be utilized to power lift or lower the load. Extensible support beams provide stability support for traversing between levels or surfaces. Supports attached to one or both extensible support beams can adjust to a height of a surface and provide support.

In general terms, the disclosed technology provides a system and method for moving loads between two surfaces. In one example, a load platform is attached to a main body of a cart that can carry a load, such as cargo, equipment or a person. The main body is supported by a main lift that can lift or lower the main body and the load platform.

A pair of extensible support beams are attached to the main body that can be extended laterally from the cart. Each of the extensible support beams has a support and the combination of the extensible support beams and supports can support the weight of the cart. At least one of the supports can be extended and retracted to contact a surface, such as a ground level surface or landing surface.

To raise a load from a lower surface to a higher surface, one of the extensible support beams is extended and its attached support extended to contact the higher surface. The support of the other extensible support is extended to contact the lower surface. In another example, the attached support can be a fixed support and the main lift can be lowered to bring the attached support into contact with the higher surface.

The main lift is retracted and, using coordinated actuation of the extensible support beams, the main body, main lift and load platform are moved towards the support in contact with the higher surface.

At this point, the cart can be moved forward on wheels attached to the supports to a position where the main lift is above the landing surface. The main left can be extended to lift the main body, main lift and load platform to a normal height for transportation. The support in contact with the lower surface can be retracted and its extensible support retracted. The cart can then be moved forward.

Descending from the higher level surface to the lower level surface can be performed by inverting the operations described above.

Note that the main lift can have wheels attached to move the cart in some examples. In certain examples, the supports and extensible support beams can be configured and controlled to maintain the supports in a recessed position with respect to the main body.

Alternatively, in some examples, the cart can be moved on the wheels of the supports. In particular examples, the wheels of the main lift or supports can include motors that can be actuated to autonomously move the cart. The wheels can also include brake mechanisms to prevent the wheels from moving during certain operations of the cart.

In some examples, the cart can be configured to traverse a raised barrier, such as a speed bump, or a recessed barrier, such as a gully or ditch, where the cart can move the load from the surface on one side of the barrier to the surface on another side of the barrier. In these examples, the main lift with the cart body and payload is raised and moved over the barrier, such as a speed bump, gutter, or vehicle bumper.

In certain examples, a cart in accordance with the disclosed technology can be configured to climb an indefinite number of multiple steps to traverse from one surface to another. In these examples, a vertical stabilizer is disposed within the main lift that can stabilize the main lift in a position straddling two of the multiple surfaces, e.g. two adjacent steps.

One technical advantage of certain aspects of the self-elevating platform of the disclosed technology is that the platform can be implemented with using a single power lift disposed as the main lift. The supports need not be configured to lift the weight of the cart because they only need to support the weight of the cart when it is ascending or descending.

Another technical advantage is the flexibility of the load platform structure. In one example, the load platform can be a simple planar surface, such as for equipment or other carts. In another example, the load platform can be a cargo box, such as a box for groceries, with sides that can be dropped to facilitate for loading and unloading the contents of the cargo box. In still another example, the load platform can be a carrier configured to carry a person, such as a hospital bed type configuration or wheel chair type configuration.

Still another technical advantage is that the disclosed technology can facilitate movement of a person between surfaces where no facility for disability access is provided.

Other technical effects other than those mentioned herein can also be realized from implementation of the technologies disclosed herein.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a device, system, and computer-implemented methodologies relating to a self-elevating platform will be described. As will be described in more detail below with respect to the figures, there are a number of applications and services that may embody the functionality and techniques described herein.

FIG. 1A is a schematic diagram showing a side view of an illustrative example of a self-elevating platform cart or cart 100 for moving a payload from a first level to a second level. The system 100 includes a payload platform 110 for supporting a load that is attached to a main body 120, which can be a frame, chassis or similar structure that provides structural integrity for the system 100.

Extensible support beams 130 are attached to main body 120 and supports 160 and 170 are attached to the extensible support beams 130. Extensible support beams 130 can be actuated to extend supports 160 and 170 in opposing lateral directions from the main body 120. Extensible support beams 130 and supports 160 and 170 are configured to support a weight of system 100 during operation. In some examples, supports 160 and 170 include wheels 162 and 172 accordingly. In other examples, wheels 162 and 172 may be replaced with fixed supports.

Main lift 140 is attached to main body 120 and can be configured for lift power sufficient to raise and lower the weight of the system 100. Main lift 140 can include wheels 142 that allow the system 100 to move in order to transport the load.

Controller 180 is a computerized control system configured to actuate extensible support beams 130, main lift 140 and supports 160 and 170. In some examples, controller 180 may be capable of actuating some or all of the wheels 142, 162 and 172.

FIG. 1B is a schematic diagram showing an end view of an illustrative example of the self-elevating platform cart 100 of FIG. 1A. In the perspective of FIG. 1B, support 160 is visible, but support 170 is not visible owing to being positioned on an opposite side of system 100. Note that in this example, support 160 includes wheels 162A and 162B and main lift 140 includes wheels 142A and 142C that are visible from the perspective shown. Also note that extensible support beams 130 can be extended and support 160 extended such that wheels 162A and 162B contact a surface, such as a walkway, floor or landing.

Note that the schema illustrated in FIGS. 1A and 1B can be varied in accordance with the disclosed technology. For example, main body 120, extensible support beams 130 and supports 160 and 170 can be configured such that main body 120 may not be visible in the perspectives shown. In other examples, system 100 can be configured such that supports 160 and 170 can be retracted into recesses formed within the configuration of system 100 when not in operation.

Figure 2A:
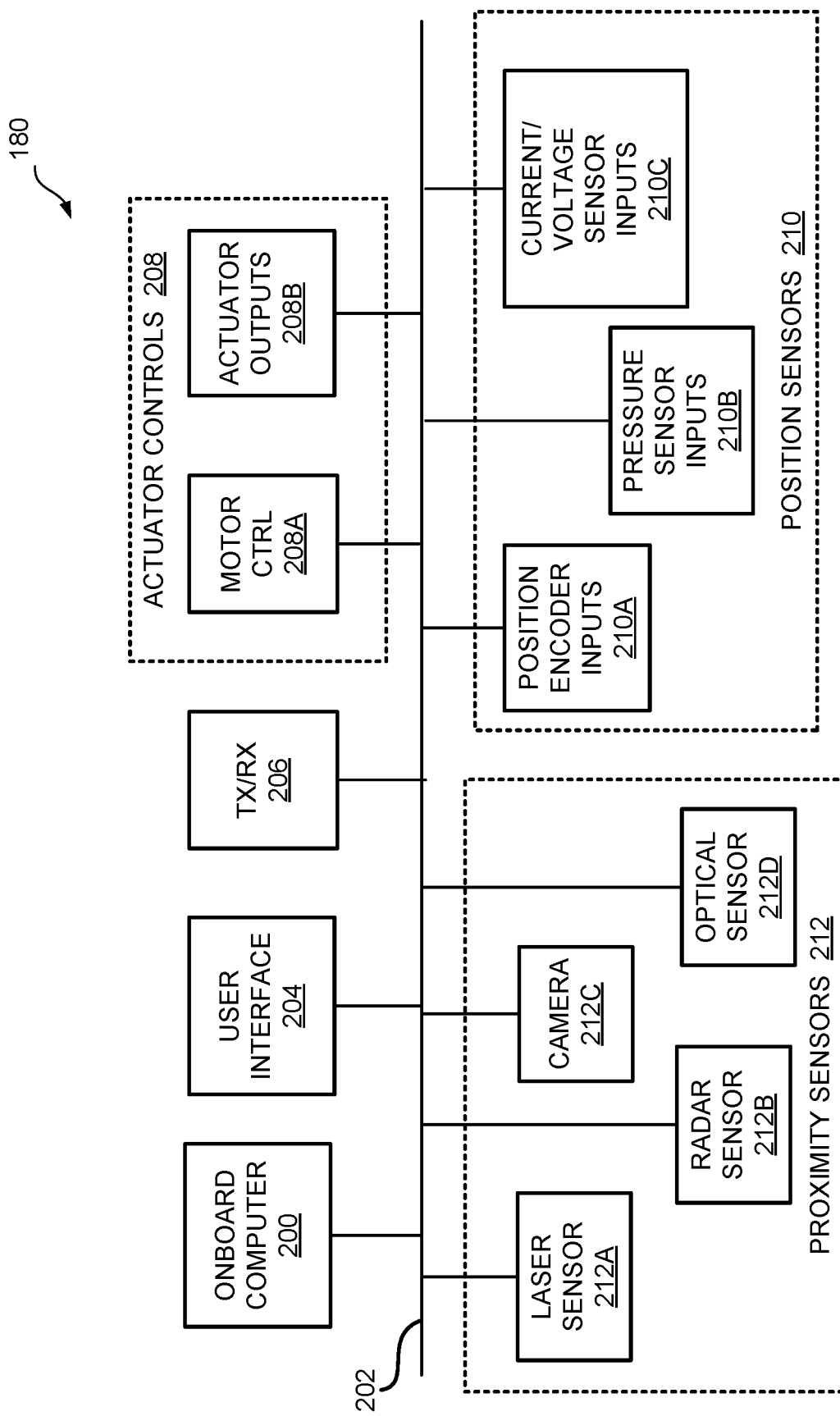
FIG. 2A is an architecture diagram showing an illustrative example of a controller module for a self-elevating platform cart.

FIG. 2A is an architecture diagram showing an illustrative example of a controller module 180 for a self-elevating platform cart. In this example, controller module includes an onboard computer 200 connected to local network or bus 202 through which it can interface with other components of the module.

Onboard computer 200 communicates with user interface 204 to display information, such as operational status or battery power level, to a user and receive commands, such as an ascend command to initiate a process for ascending levels or a descend command to initiate a process for descending levels. Onboard computer 200 communicates with transceiver 206 to send and receive data via a network, for example.

In this example, onboard computer 200 interfaces with active elements in self-elevating system 100 to move the system between surfaces. Motor control 208A can, in certain examples, control motors in wheels 142, 162 or 172 to move the system 100. Note that motor control 208A may monitor current drawn in certain motors to detect surface contact. Actuator outputs 208B control actuators that, in this example, extend and retract extensible support beams 130, supports 160 and 170, or height supports.

Onboard computer 200 interfaces with positions sensors 210 to determine positions of some components of system 100. For example, position sensor inputs 210A may receive signals indicating a position of extensible support beams 130, main lift 140, or supports 160 and 170 that can be utilized in control processes for traversing between two surfaces. Position sensor inputs 210A may also receive signals from one or more level detectors to detect a horizontal level of system 100 to detect leveling problems or instability or adjust a level of the system.

Pressure sensor inputs 210B can interface with pressure sensors mounted, for example, in wheels 142, 162 or 172 to determine when the wheels have contacted a surface. Current or voltage sensor inputs 210C can receive voltage and current measurements from components of system 100, such as a power motor in main lift 140, which can, in some examples, be utilized to detect surface contact.

Onboard computer 200 can interface with proximity sensors 212 to determine relative positions of surfaces or objects. For example, laser sensor 212A can utilize lasers positioned on components of system 100, such as extensible support beams 130, to detect proximity to a surface and distance to the surface. Similarly, in some examples, radar sensor 212B may utilize radar signals to detect proximity and distance of components of system 100 and surfaces. In certain examples, camera 212C can be utilized to detect and measure distance to surfaces and objects through optical recognition. In some examples, optical sensor 212D can utilize other optical signals to detect proximity and distance.

Figure 2B:
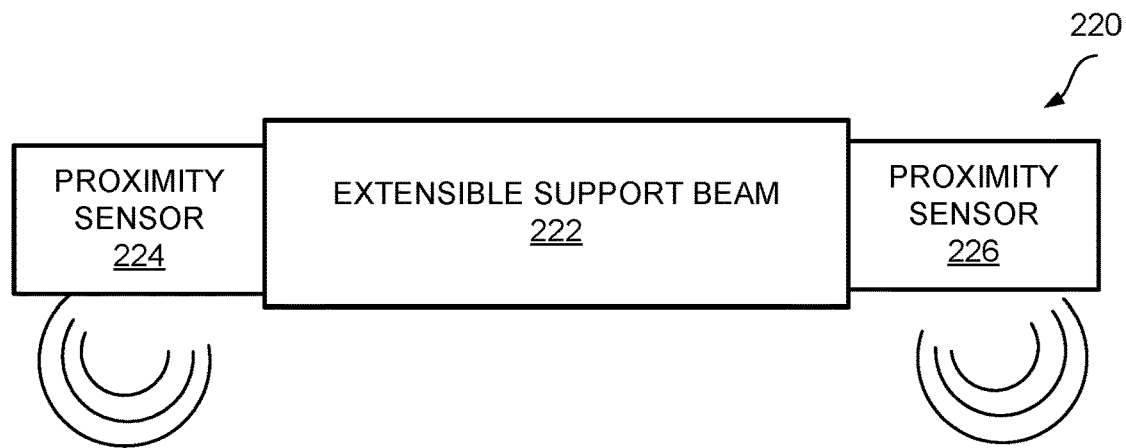
FIG. 2B is a schematic diagram showing an illustrative example of an extensible support beam with proximity sensors in accordance with certain examples of the disclosed technology.

FIG. 2B is a schematic diagram showing an illustrative example of an extensible support beam 222 with proximity sensors 224 and 226 in accordance with certain examples of the disclosed technology. In this example, proximity sensors 224 and 226 are attached to distal ends of extensible support beam 222, such as a beam in extensible support beams 130, and configured to detect the proximity to surfaces of the distal ends of beam 222. For example, when an actuator extends beam 222, proximity sensor 224 may detect a landing surface and determine a distance to the surface for use in a control process for system 100.

Figure 2C:
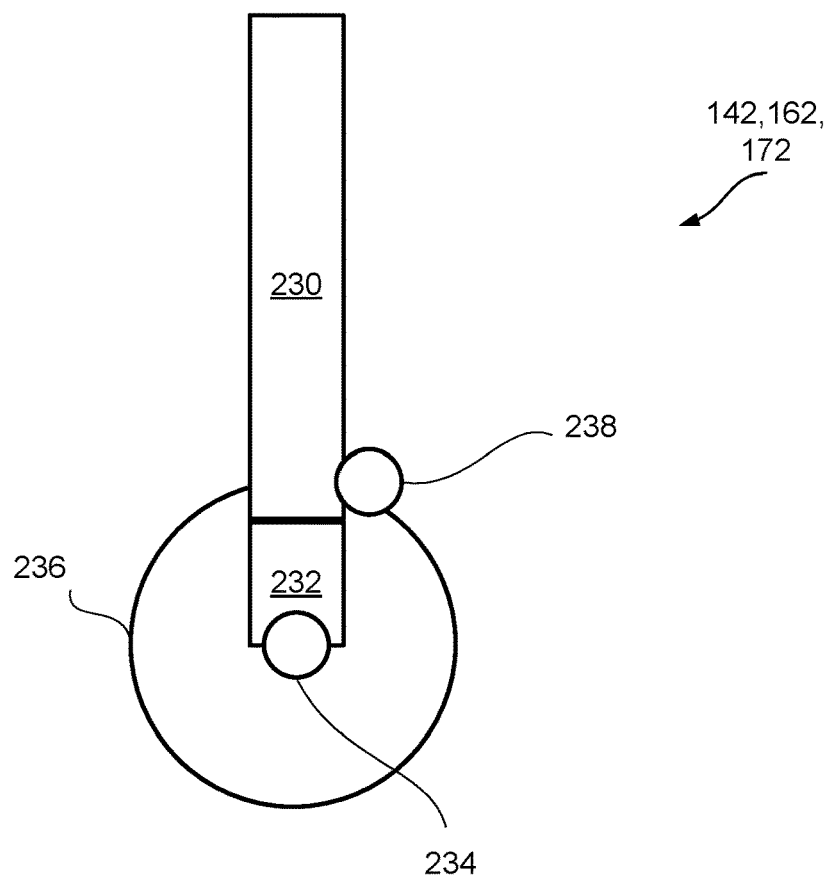
FIG. 2C is a schematic diagram showing an illustrative example of wheel assembly with a driver motor and brake in accordance with certain examples of the disclosed technology.

FIG. 2C is a schematic diagram showing an illustrative example of wheel assemblies 142, 162, or 172 in accordance with certain examples of the disclosed technology that include a strut 230 that attaches the wheel assembly to main lift 140, support 160, or support 170, respectively. A motor 232 can be activated to drive axle 234 of wheel 236. A brake mechanism 238 can be included to apply braking force to wheel 236 to prevent rotational movement of the wheel.

FIG. 2D is a schematic diagram showing a top view of an illustrative example of an extensible support structure 240 with actuators 250 in accordance with certain examples of the disclosed technology. In this example, components of extensible support beams 130 are attached to frame components for main body 110 and supports 160 and 170.

In this example, sliding beams 246 are components of extensible support beams 130. Each of support beams 246 is attached to a side frame 244, such as through a linear guide, to permit the beams 246 to be extended or retracted by an actuator 250.

For example, beam 246A is attached to support 160 via mounting 252A and beam 246C is attached to support 160 via mounting 252D. Beam 246A is engaged with side frame 244A via linear guide 252E and beam 246C is engaged with side frame 244B via linear guide 252F. Actuator 250A is attached to height support 160 via mounting 252B and is attached to end frame 242B via mounting 252H. In this configuration, actuator 250A can be actuated to horizontally extend or retract the position of support 160 under control of controller module 180.

Similarly, beam 246B is attached to support 170 via mounting 252G and beam 246D is attached to support 170 via mounting 252K. Beam 246B is engaged with side frame 244B via a linear guide and beam 246D is engaged with side frame 244B via a linear guide, where the linear guides are obscured in this perspective of the example. Actuator 250B is attached to height support 170 via mounting 252I and is attached to end frame 242A via mounting 252C. In this configuration, actuator 250B can be actuated to horizontally extend or retract the position of support 170 under control of controller module 180.

Examples of suitable linear guides can include ball bearing carriages and linear guide rails and linear motion slide rails and similar devices well known to those of ordinary skill in the art who will appreciate that a variety of devices can be adapted to use in the disclosed technology. For example, accordion style folding beams can be utilized in place of the linear guides in certain alternative examples.

Figure 2E:
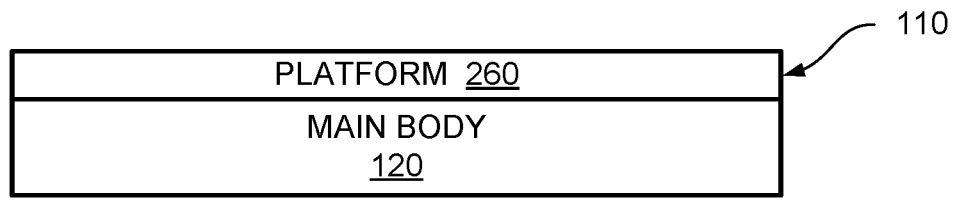
FIG. 2E is a schematic diagram showing an illustrative example of a payload platform in a self-elevating platform cart in accordance with certain examples of the disclosed technology.

FIGS. 2E-I illustrate a variety of examples structures that can be employed as the payload platform 110 for system 100 in accordance with certain examples of the disclosed technology. FIG. 2E is a schematic diagram showing a substantially planar payload platform 260 that may permit objects, such as equipment, boxes or pallets, to be placed on platform 260 for transport.

Figure 2F:
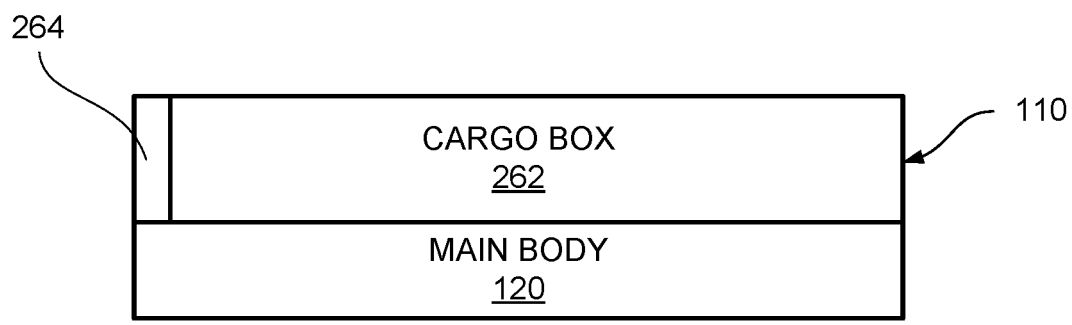
FIG. 2F is a schematic diagram showing an illustrative example of a side view of a cargo box in a self-elevating platform cart in accordance with certain examples of the disclosed technology.
Figure 2G:
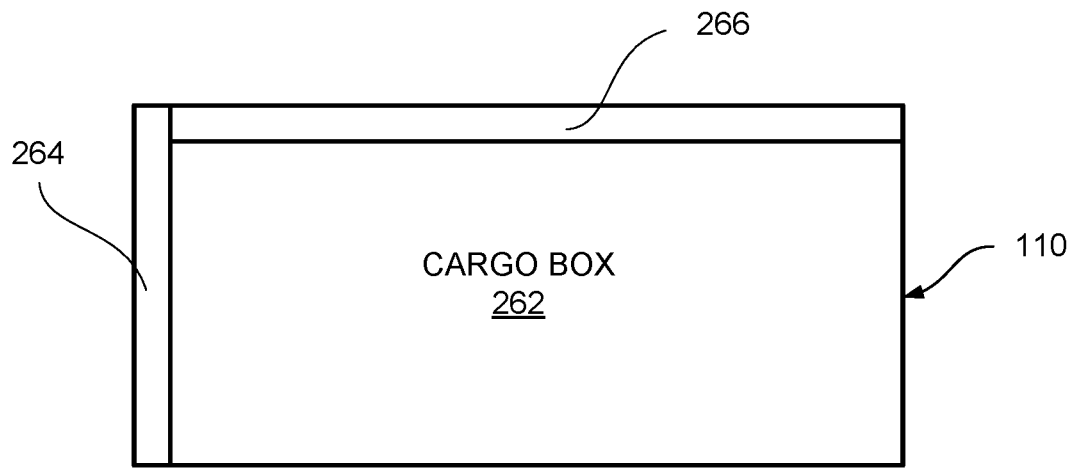
FIG. 2G is a schematic diagram showing a top view of the cargo box of FIG. 2F in accordance with certain examples of the disclosed technology.

FIG. 2F is a schematic diagram showing a side view of a cargo box 262 with a front side 264 that can be dropped to facilitate loading or unloading of the box. FIG. 2G shows a top view of the cargo box 100 of FIG. 2F with a side 266 that can also be dropped to facilitate loading or unloading of the box.

Figure 2H:
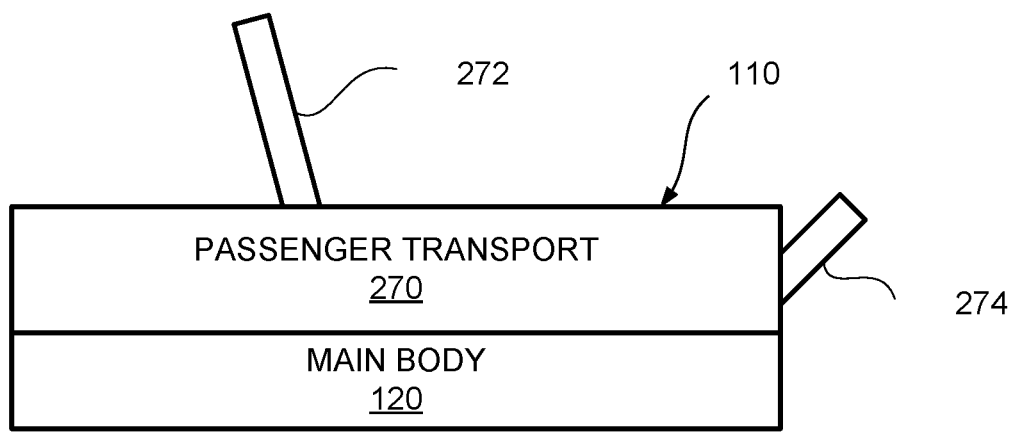
FIG. 2H is a schematic diagram showing an illustrative example of a side view of a person transport in a self-elevating platform cart in accordance with certain examples of the disclosed technology.
Figure 2I:
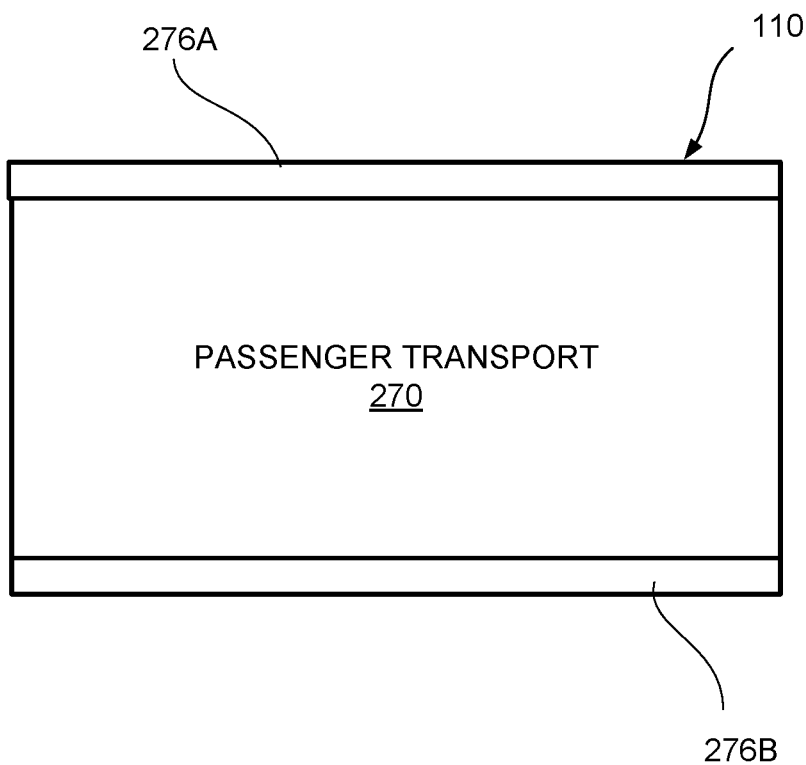
FIG. 2I is a schematic diagram showing a top view of the passenger transport of FIG. 2H in accordance with certain examples of the disclosed technology.

FIG. 2H is a schematic diagram showing a side view of a passenger transport 270 that can carry a passenger. In this example, passenger transport includes back rest 272 and foot rest 274, which can be configured to be adjustable to allow passenger entry and exit, e.g. foot rest 274 lowered to accommodate the passenger. FIG. 2I is a schematic diagram showing a top view of the passenger transport of FIG. 2H that illustrates side rails 276A and 276B that can be dropped to facilitate loading or unloading a passenger, such as a patient or someone requiring assistance to get in or out of their bed.

A variety of loading platforms 110 can be readily utilized with the disclosed technology to adapt the system to specific applications.

FIGS. 3A-G illustrate an example of operational steps involved in ascending from an initial surface to a destination surface in an example of a self-elevating platform cart 300 in accordance with the disclosed technology. In this example, the destination surface is at a higher level than the initial surface. As illustrated in FIGS. 3A-G, the initial surface is a walkway or floor and the destination surface is a top surface of landing 404.

Note that the system 300 is shown at an initial height, which could be a predetermined height relating to a height suitable for movement of the system during transportation or a height suitable for a general user or a specific user. In this example, FIG. 3A is a schematic diagram showing a side view of an operational step 310 wherein support 160 is extended such that wheel 162A makes contact with the initial surface.

Figure 3A:
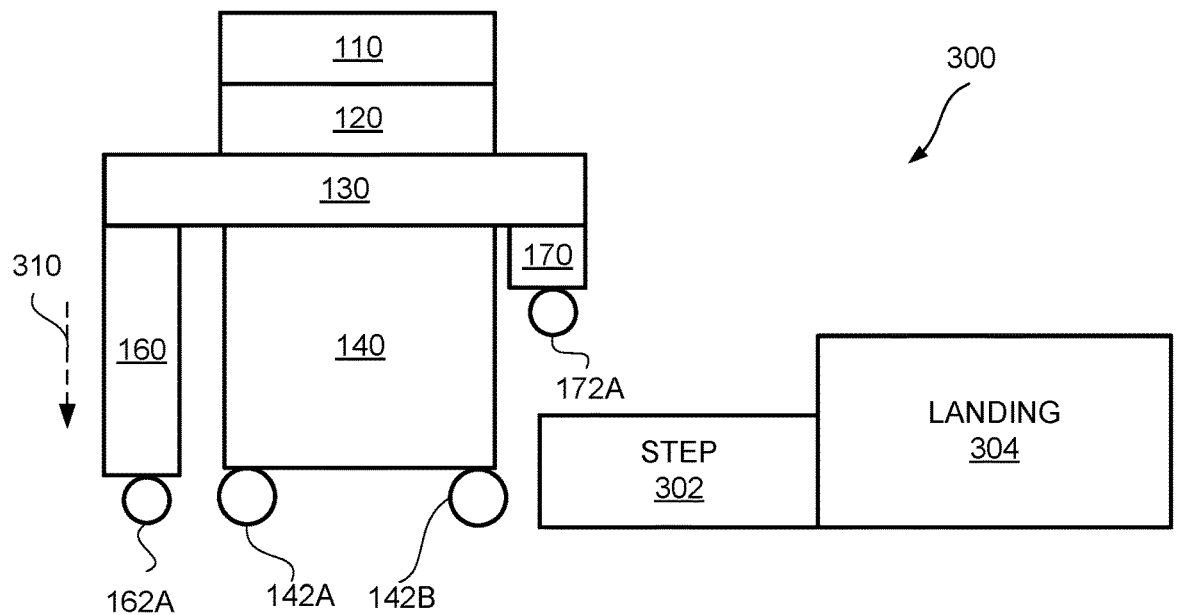
FIG. 3A is a schematic diagram showing a side view of an operational step of an illustrative example a self-elevating platform cart in ascending to a higher level in accordance with certain examples of the disclosed technology.
Figure 3B:
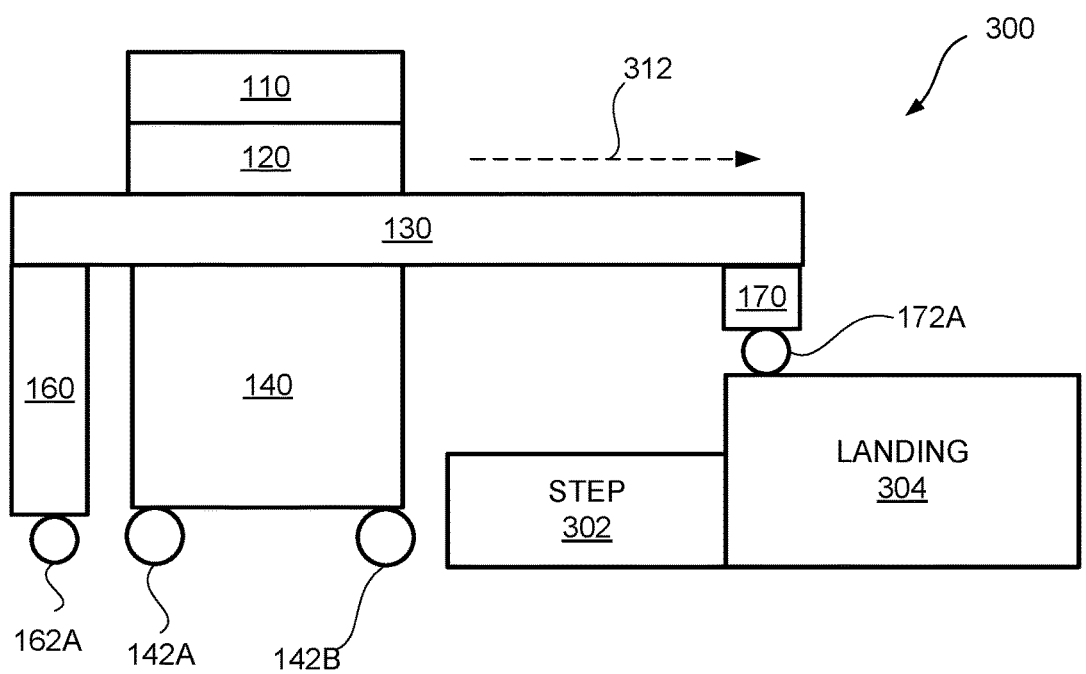
FIG. 3B is a schematic diagram showing another operational step of the self-elevating platform cart of FIG. 3A in accordance with certain examples of the disclosed technology.

FIG. 3B is a schematic diagram showing a side view of an operational step 312 wherein extensible support beams 130 extend support 170 such that wheel 172A makes contact with the destination surface, which is a top surface of a stair landing 304 in the illustrated example. Note that an additional operation to extend support 170 to contact the destination surface may be performed if the initial height of the system results in wheel 172A not contacting the landing surface when extensible support 130 is extended. Alternatively, main lift 140 can be retracted to bring support 170 into contact with the destination surface in which case height support 170 can be a fixed position support member. Similarly, support 170 may be retracted and/or main lift 140 extended to provide additional space for wheel 172A to contact the destination surface.

Figure 3C:
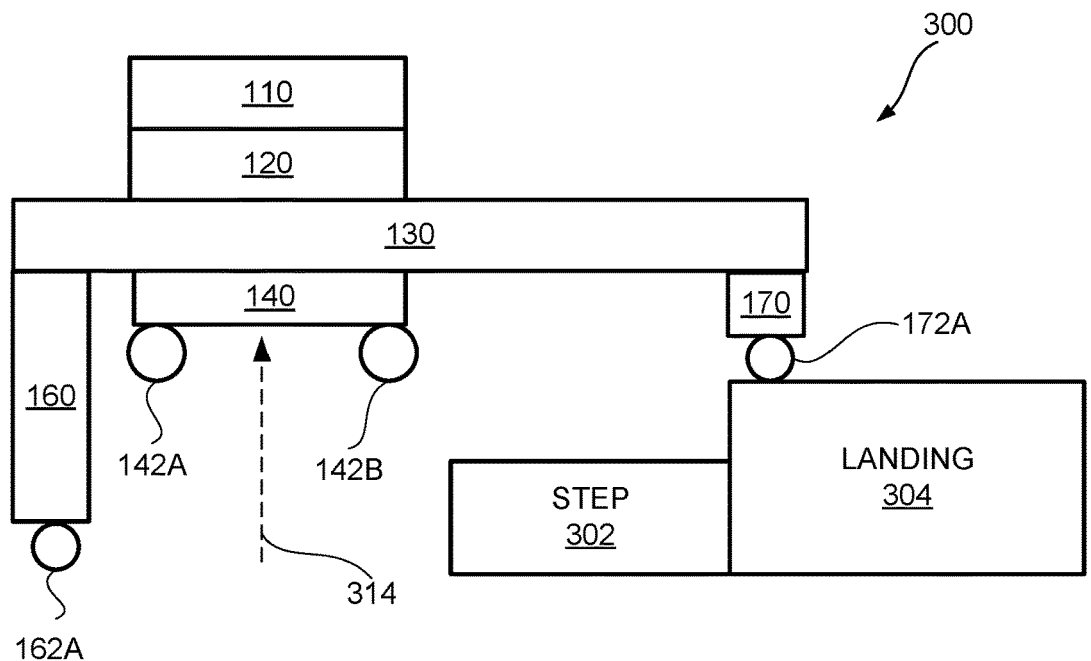
FIG. 3C is a schematic diagram showing yet another operational step of the self-elevating platform cart of FIG. 3A in accordance with certain examples of the disclosed technology.

FIG. 3C is a schematic diagram showing yet another operational step 314 of the self-elevating platform cart of FIG. 3A to retract main lift 140. Note that extensible support beams 130 and supports 160 and 170 can support the weight of the system 300 when main lift 140 is retracted. Also note that, in this example, main lift 140 is retracted to an extent such that wheels 142A and 142B are at a height corresponding to the destination surface. Also note that additional operations may be performed to apply braking force to wheels 162 and 172 to maintain a position of system 300.

Figure 3D:
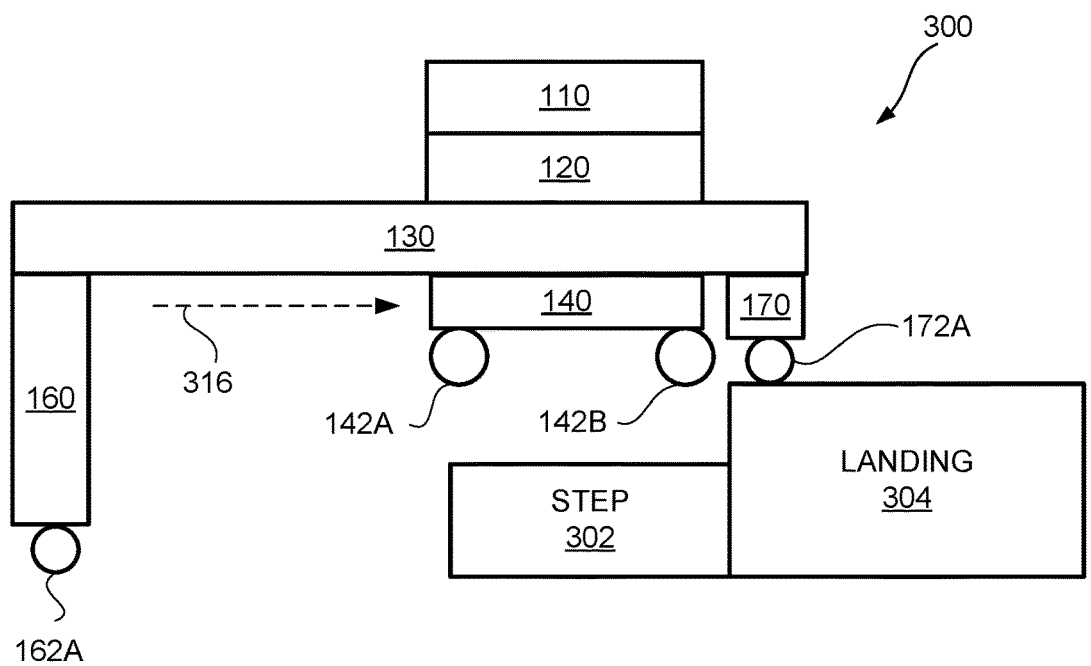
FIG. 3D is a schematic diagram showing still another operational step of the self-elevating platform cart of FIG. 3A in accordance with certain examples of the disclosed technology.

FIG. 3D is a schematic diagram showing still another operational step 316 of the self-elevating platform cart 300 of FIG. 3A to shift main body 120 along with load platform 110 and main lift 140 in a direction towards support 170. Operation 316 can, in one example, be performed through coordinated activation of actuators in extensible support beams 130. For example, based on the structure 240 shown in FIG. 2D, actuator 250A can be controlled to apply force to support 160 to extend beams 246A and 246C while actuator 250B is controlled to apply force to support 170 to retract beams 246B and 246D.

Figure 3E:
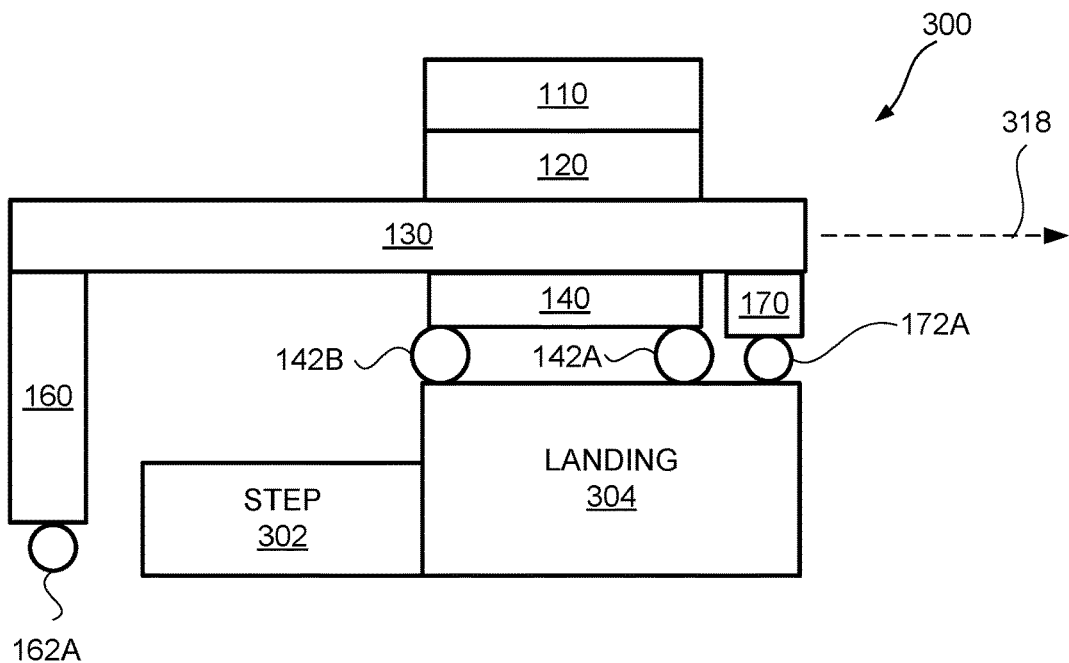
FIG. 3E is a schematic diagram showing still yet another operational step of the self-elevating platform cart of FIG. 3A in accordance with certain examples of the disclosed technology.

FIG. 3E is a schematic diagram showing still yet another operational step 318 of the self-elevating platform cart of FIG. 3A wherein the system 300 is moved in the direction of support 170 such that wheels 142 of main lift 140 contact the destination surface. Note that in some examples, braking force applied to wheels 162 and 172 is released to permit movement 318. Also note that, in particular examples, motors, such as motor 232 in FIG. 2C, in one or more of wheels 162 and 172 can be actuated to move system 300 forward. In more simplified examples, a user can push system 300 forward.

Figure 3F:
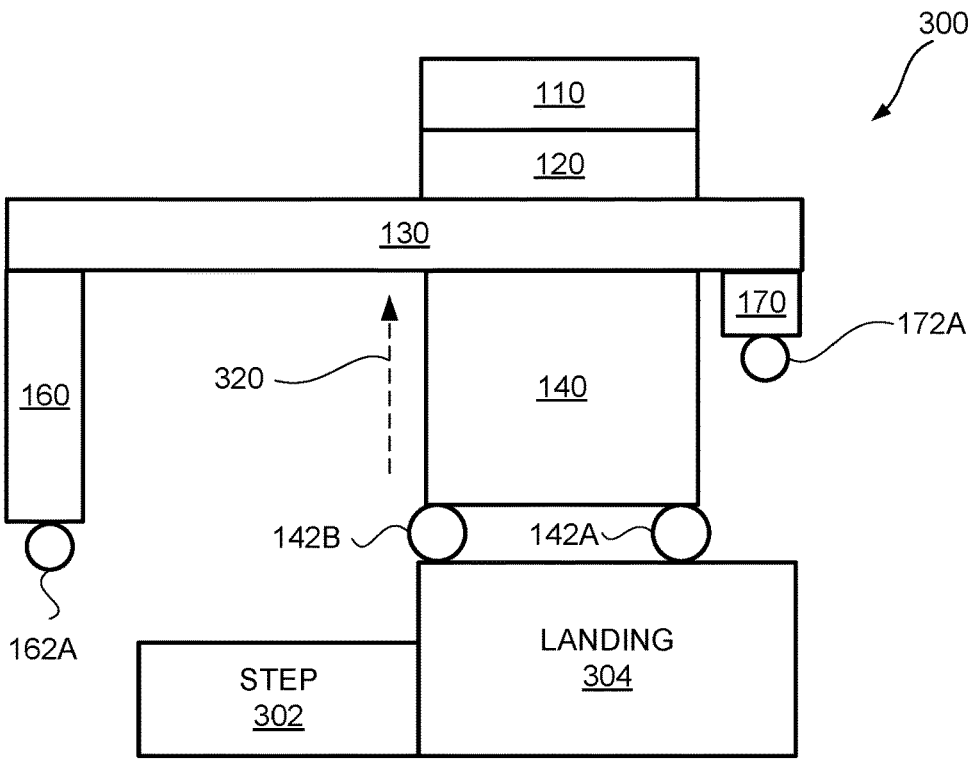
FIG. 3F is a schematic diagram showing still yet another operational step of the self-elevating platform cart of FIG. 3A in accordance with certain examples of the disclosed technology.

FIG. 3F is a schematic diagram showing still yet another operational step 320 of the self-elevating platform cart 300 of FIG. 3A wherein main lift 140 is extended to raise system 300, such as to its initial height. Note that, in some examples, a braking force may be applied to wheels 142 to maintain a position of system 300 on the destination surface. Further note that many of the illustrated operations can be performed in an altered order in accordance with the disclosed technology.

Also note that, in some examples, main lift 140 may be the only power lifting device of system 300. In these examples, supports 160 and 170 may be simplified because they are not required to raise the weight of system 300, which may result in lower overall cost and complexity for system 300. Simpler implementations for supports 160 and 170 may also provide for additional stability and levelness as well as reduced processing for synchronization because they are not lifting devices.

Figure 3G:
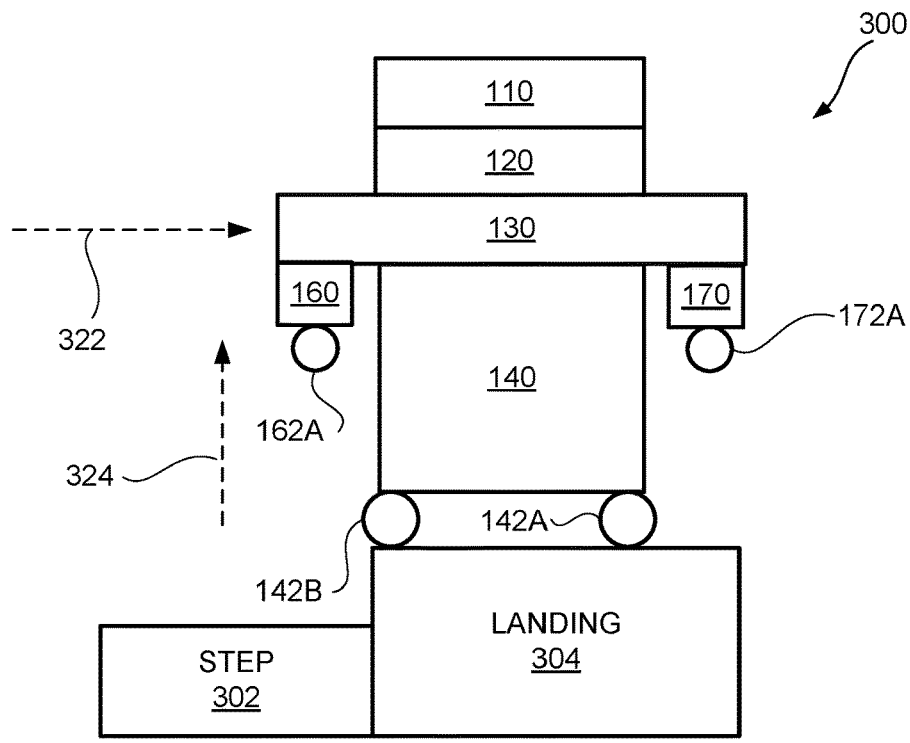
FIG. 3G is a schematic diagram showing still more operational steps of the self-elevating platform cart of FIG. 3A in accordance with certain examples of the disclosed technology.

FIG. 3G is a schematic diagram showing still more operational steps 322 and 324 of the self-elevating platform cart 300 of FIG. 3A. At 322, extensible support beams 130 are retracted and, at 324, support 160 is retracted. At this point, system 300 can be moved on the higher landing surface.

FIGS. 4A-I are schematic diagrams showing an example of operational steps involved in descending from an initial surface, i.e. a higher level surface, which is a top surface of landing 404 in this example, to a destination surface, which is a lower level surface, such as a walkway or floor in this example, in an example of a self-elevating platform cart 400 in accordance with the disclosed technology.

Figure 4A:
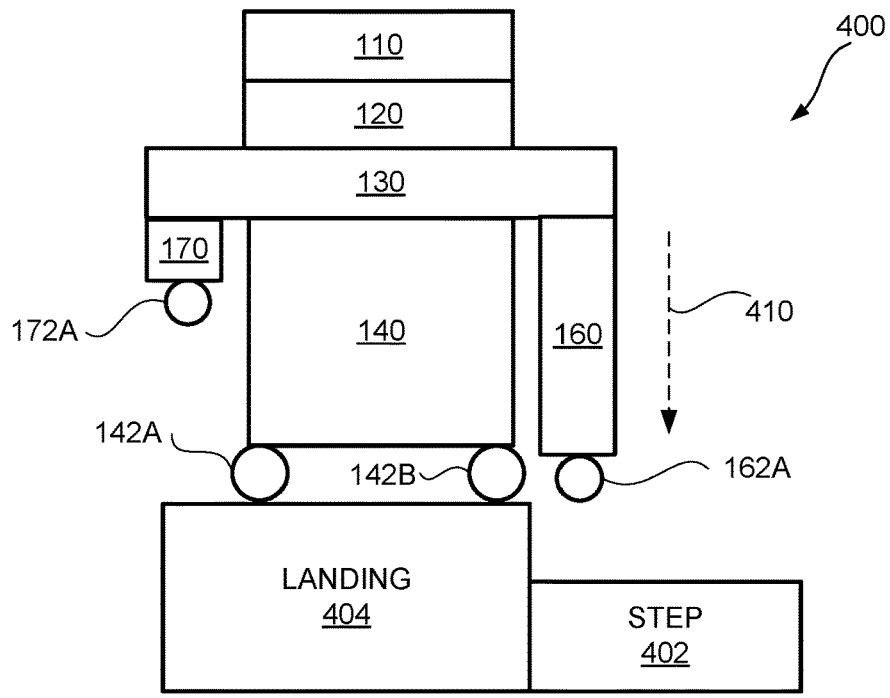
FIG. 4A is a schematic diagram showing a side view of an operational step of an illustrative example a self-elevating platform cart in descending to a lower level in accordance with certain examples of the disclosed technology.
Figure 4B:
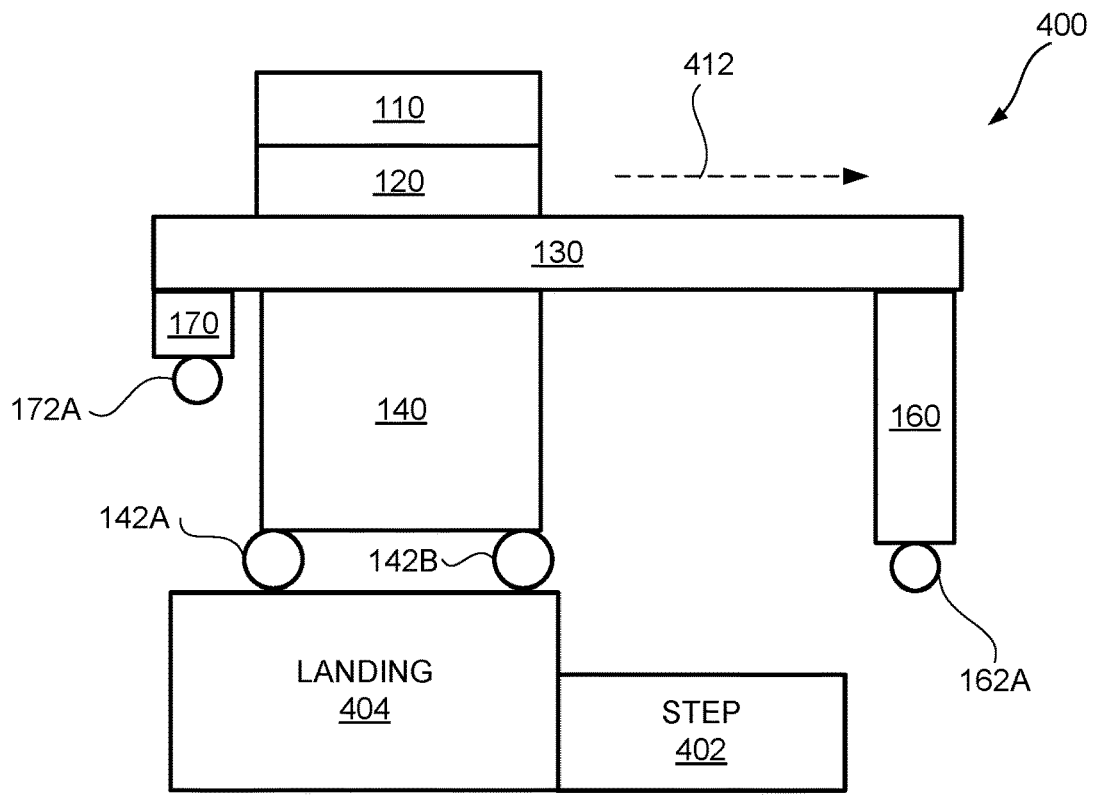
FIG. 4B is a schematic diagram showing another operational step of the self-elevating platform cart of FIG. 4A in accordance with certain examples of the disclosed technology.
Figure 4C:
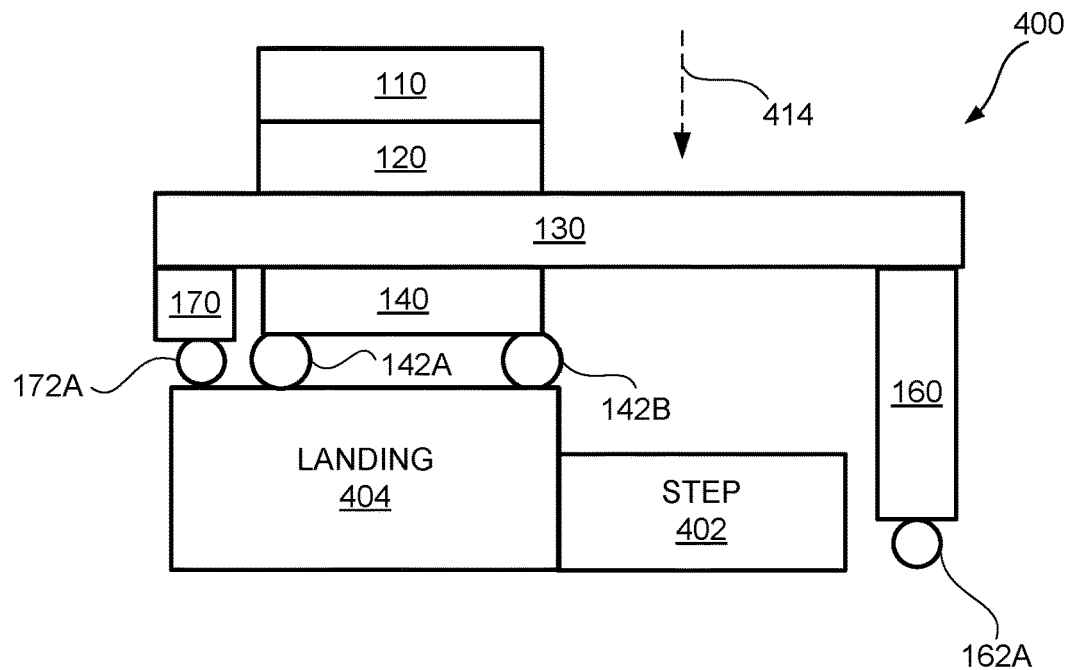
FIG. 4C is a schematic diagram showing yet another operational step of the self-elevating platform cart of FIG. 4A in accordance with certain examples of the disclosed technology.

FIG. 4A shows operational step 410 wherein support 160 is lowered in preparation for contact with the destination surface. FIG. 4B shows operational step 412 wherein extensible support beams 130 are extended such that support 160 is positioned above the destination surface. FIG. 4C shows operational step 414 wherein main lift 140 is retracted to lower system 400 such that wheels 162 of height support 160 contact the destination surface and the wheels 172 of height support 170 contact the initial surface.

In the example shown, height supports 160 and 170 are aligned such that they each make contact with their respective surfaces at the same time. In other examples, the main lift can be retracted to lower system 400 until wheels 172 contact the initial surface and then height support 160 can be extended until wheels 162 contact the step surface. Other variations of these operations are also possible without departing from the disclosed technology.

Figure 4D:
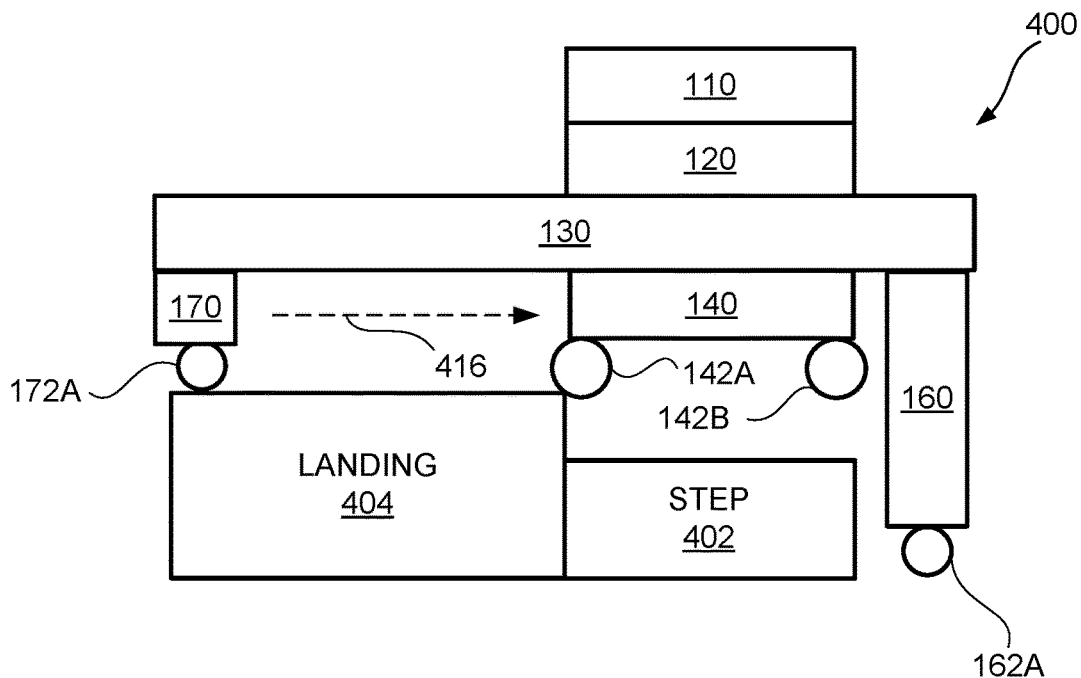
FIG. 4D is a schematic diagram showing still another operational step of the self-elevating platform cart of FIG. 4A in accordance with certain examples of the disclosed technology.
Figure 4E:
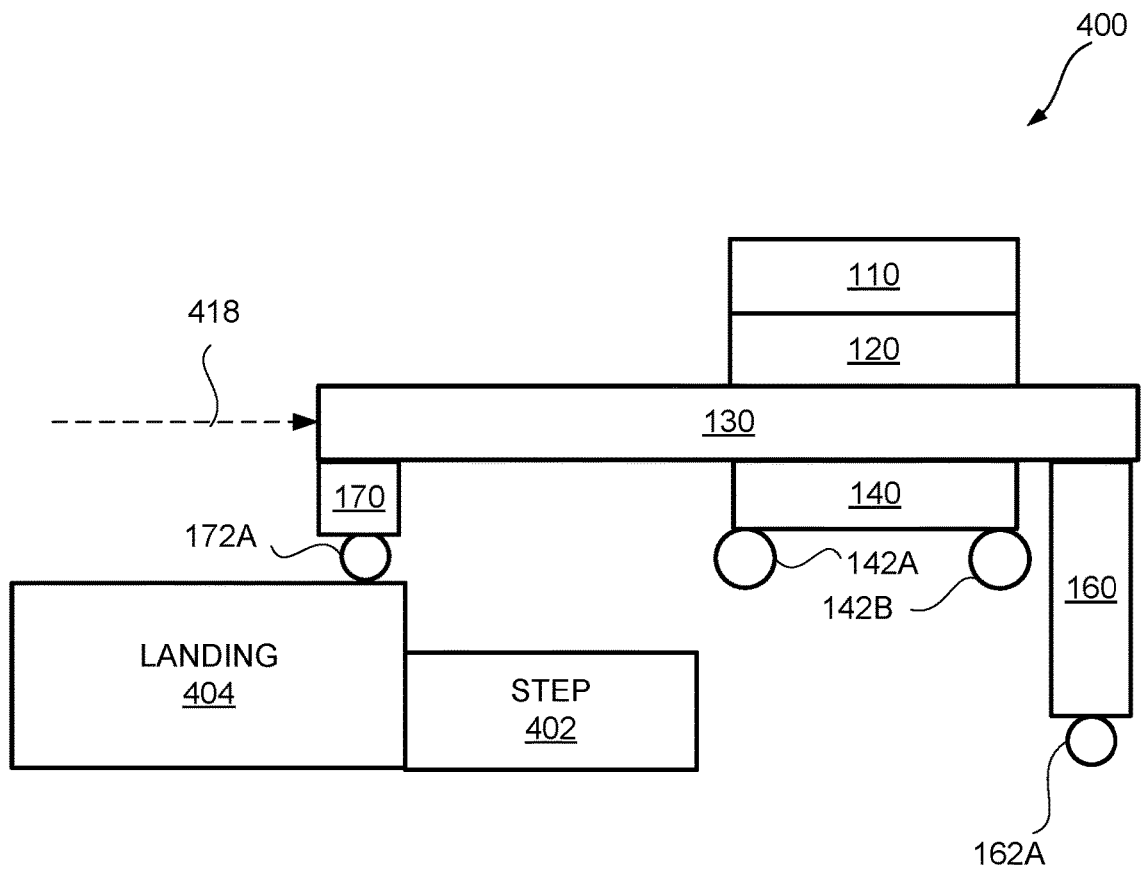
FIG. 4E is a schematic diagram showing still yet another operational step of the self-elevating platform cart of FIG. 4A in accordance with certain examples of the disclosed technology.
Figure 4F:
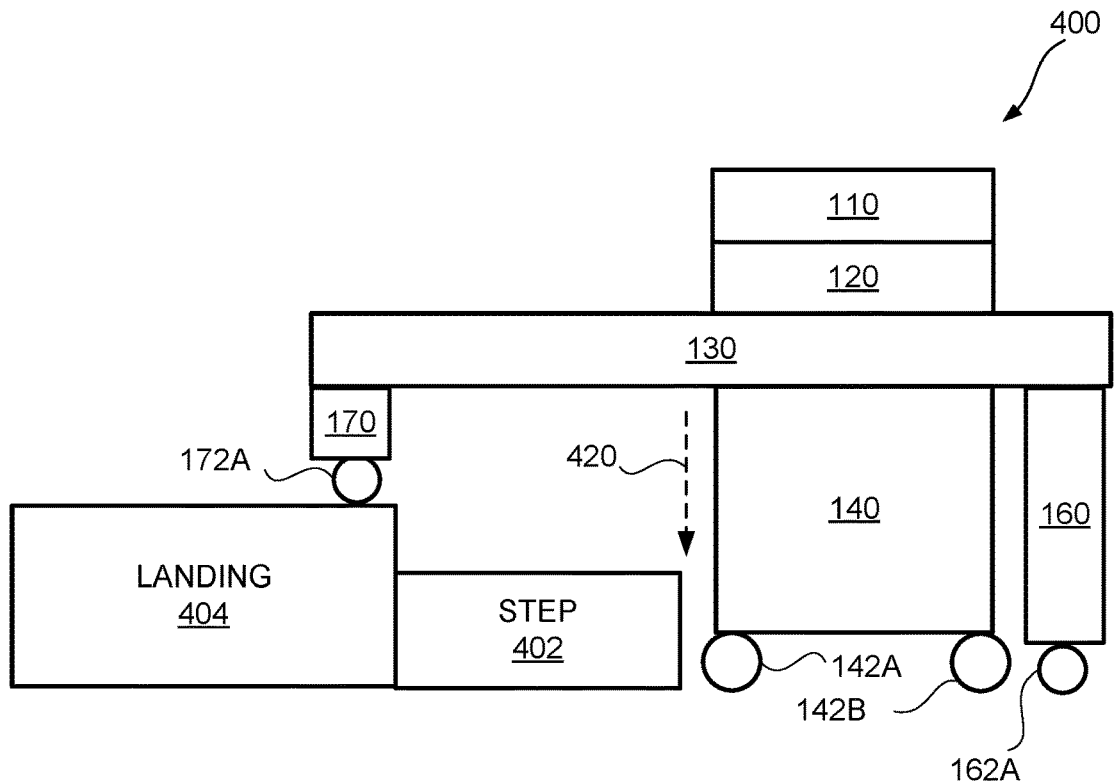
FIG. 4F is a schematic diagram showing still yet another operational step of the self-elevating platform cart of FIG. 4A in accordance with certain examples of the disclosed technology.

FIG. 4D shows operational step 416 wherein extensible support beams 130 are actuated to shift main body 120 along with load platform 110 and main lift 140 in a direction towards support 170. FIG. 4E is a schematic diagram showing still yet another operational step 418 of moving self-elevating platform cart 400 in a direction towards support 170 such that wheels 142 of main lift 140 are positioned above the destination surface. FIG. 4F shows operational step 420 wherein main lift 140 is extended such that wheels 142 contact the destination surface.

Figure 4G:
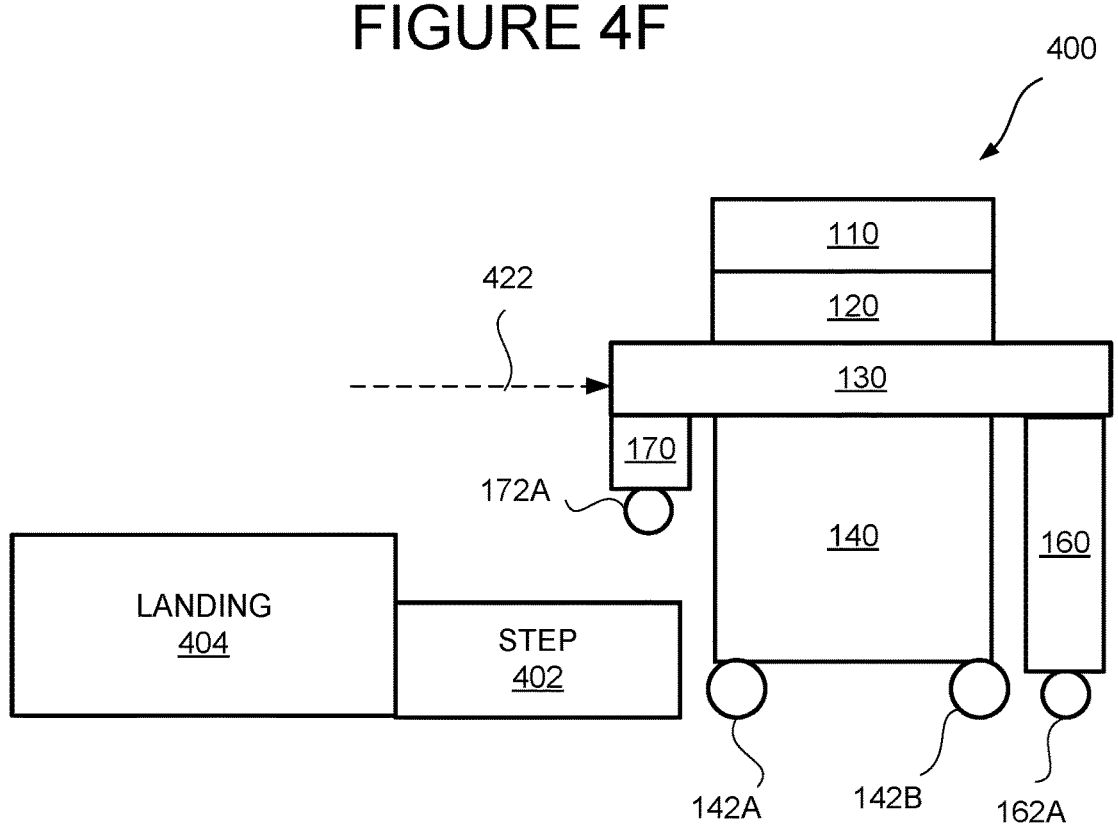
FIG. 4G is a schematic diagram showing a further operational step of the self-elevating platform cart of FIG. 4A in accordance with certain examples of the disclosed technology.
Figure 4H:
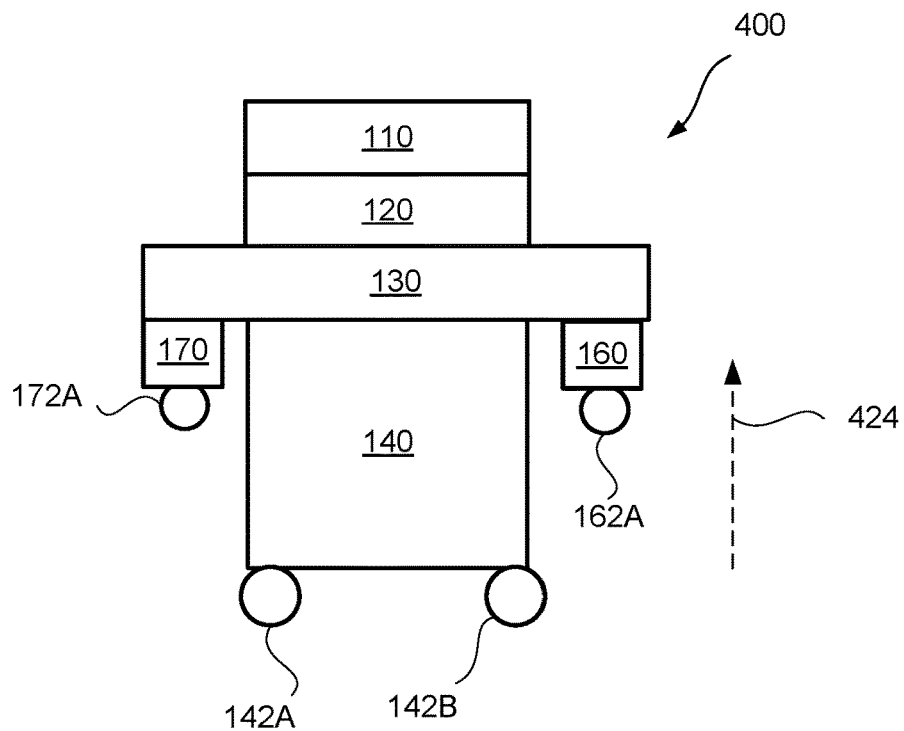
FIG. 4H is a schematic diagram showing a yet further operational step of the self-elevating platform cart of FIG. 4A in accordance with certain examples of the disclosed technology.
Figure 4I:
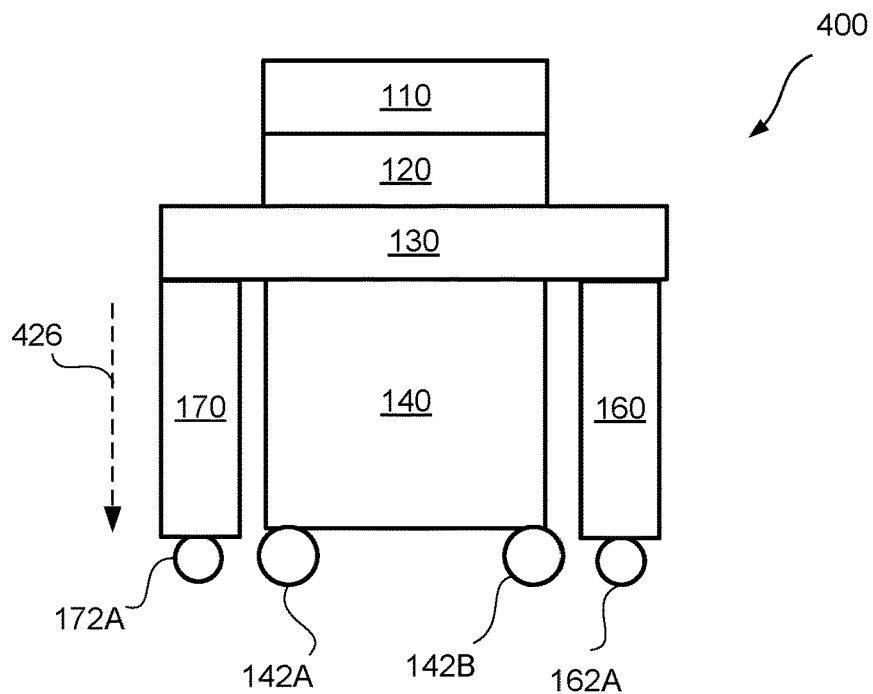
FIG. 4I is a schematic diagram showing a yet still further operational step of the self-elevating platform cart of FIG. 4A in accordance with certain examples of the disclosed technology.

FIG. 4G is a schematic diagram showing a further operational step 422 wherein extensible support 130 is retracted along with support 170. FIG. 4H is a schematic diagram showing a yet further operational step 424 of the self-elevating platform cart to retract support 160. FIG. 4I is a schematic diagram showing an alternative operational step of the self-elevating platform cart wherein support 170 is extended to make contact with the destination surface. The choice of whether supports 160 and 170 are retracted or extended during movement of system 400 for transportation is a matter of design choice and both are consistent with the disclosed technology.

Note that in some simplified examples of a self-elevating platform cart according to the disclosed technology, one of the supports 160 or 170 can be replaced with a fixed support with an attached wheel 162 or 172, respectively. In some examples where the system is designed for movement to a predetermined height, the length of the fixed support can be selected to accommodate the predetermined height. In other examples, main lift 140 can be controlled to bring the wheel attached to the fixed support into contact with a destination or initial surface, depending on whether the system is ascending or descending from the initial surface to the destination surface. The elimination of one of the supports may lower the cost and complexity of the system in these examples.

Figure 5A:
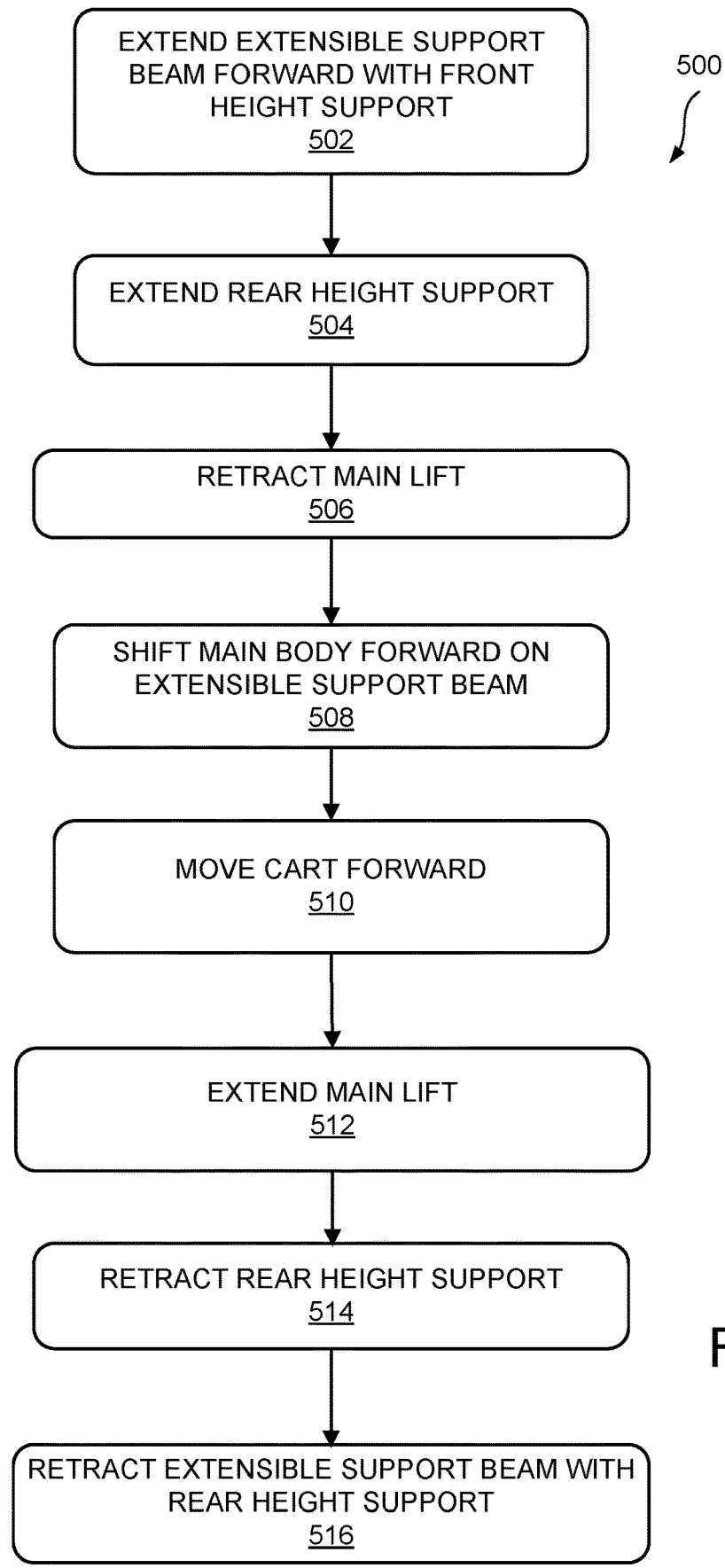
FIG. 5A is a control flow diagram showing an illustrative example of a control process for a self-elevating platform cart ascending to a higher level in accordance with the disclosed technology.

FIG. 5A is a control flow diagram showing an illustrative example of a control process 500 for a self-elevating platform cart, e.g. a cart, ascending from an initial surface to a destination surface, where the destination surface is at a higher level than the initial surface, such as ascending from a walkway or floor to a stair landing.

At 502, an extensible support, e.g. extensible support 130, is extended with a front height support, e.g. support 160, such that the support is positioned above the destination surface with a wheel in contact with the destination surface. Note that, as discussed above, the support may be extended or retracted in order to accommodate the destination surface and place a wheel on the support in contact with the destination surface.

Also note, as discussed above, that main lift 140 may also be utilized to control the relative position of the support to accommodate the destination surface. Further note that a braking force may be applied to the wheels of the support in some examples.

Note that contact with a surface can be detected in a number of ways, such as through a pressure sensor in a wheel of the support, a current sensor measuring current drawn by an actuator for the support, a proximity sensor mounted on the support, an acoustic or sonar sensor, or an optical sensor. It will be appreciated that a variety of approaches are suitable for detecting contact with a surface that can be utilized in the disclosed technology.

At 504, a rear height support, e.g. support 170, is extended such that a wheel attached to the rear height support contacts the initial surface. The front and rear height supports are positioned, at this point, to support the weight of the self-elevating platform cart.

At 506, the main lift, e.g. main lift 140, is retracted sufficiently to accommodate the destination surface, e.g. such that wheels on the main lift are at the same level as the destination surface or higher than the destination surface. At 508, the main body, e.g. main body 120, of the cart along with the load platform, e.g. platform 110, and the main lift is moved forward toward the front height support.

At 510, the cart is moved forward in the direction of the front height support so that the wheels on the main lift are in contact with the destination surface or above the destination surface. If the wheels on the main lift are above the destination surface, then the main lift may be lowered so the wheels of the main lift contact the destination surface. Note that the cart can be moved using one or more motors to drive at least some of the wheels of the supports.

At 512, the main lift is extended to lift the cart to its initial height. Note that a braking force can be applied to one or more of the wheels of the main lift to prevent the cart from rolling. At 514, the rear height support is retracted. At 516, the extensible support with the rear height support is retracted. At this point, the cart can be moved on the destination surface.

Figure 5B:
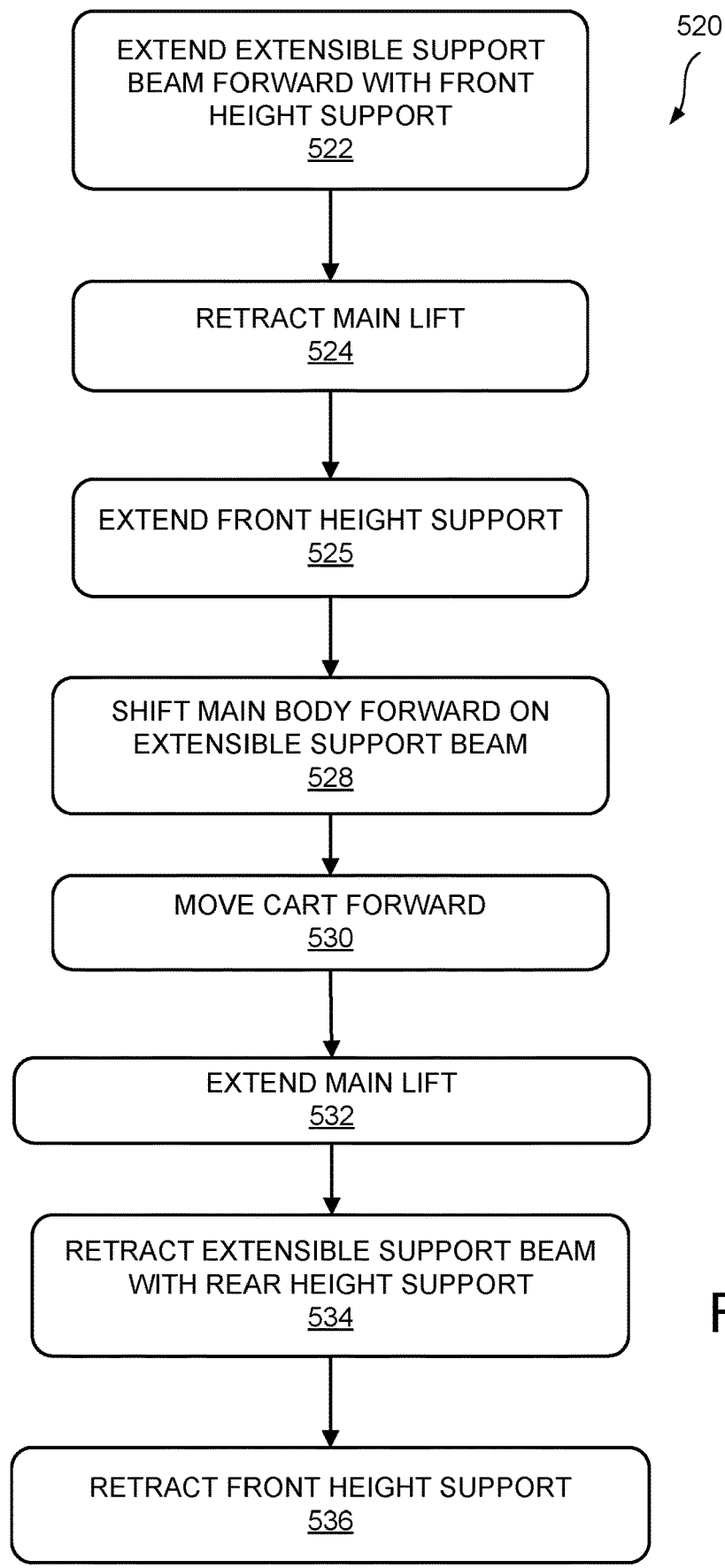
FIG. 5B is a control flow diagram showing an illustrative example of a control process for a self-elevating platform cart descending to a lower level in accordance with the disclosed technology.

FIG. 5B is a control flow diagram showing an illustrative example of a control process 520 for a self-elevating platform cart, e.g. a cart, descending from an initial surface to a destination surface, where the destination surface is at a lower level than the initial surface, such as descending from a stair landing to a walkway or floor.

At 522, an extensible support, e.g. extensible support 130, is extended with a front height support, e.g. support 160, such that the support is positioned above the destination surface. At 524, a main lift of the cart is retracted to lower the cart, e.g. until wheels 172 contact the initial surface. In some examples, a rear height support, e.g. support 170, can be extended until wheels 172 contact the initial surface. At 525, the front height support is extended until a wheel on the support contacts the destination surface.

At this point, the front and rear height supports are in position to support the weight of the cart. Note that a braking force can be applied to one or more wheels of the supports to prevent the cart from rolling. Also note that, in some examples, the rear height support may be replaced with a fixed support and the main lift lowers until a wheel of the fixed support contacts the initial surface.

At 528, the main body along with load platform 110 and main lift 140 are moved forward toward the front height support, which can be performed through coordinated actuation of the extensible support beams.

At 530, the cart is moved forward to a position where wheels on the main lift are above the destination surface. At 532, the main lift is extended until the wheels on the main lift contact the destination surface. At 534, the extensible support with the rear height support is retracted. At 536, the front height support can be retracted. At this point, the cart is ready to be moved on the destination surface.

Figure 5C:
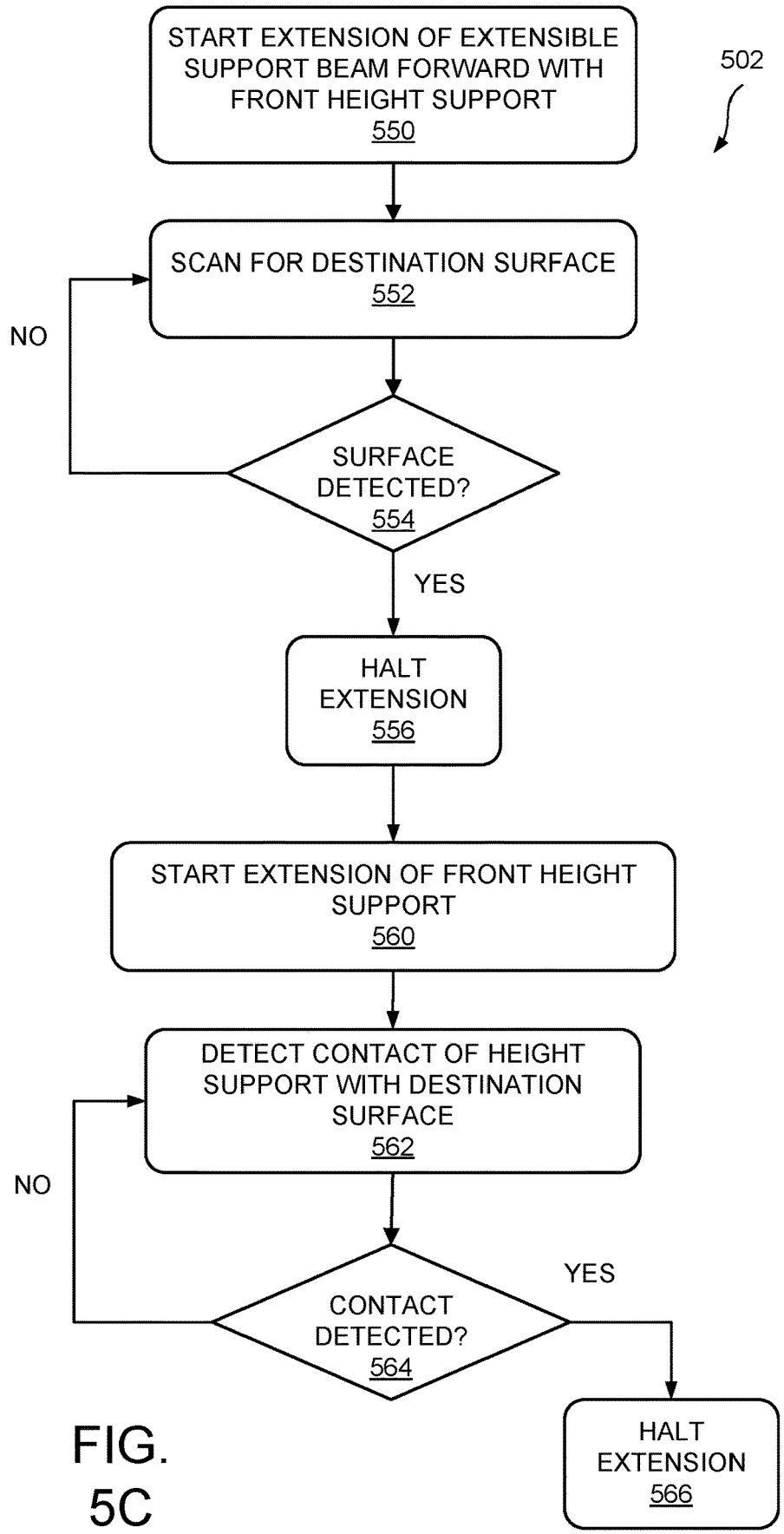
FIG. 5C is a control flow diagram showing an illustrative example of a process for extension of a support of a self-elevating platform cart ascending to a higher level in accordance with the disclosed technology.

FIG. 5C is a control flow diagram showing an illustrative example for a process for step 502 of FIG. 5A for extension of a support of a self-elevating platform cart ascending to a destination surface where a sensor is utilized to detect the destination surface in accordance with the disclosed technology. For example, this process may be employed with the example of FIG. 2B where a proximity sensor 224 or 226 is attached to a distal end of extensible support beam 222 and used to detect a surface.

At 550, in this example, extension of an extensible support with the front height support is started. At 552, scanning is performed, such as using a proximity sensor, laser detector or optical detector, to detect the destination surface, e.g. a stair landing. Scanning continues until, at 554, the destination surface is detected and control branches to 556 to halt extension of the extensible support.

At 560, extension of the front height support is started. At 562, sensors, such as a pressure sensor or actuator current sensor, are monitored to detect contact of the front height support wheels with the destination surface. When contact is detected at 564, control branches to 566 to halt extension of the front height support. At this point, the wheels of the front height support are in contact with the destination surface.

Figure 5D:
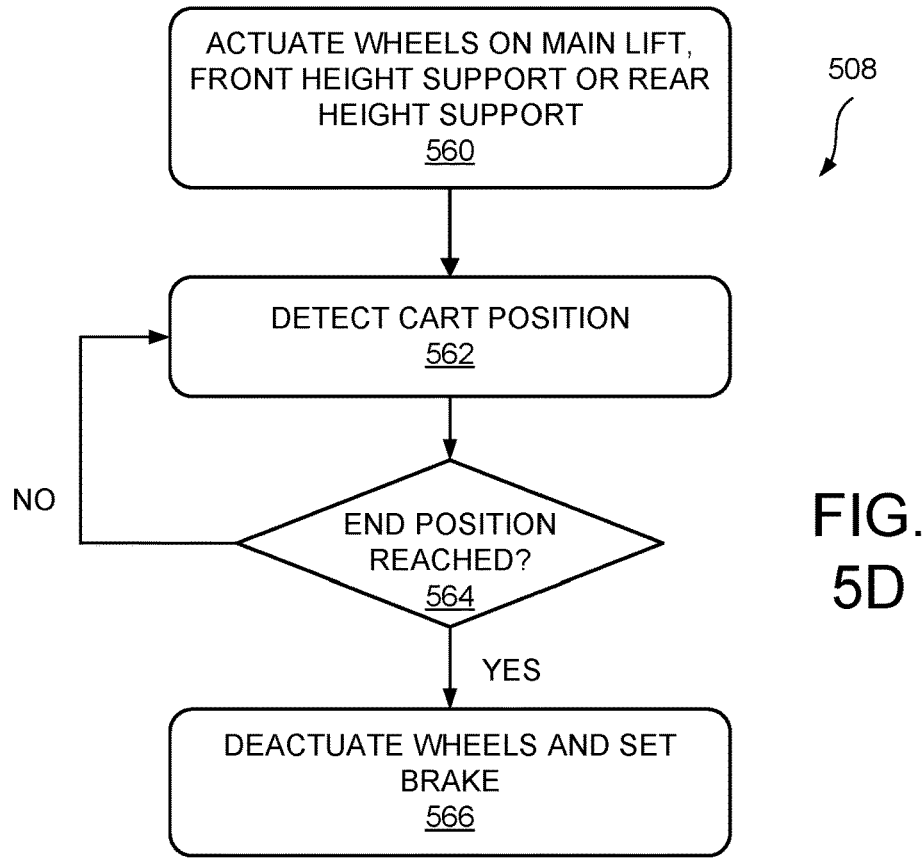
FIG. 5D is a control flow diagram showing an illustrative example of a process for control of cart movement in a self-elevating platform cart in accordance with the disclosed technology.

FIG. 5D is a control flow diagram showing an illustrative example of a process for step 510 of FIG. 5A for control of cart movement in a self-elevating platform cart in accordance with the disclosed technology. At 560, wheels on one or more of the main lift, the front height support or the rear height support are activated to drive the wheels and move the cart forward.

At 562, sensors can scan for a position of the cart. For example, position encoders can detect a position of the cart or a distance that the cart has moved. In another example, proximity or optical sensors can scan for an object that the cart is moving towards. In still another example, user input can be monitored for a control command from a user to stop movement of the cart.

At 564, when an end position is reached, such as travelling a predetermined distance, detecting an object in front of the cart or receiving a stop command, control branches to 566 to deactivate the wheels to stop movement. Brakes on the wheels can also be applied to help stop movement and maintain position of the cart.

Figure 5E:
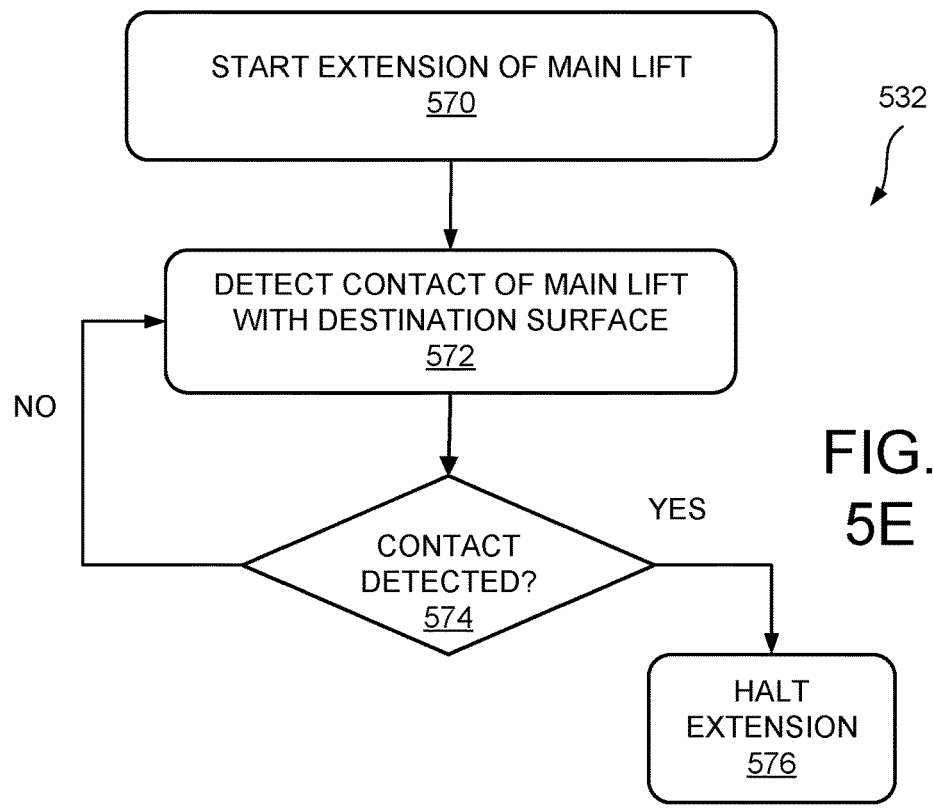
FIG. 5E is a control flow diagram showing an illustrative example of a process for control of main lift extension in a self-elevating platform cart in accordance with the disclosed technology.

FIG. 5E is a control flow diagram showing an illustrative example of a process for the step 532 of FIG. 5B for control of main lift extension in a self-elevating platform cart in accordance with the disclosed technology. At 570, extension of the main lift is started.

At 572, sensor, such as pressure sensors or motor current sensors, are monitored to detect contact with a destination surface. When contact is detected at 574, control branches to 576 to halt extension of the main lift.

Figure 5F:
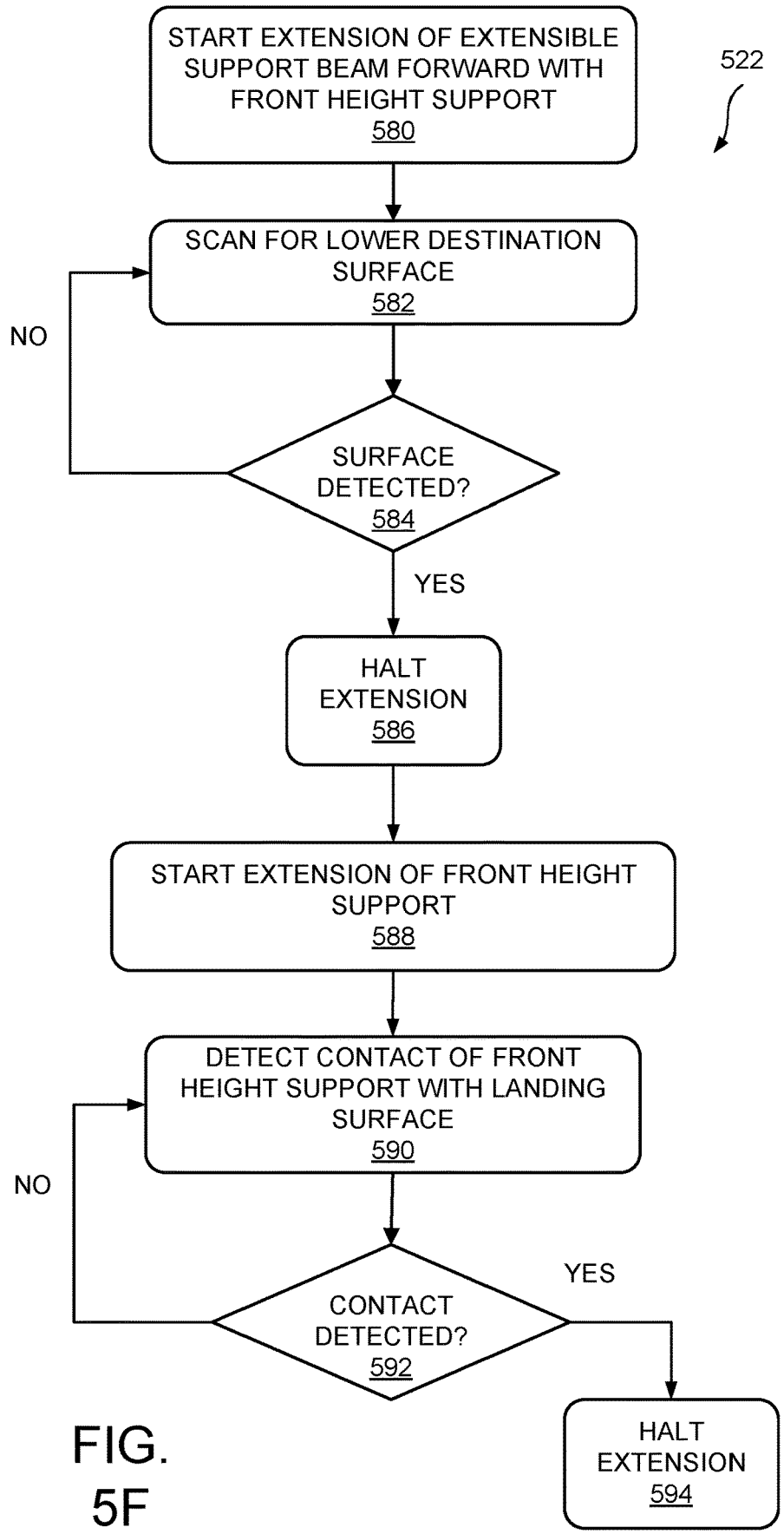
FIG. 5F is a control flow diagram showing an illustrative example of a process for extension of a support of a self-elevating platform cart descending to a lower level in accordance with the disclosed technology.

FIG. 5F is a control flow diagram showing an illustrative example of a process for step 522 of FIG. 5B for extension of a support of a self-elevating platform cart descending to a destination surface where a sensor is utilized to detect the destination surface in accordance with the disclosed technology. For example, this process may be employed with the example of FIG. 2B where a proximity sensor 224 or 226 is attached to a distal end of extensible support beam 222 and used to detect a surface.

At 580, extension of an extensible support with the front height support is started. At 582, scanning is performed, such as using a proximity sensor, laser detector or optical detector, to detect the destination surface, e.g. a stair landing. Scanning continues until, at 584, the destination surface is detected and control branches to 586 to halt extension of the extensible support.

Note that in the case of descending, detection of the destination surface can be complicated if there are multiple intervening surfaces, e.g. step treads, that are lower than the initial surface, but above the destination surface. In one example, an extensible support with a sensor at its distal end can be extended and the distance of extension measured until a surface with sufficient area for the cart to land is detected. If an operational limit of the extensible support is reached within detecting a surface with sufficient area, the descending operation can be terminated.

At 588, extension of the front height support is started. At 590, sensors, such as a pressure sensor or actuator current sensor, are monitored to detect contact of the front height support wheels with the destination surface. When contact is detected at 592, control branches to 594 to halt extension of the front height support. At this point, the wheels of the front height support are in contact with the destination surface.

Figure 6A:
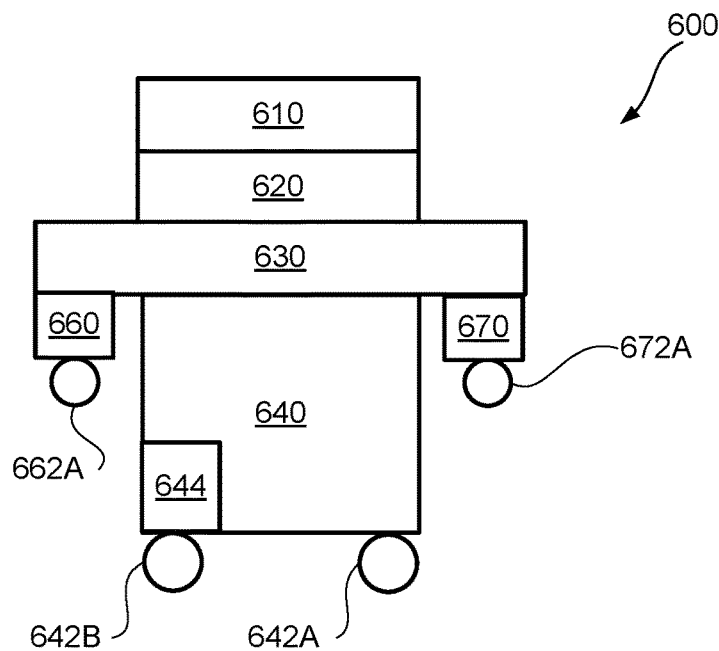
FIG. 6A is a schematic diagram showing a side view of another illustrative example a self-elevating platform cart configured to climb multiple steps in ascending to a higher level in accordance with certain examples of the disclosed technology.
Figure 6B:
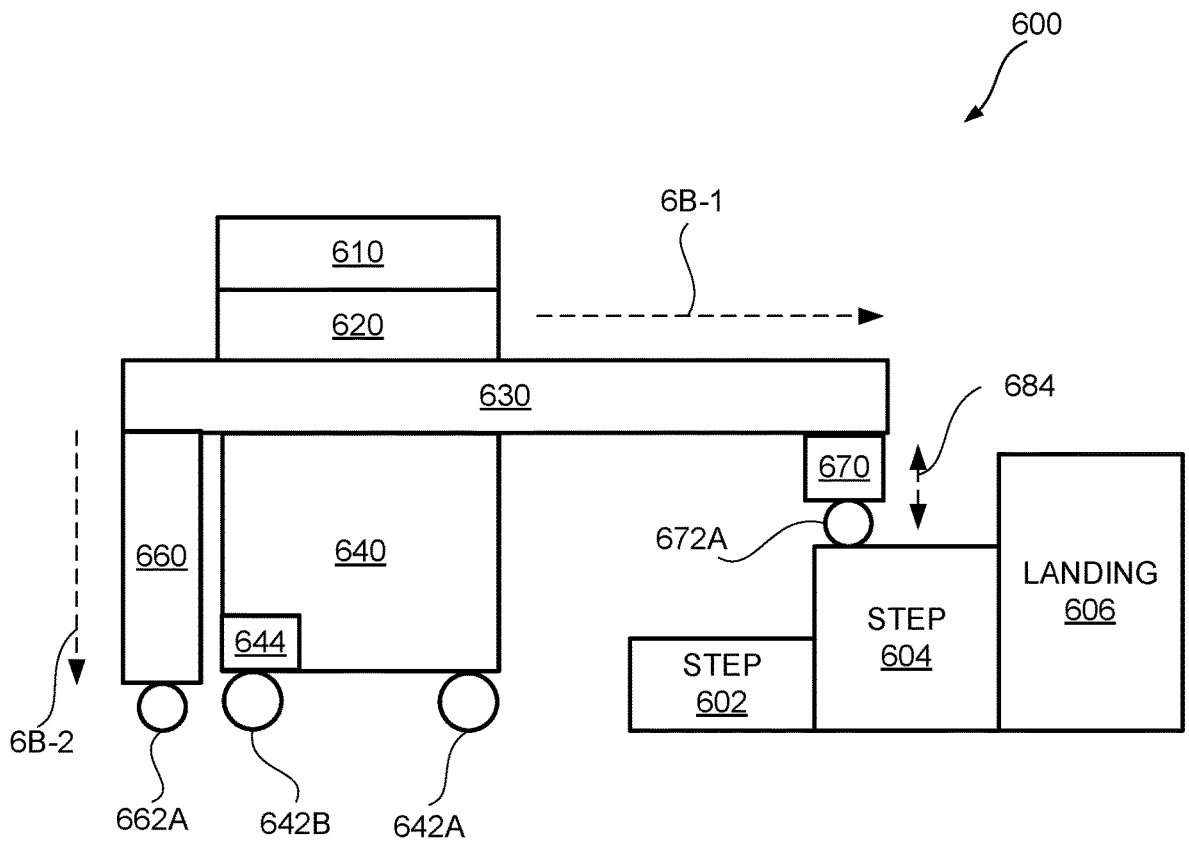
FIG. 6B is a schematic diagram showing an operational step of the self-elevating platform cart of FIG. 6A in accordance with certain examples of the disclosed technology.
Figure 6C:
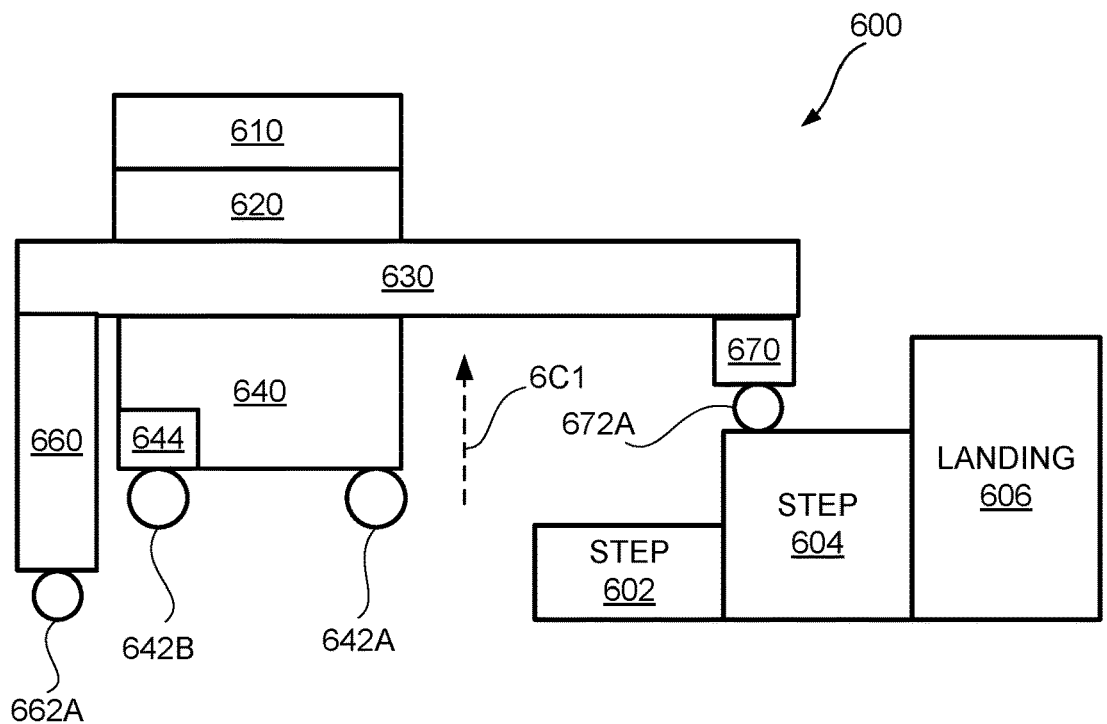
FIG. 6C is a schematic diagram showing another operational step of the self-elevating platform cart of FIG. 6A in accordance with certain examples of the disclosed technology.
Figure 6D:
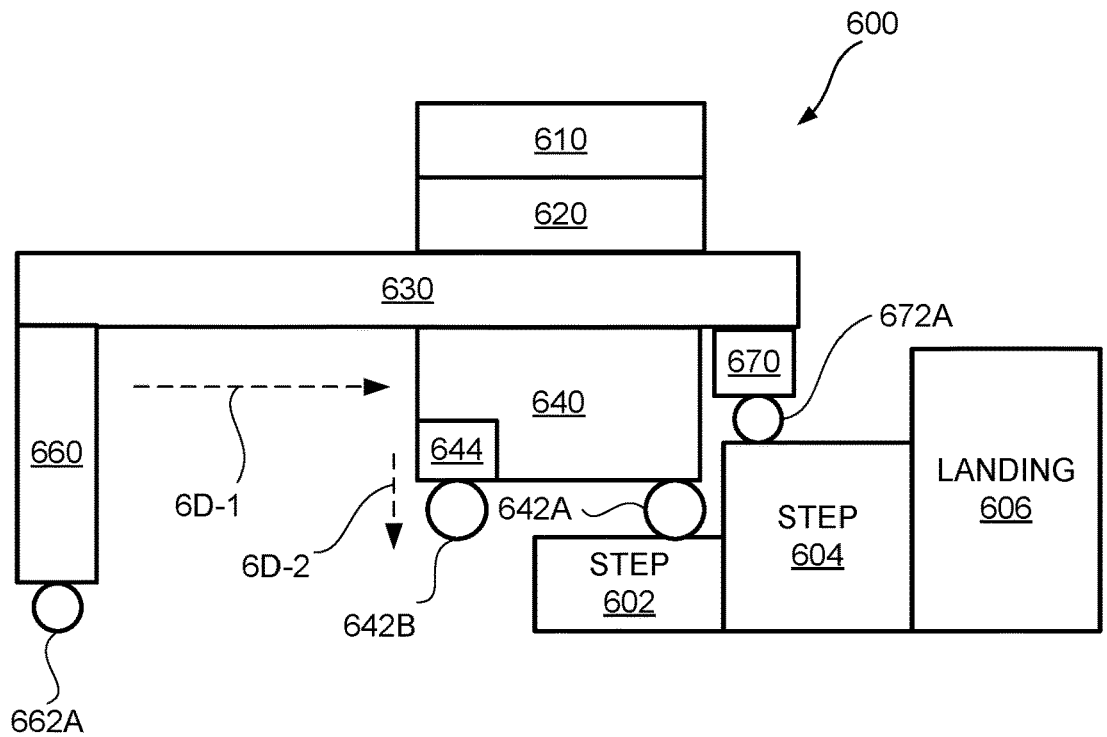
FIG. 6D is a schematic diagram showing still another operational step of the self-elevating platform cart of FIG. 6A in accordance with certain examples of the disclosed technology.
Figure 6E:
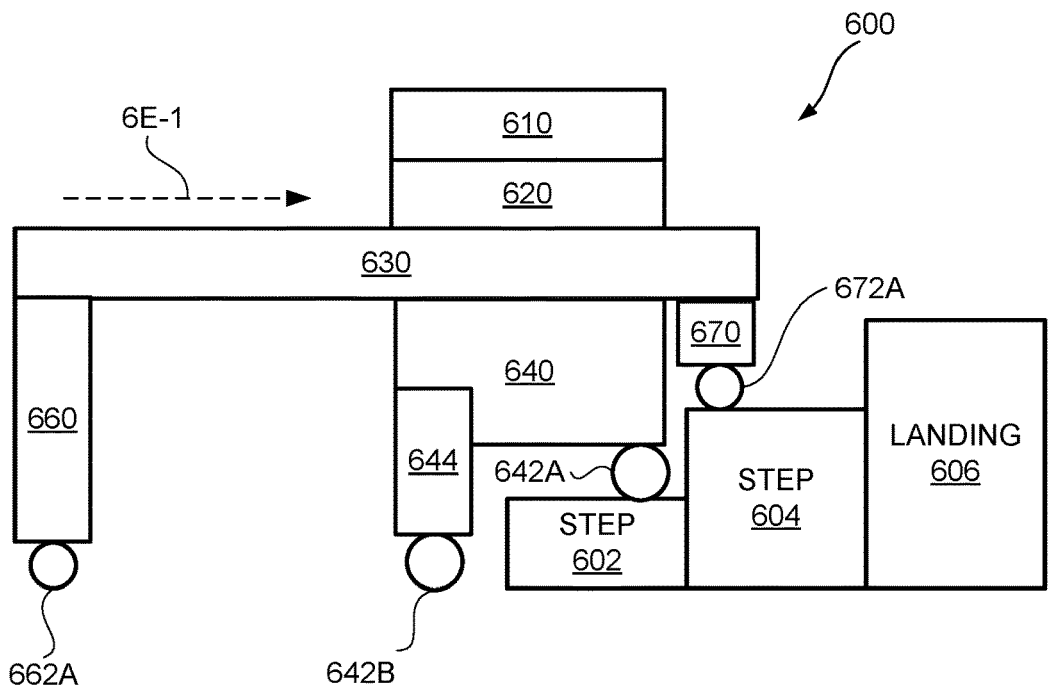
FIG. 6E is a schematic diagram showing still yet another operational step of the self-elevating platform cart of FIG. 6A in accordance with certain examples of the disclosed technology.
Figure 6F:
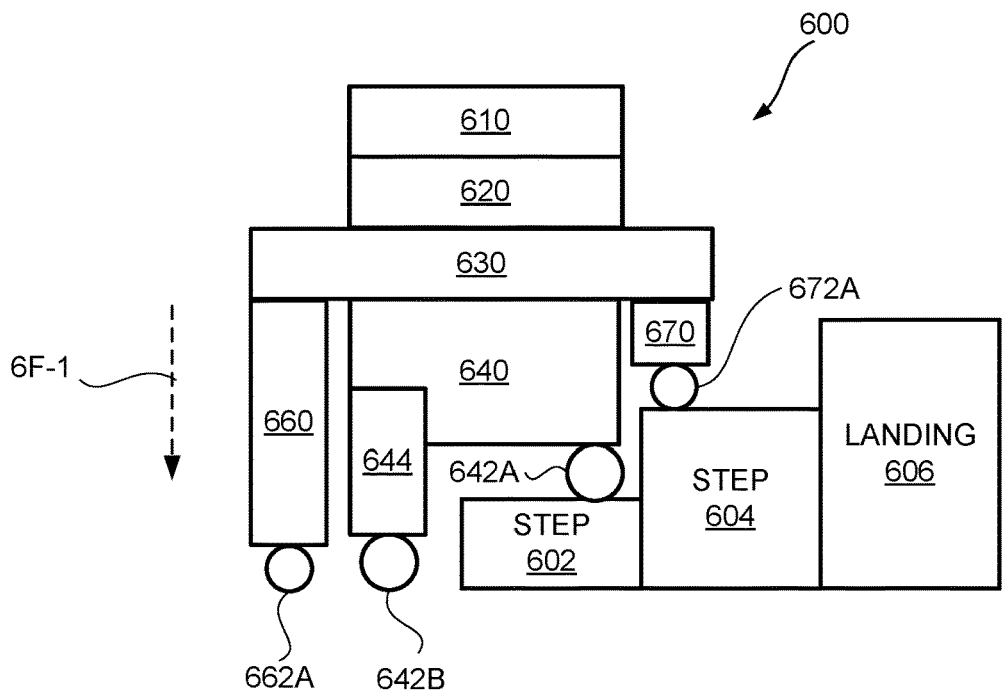
FIG. 6F is a schematic diagram showing still yet another operational step of the self-elevating platform cart of FIG. 6A in accordance with certain examples of the disclosed technology.
Figure 6G:
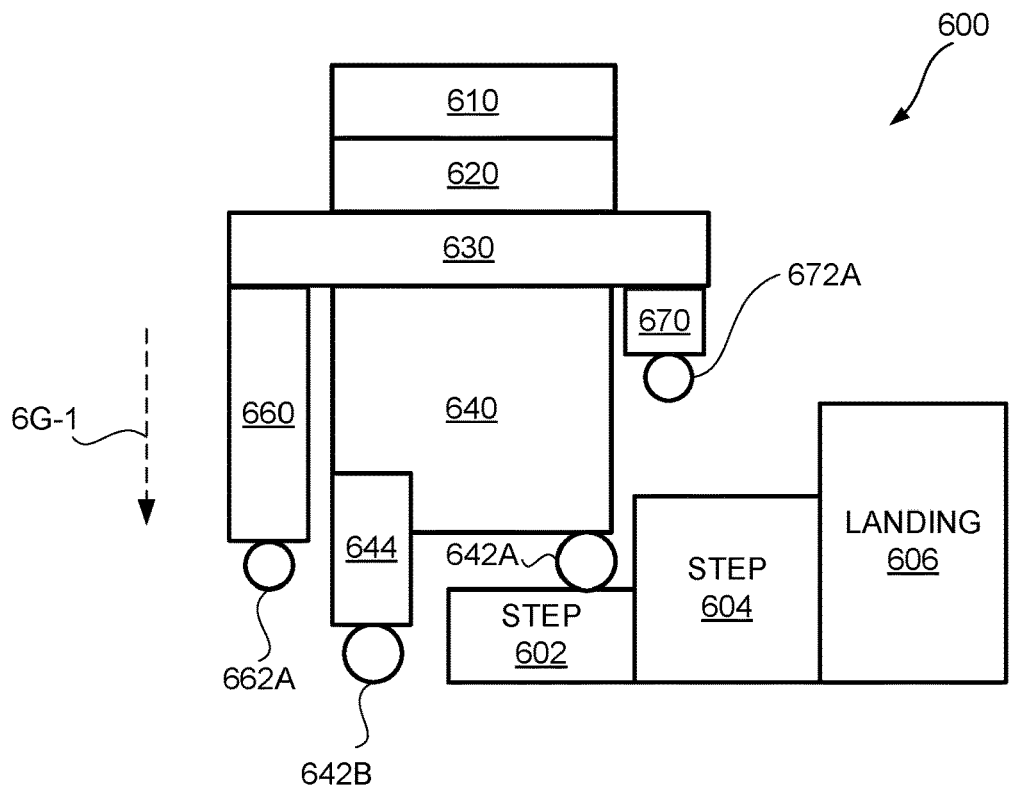
FIG. 6G is a schematic diagram showing another operational step of the self-elevating platform cart of FIG. 6A in accordance with certain examples of the disclosed technology.
Figure 6H:
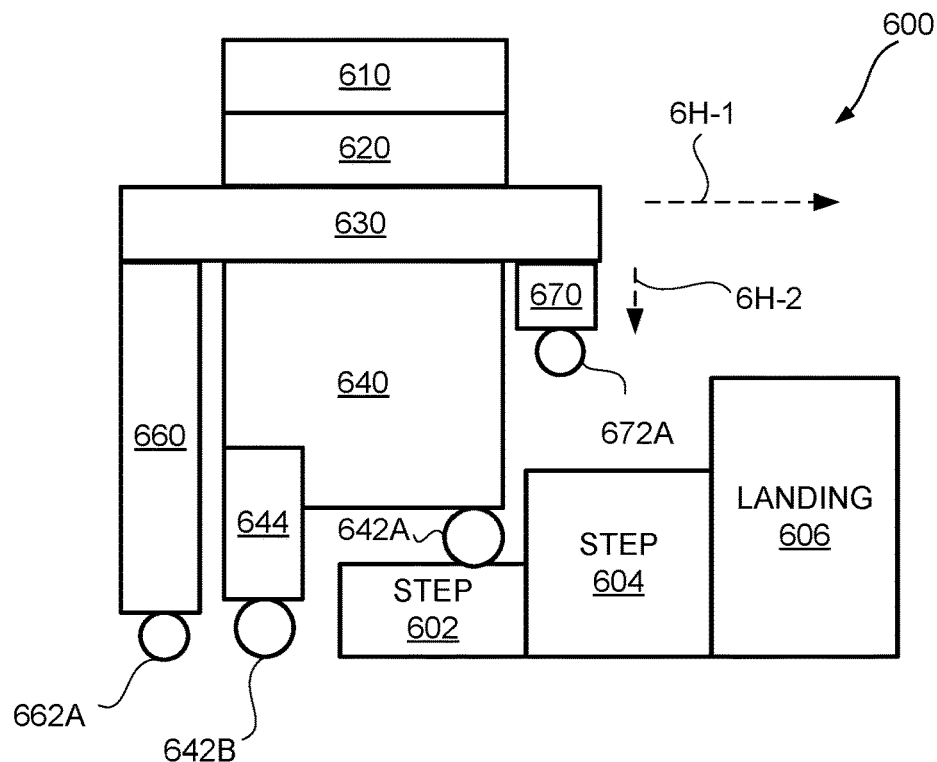
FIG. 6H is a schematic diagram showing another operational step of the self-elevating platform cart of FIG. 6A in accordance with certain examples of the disclosed technology.
Figure 6I:
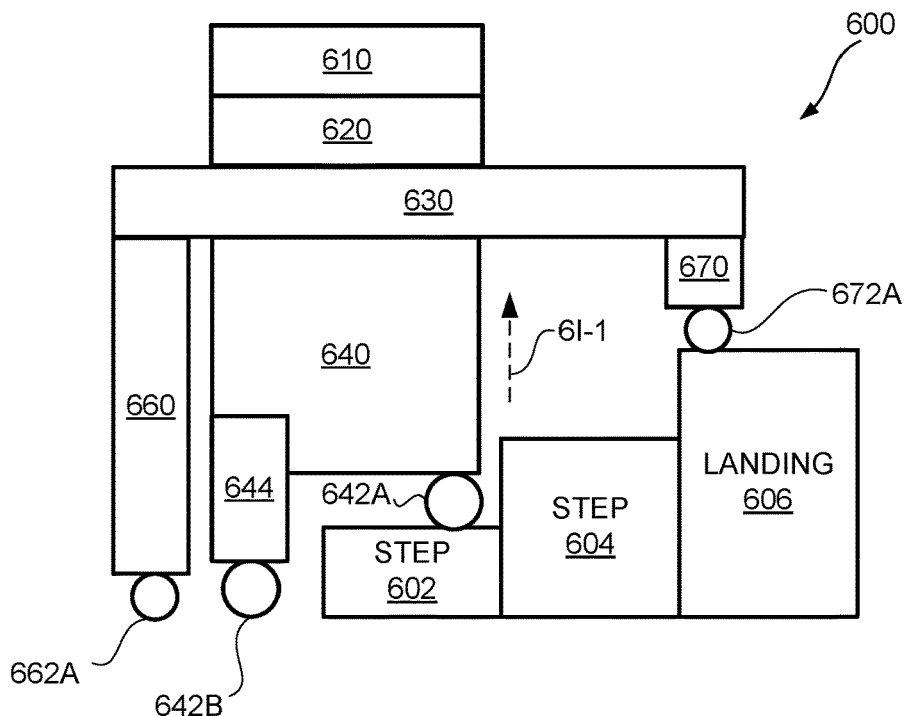
FIG. 6I is a schematic diagram showing another operational step of the self-elevating platform cart of FIG. 6A in accordance with certain examples of the disclosed technology.
Figure 6J:
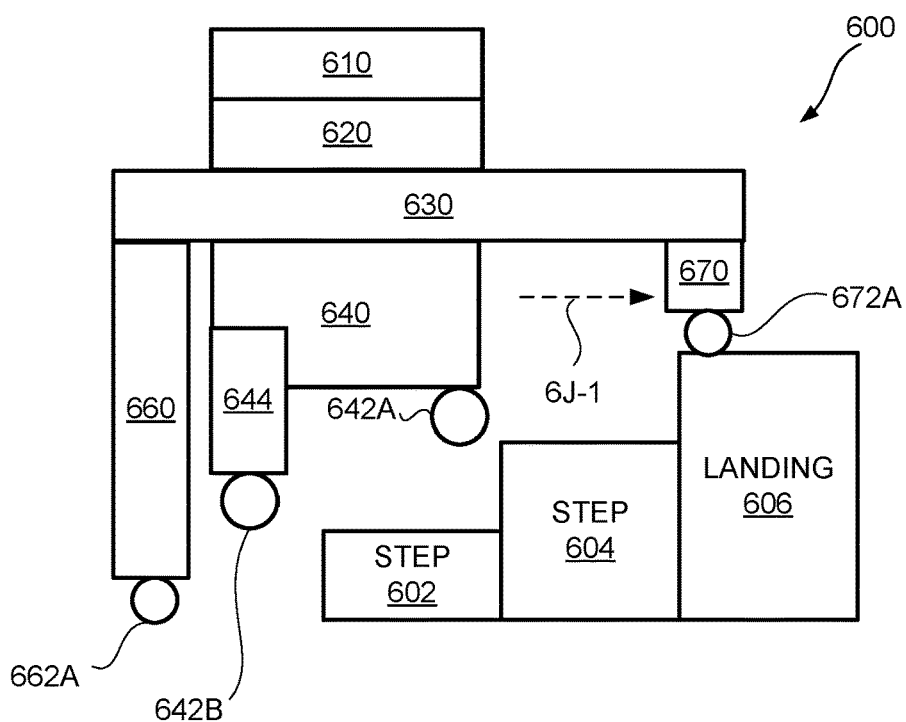
FIG. 6J is a schematic diagram showing another operational step of the self-elevating platform cart of FIG. 6A in accordance with certain examples of the disclosed technology.
Figure 6K:
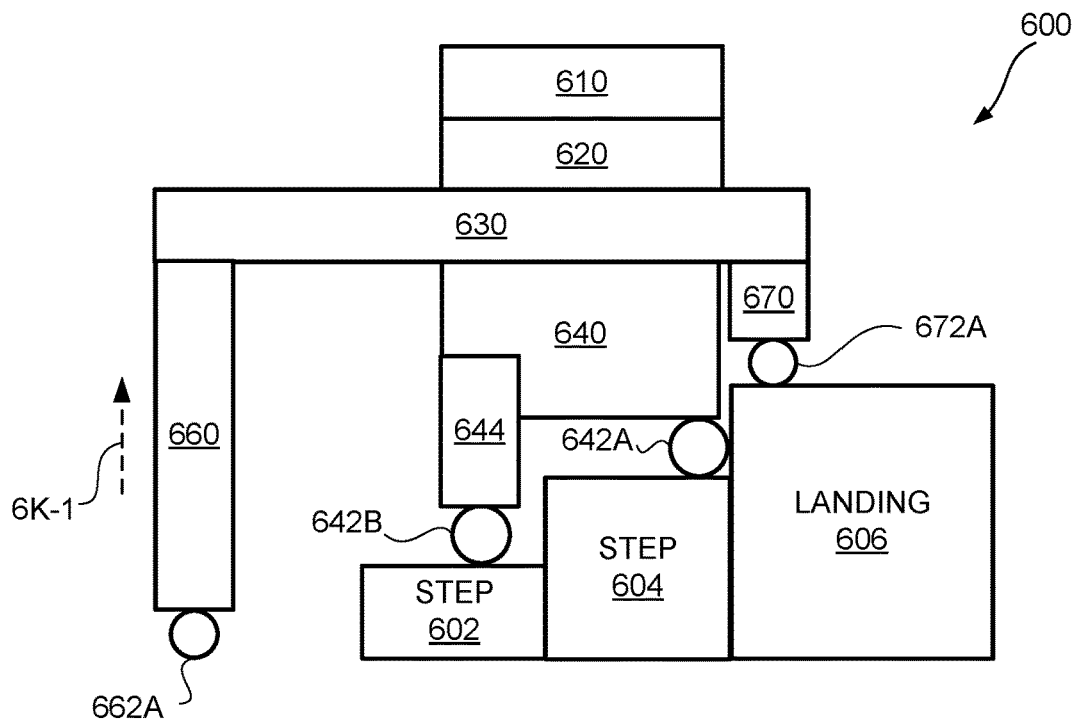
FIG. 6K is a schematic diagram showing another operational step of the self-elevating platform cart of FIG. 6A in accordance with certain examples of the disclosed technology.
Figure 6L:
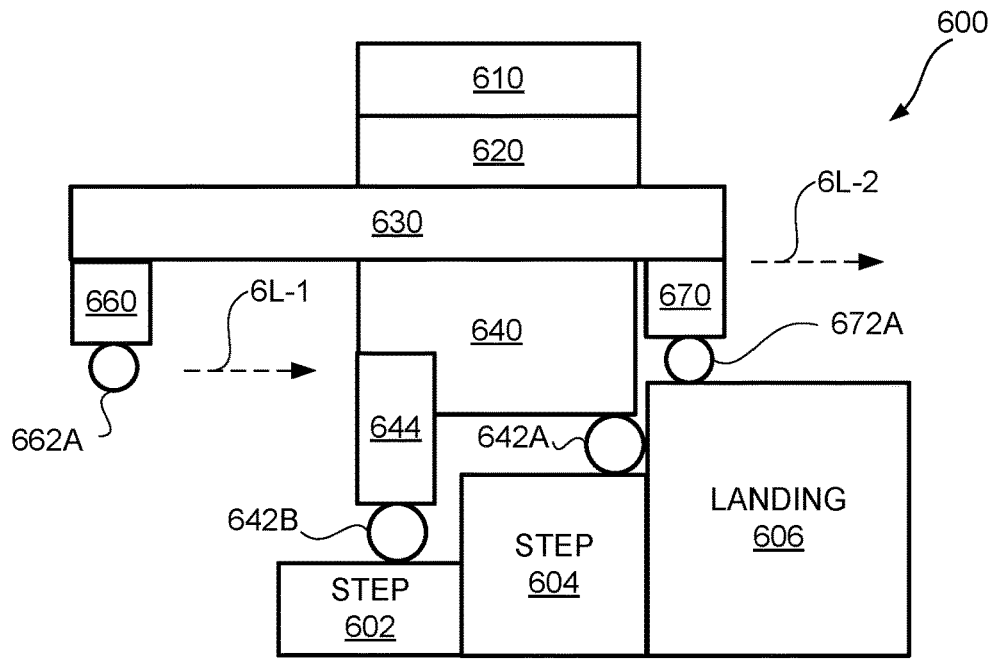
FIG. 6L is a schematic diagram showing still more operational steps of the self-elevating platform cart of FIG. 6A in accordance with certain examples of the disclosed technology.
Figure 6M:
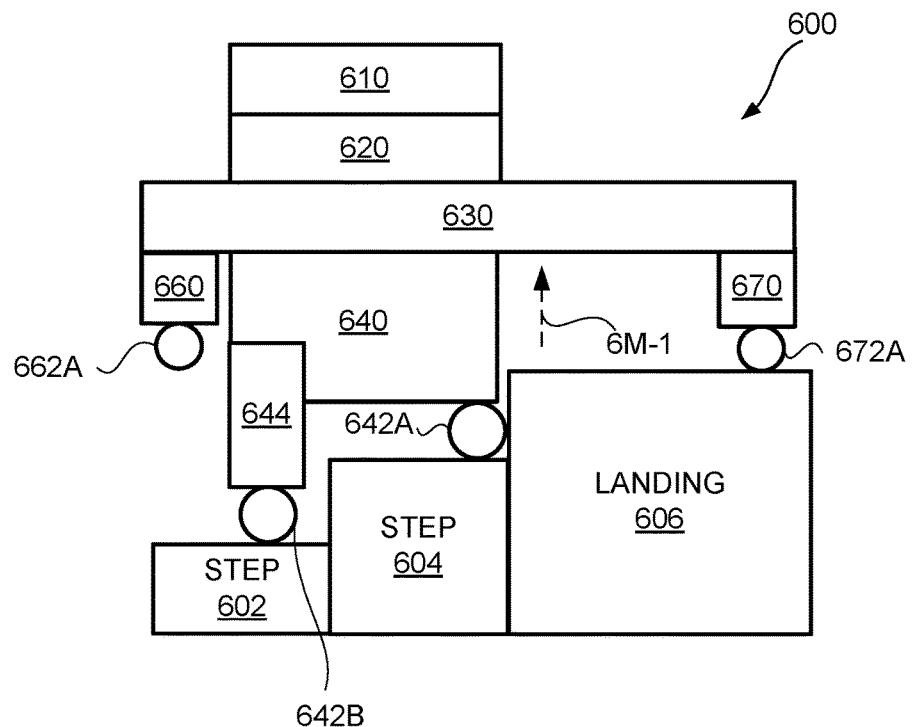
FIG. 6M is a schematic diagram showing another operational step of the self-elevating platform cart of FIG. 6A in accordance with certain examples of the disclosed technology.
Figure 6N:
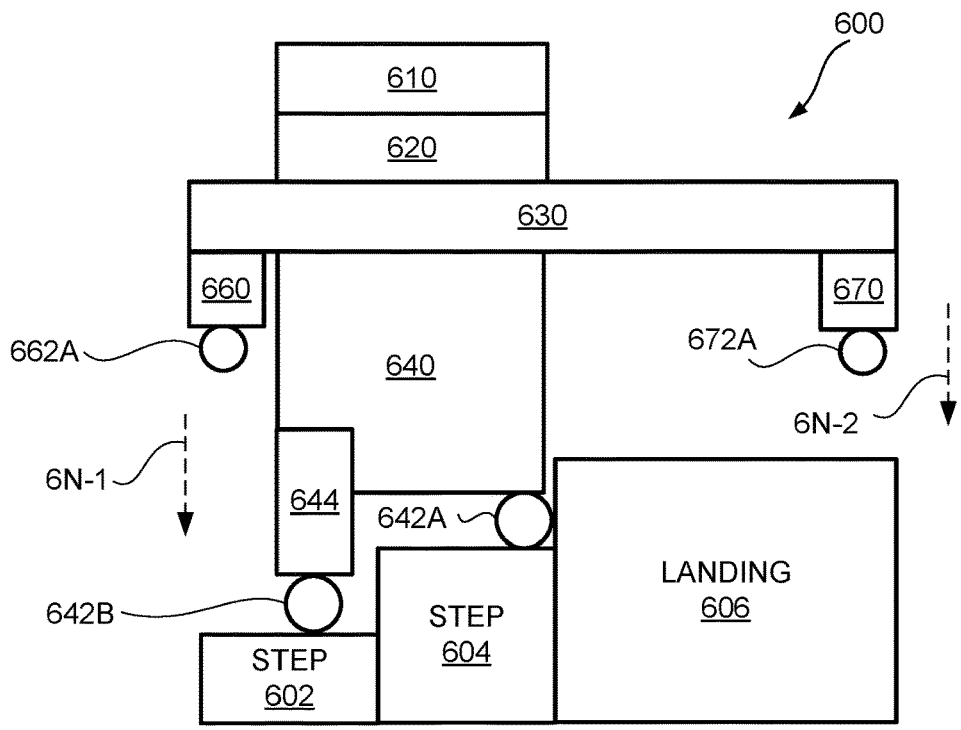
FIG. 6N is a schematic diagram showing more operational steps of the self-elevating platform cart of FIG. 6A in accordance with certain examples of the disclosed technology.
Figure 6O:
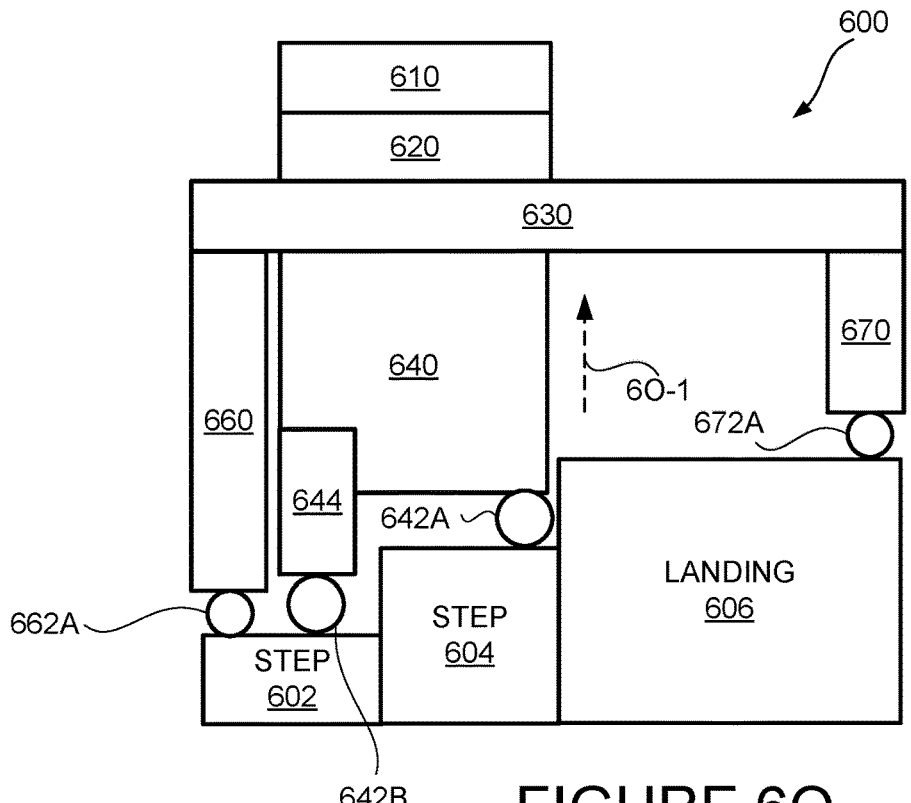
FIG. 6O is a schematic diagram showing another operational step of the self-elevating platform cart of FIG. 6A in accordance with certain examples of the disclosed technology.
Figure 6P:
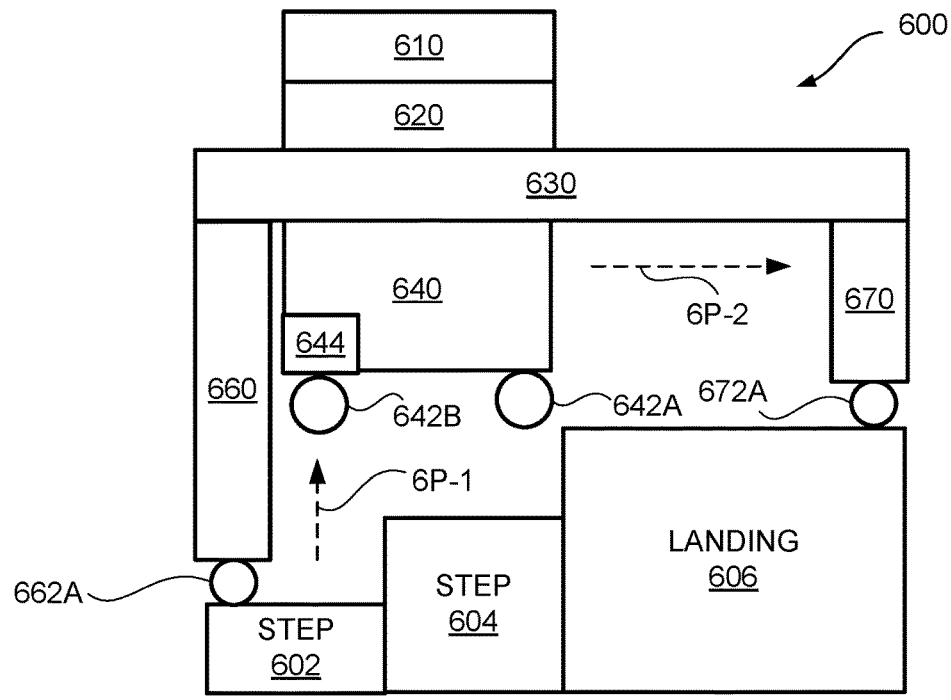
FIG. 6P is a schematic diagram showing more operational steps of the self-elevating platform cart of FIG. 6A in accordance with certain examples of the disclosed technology.
Figure 6Q:
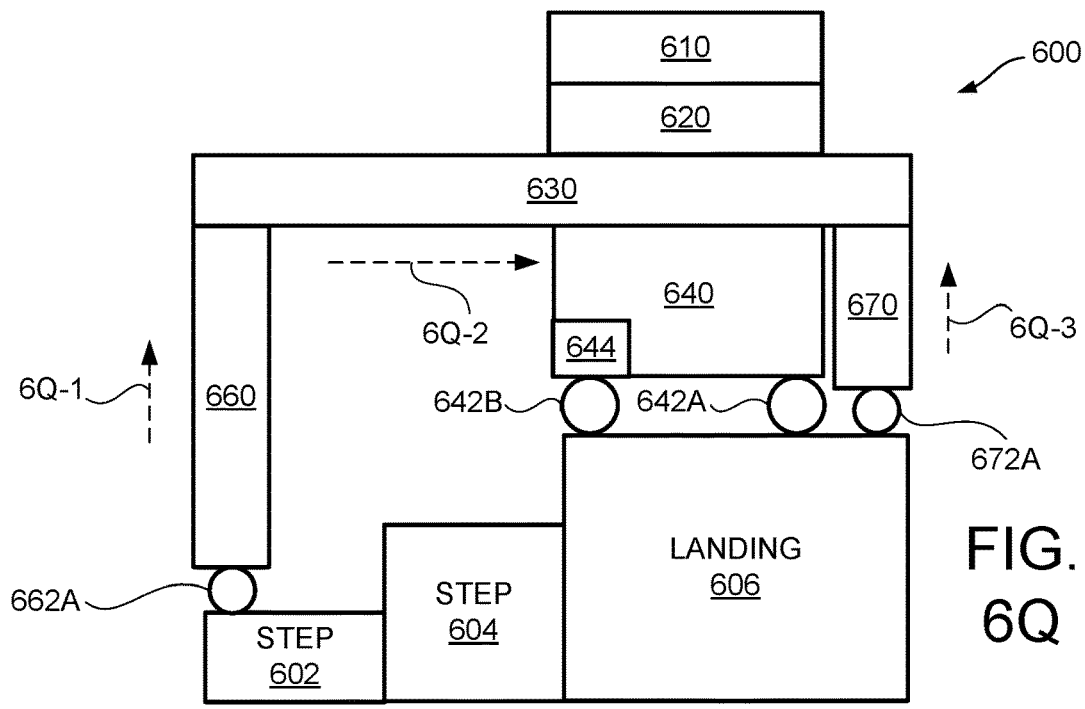
FIG. 6Q is a schematic diagram showing more operational steps of the self-elevating platform cart of FIG. 6A in accordance with certain examples of the disclosed technology.
Figure 6R:
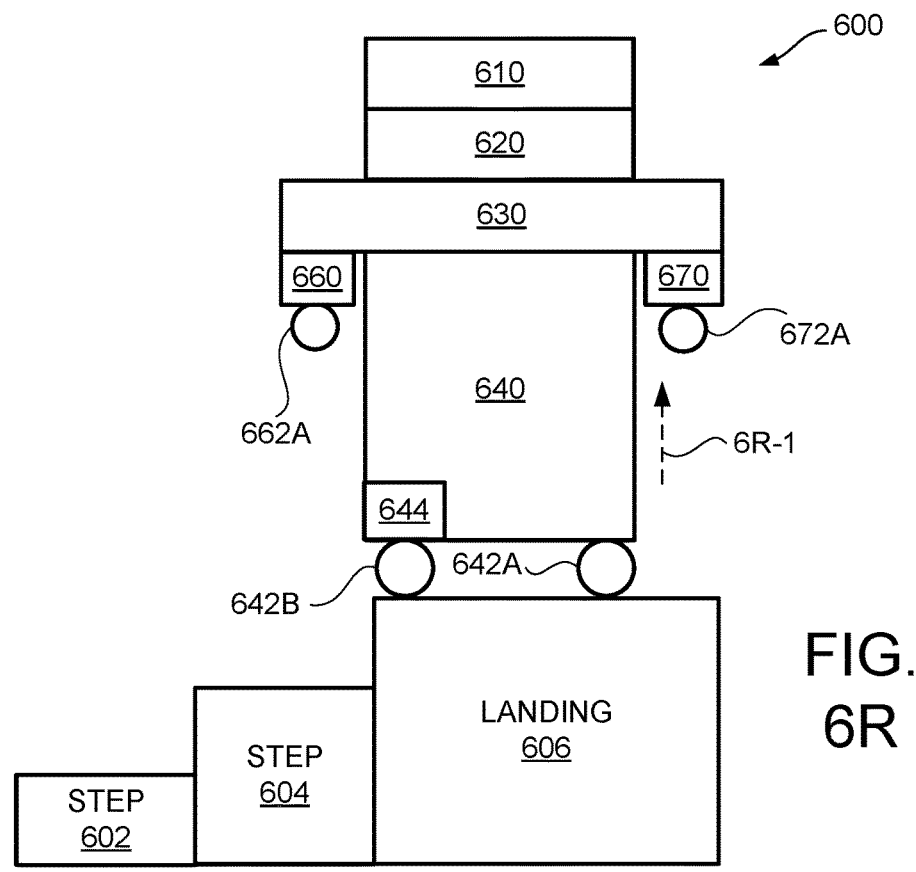
FIG. 6R is a schematic diagram showing the self-elevating platform cart of FIG. 6A after having completed ascending multiple steps to higher level in accordance with certain examples of the disclosed technology.

FIGS. 6A-R are schematic diagrams showing a side view of another example a self-elevating platform cart 600, such as a cart, configured to climb multiple steps in ascending to a higher level in accordance with certain examples of the disclosed technology. Cart 600 is similar to previous examples 300 and 400, but includes a vertical stabilizer 644 in main lift 640. Vertical stabilizer 644 can be extended and retracted to stabilize the main lift 640 and cart 600 on intermediate steps of a stairway, for example, or to account for height differences between the levels of the front 642A and rear 642B wheels of the main lift 640.

FIG. 6B shows an operational step 6B-1 wherein extensible support beams 630 extend support 670 such that wheel 672A makes contact with the destination surface, which is a top surface of a stair tread 604 in the illustrated example. FIG. 6B also shows an operational step 6B-2 wherein support 660 is extended such that wheel 662A makes contact with an initial surface.

FIG. 6C is a schematic diagram showing yet another operational step 6C-1 of the self-elevating platform cart 600 of FIG. 6A to retract main lift 640. Note that operations may be performed to apply braking force to wheels 662 and 672 to maintain a position of system 600 during this operation.

FIG. 6D is a schematic diagram showing still another operational step 6D-1 of the self-elevating platform cart 600 of FIG. 6A to shift main body 620 along with load platform 610 and main lift 640 in a direction towards support 670. Additional sensors may be utilized to detect intermediate steps 602 and 604 in order to position a front wheel 642A on step 602 and rear wheel 642B over the initial surface.

Note that wheel 642A of main lift 640 is in contact with a top surface of intermediate step 602. As discussed above with regard to other examples, main lift 640 can be controlled to make contact with a surface.

FIG. 6D also shows operational step 6D-2 wherein vertical stabilizer 644 is actuated to extend towards the initial surface until rear wheel 642B makes contact with the initial surface. Note that both 642A and 642B represent multiple wheels that can be provided for stability of main lift 640.

FIG. 6E is a schematic diagram showing operational step 6E-1 of the self-elevating platform cart 600 of FIG. 6A wherein extensible support 630 is retracted to bring rear height support 660 toward main lift 640.

FIG. 6F is a schematic diagram showing operational step 6F-1 of the self-elevating platform cart 600 of FIG. 6A wherein main lift 640 is extended to raise system 600 to place it at a height for taking a next step. Note that main lift 640 is securely supported on two different levels, e.g. the initial surface and the tread for step 602, through the contact of wheel 642A with the intermediate surface and the extension of wheel 642B by vertical stabilizer 644 to contact the initial surface.

FIG. 6G is a schematic diagram showing operational step 6G-1 of the self-elevating platform cart 600 of FIG. 6A wherein rear height support 660 is further extended to place wheel 662A in contact with the initial surface.

FIG. 6H is a schematic diagram showing operational steps 6H-1 and 6H-2 of the self-elevating platform cart 600 of FIG. 6A. At 6H-1, extensible beam 630 is extended to position front height support 670 over a next surface, e.g. the top surface of landing 606. At 6H-2, front height support is extended until wheel 672A makes contact with the next surface. At this point, rear height support 660 and front height support 670 can support the weight of cart 600. In certain examples, main lift 640 can be lowered to bring support 670 into contact with the destination surface and step 6H-2 may be eliminated.

FIG. 6I is a schematic diagram showing operational step 6I-1 of the self-elevating platform cart 600 of FIG. 6A wherein main lift 640 is retracted, as shown in FIG. 6J.

FIG. 6J is a schematic diagram showing operational step 6J-1 of the self-elevating platform cart 600 of FIG. 6A wherein the main body 620 along with the load platform 610 and main lift 640 are moved forward towards the front height support 670 through coordinated action of extensible support beams 630 such that wheel 642A contacts the tread surface of step 604 and wheel 642B contacts the tread surface of step 602, as shown in FIG. 6K. Note that if the steps are not uniform in height, vertical stabilizer 644 may retract or extend to place wheel 652 in contact with the surface of step 602.

FIG. 6K is a schematic diagram showing operational step 6K-1 of the self-elevating platform cart 600 of FIG. 6A wherein rear height support 660 is retracted, as shown in FIG. 6L.

FIG. 6L is a schematic diagram showing operational steps 6L-1 and 6L-2 of the self-elevating platform cart 600 of FIG. 6A. At 6L-1, extensible support 630 retracts rear height support 660 and, at 6L-2, extends front height support 670 in preparation for ascending to the surface of landing 606, i.e. the destination surface, as shown in FIG. 6M.

FIG. 6M is a schematic diagram showing operational step 6M-1 and of the self-elevating platform cart 600 of FIG. 6A wherein main lift 640 is extended, as shown in FIG. 6N.

FIG. 6N is a schematic diagram showing operational steps 6N-1 and 6N-2 of the self-elevating platform cart 600 of FIG. 6A. At 6N-1, rear height support 660 is extended until wheel 662A contacts the tread surface of step 602, as shown in FIG. 6O. At 6N-2, front height support 670 is extended until wheel 672A contacts the top surface of landing 606, as shown in FIG. 6O.

FIG. 6O is a schematic diagram showing operational step 6O-1 and of the self-elevating platform cart 600 of FIG. 6A wherein main lift 640 is retracted, as shown in FIG. 6P.

FIG. 6P is a schematic diagram showing operational steps 6P-1 and 6P-2 of the self-elevating platform cart 600 of FIG. 6A. At 6P-1, vertical stabilizer 644 retracts wheel 642B so that wheels 642A and 642B are at the same level. At 6P-2, main body 620 along with the load platform 610 and main lift 640 are moved forward towards the front height support 670 such that wheels 642A and 652B contact the surface of landing 606, as shown in FIG. 6Q.

FIG. 6Q is a schematic diagram showing operational steps 6Q-1, 6Q-2 and 6Q-3 of the self-elevating platform cart 600 of FIG. 6A. At 6Q-1, rear height support 660 is retracted. At 6Q-2, extensible support 630 retracts with rear height support 660. At 6Q-3, front height support 670 retracts.

FIG. 6R is a schematic diagram showing operational step 6R-1 and of the self-elevating platform cart 600 of FIG. 6A wherein main lift 640 is extended to the initial height of system 600. At this point, system 600 is ready for movement at the level of the surface of landing 606.

Figure 7A:
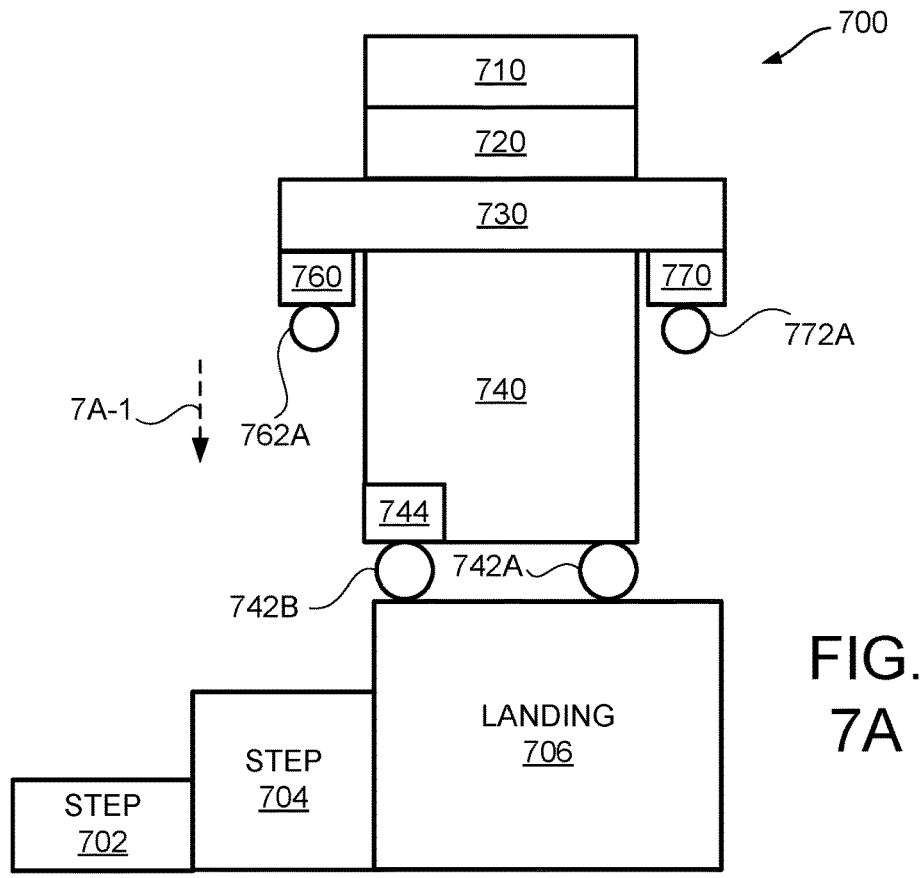
FIG. 7A is a schematic diagram showing a side view of another illustrative example a self-elevating platform cart configured to traverse multiple steps in descending to a lower level in accordance with certain examples of the disclosed technology.
Figure 7B:
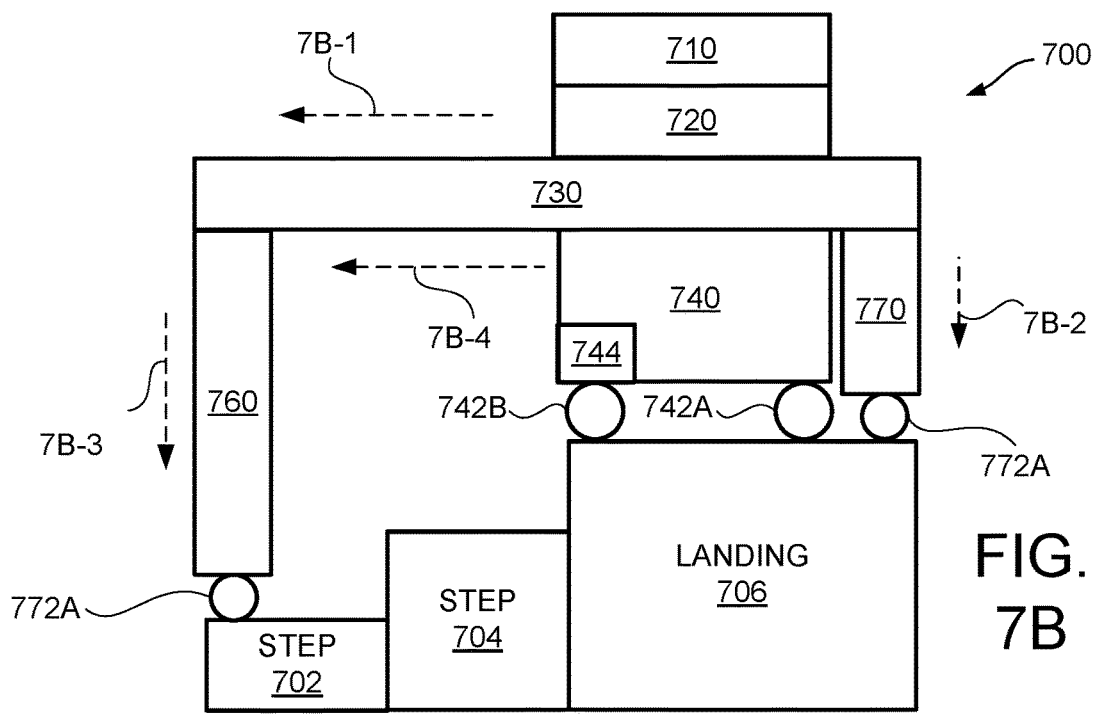
FIG. 7B is a schematic diagram showing another operational step of the self-elevating platform cart of FIG. 7A in accordance with certain examples of the disclosed technology.
Figure 7C:
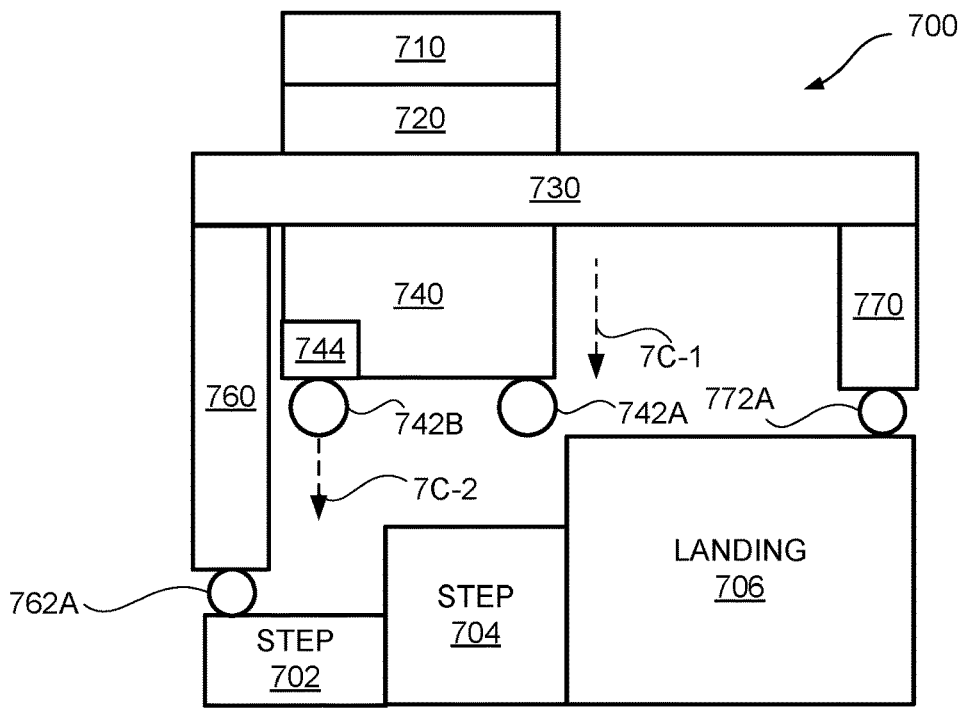
FIG. 7C is a schematic diagram showing another operational step of the self-elevating platform cart of FIG. 7A in accordance with certain examples of the disclosed technology.
Figure 7D:
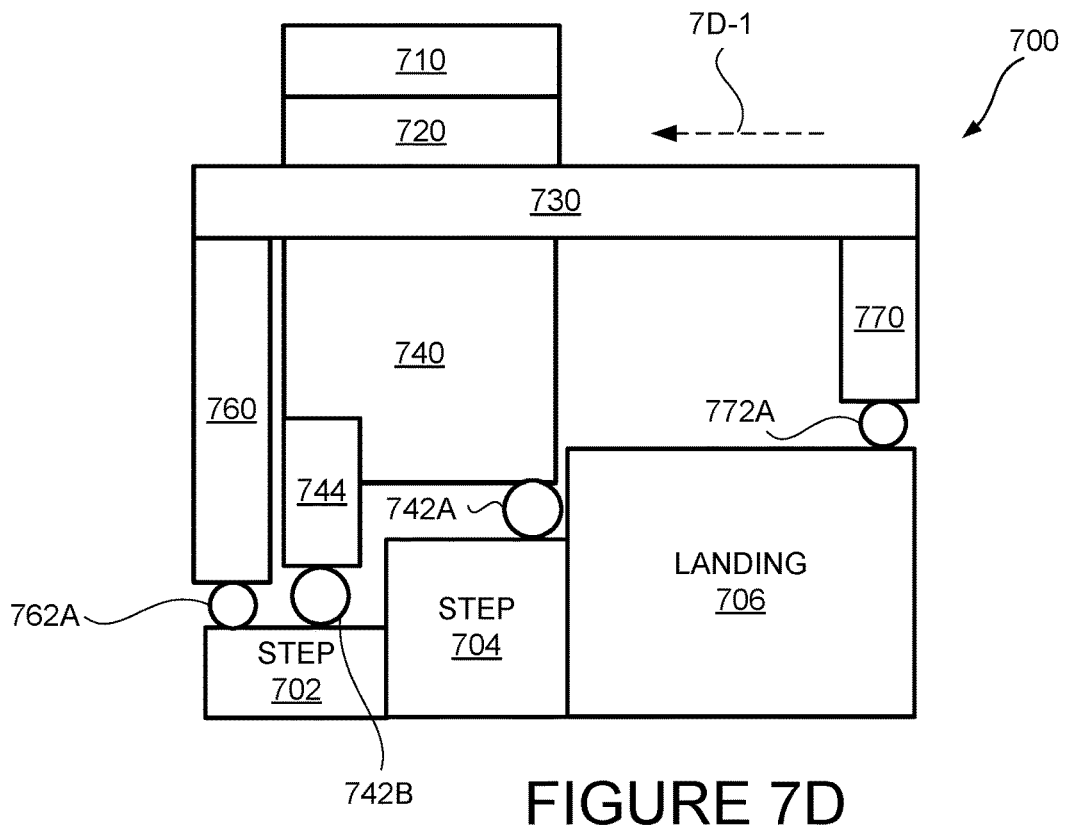
FIG. 7D is a schematic diagram showing still another operational step of the self-elevating platform cart of FIG. 7A in accordance with certain examples of the disclosed technology.
Figure 7E:
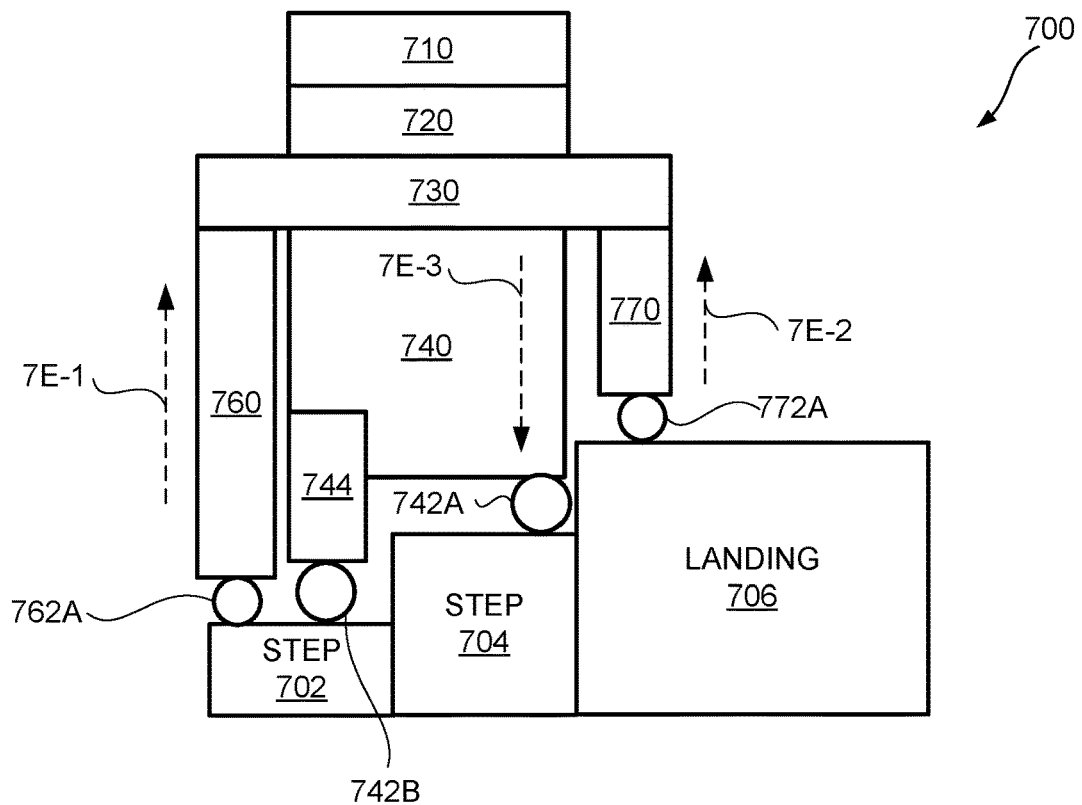
FIG. 7E is a schematic diagram showing still yet another operational step of the self-elevating platform cart of FIG. 7A in accordance with certain examples of the disclosed technology.
Figure 7F:
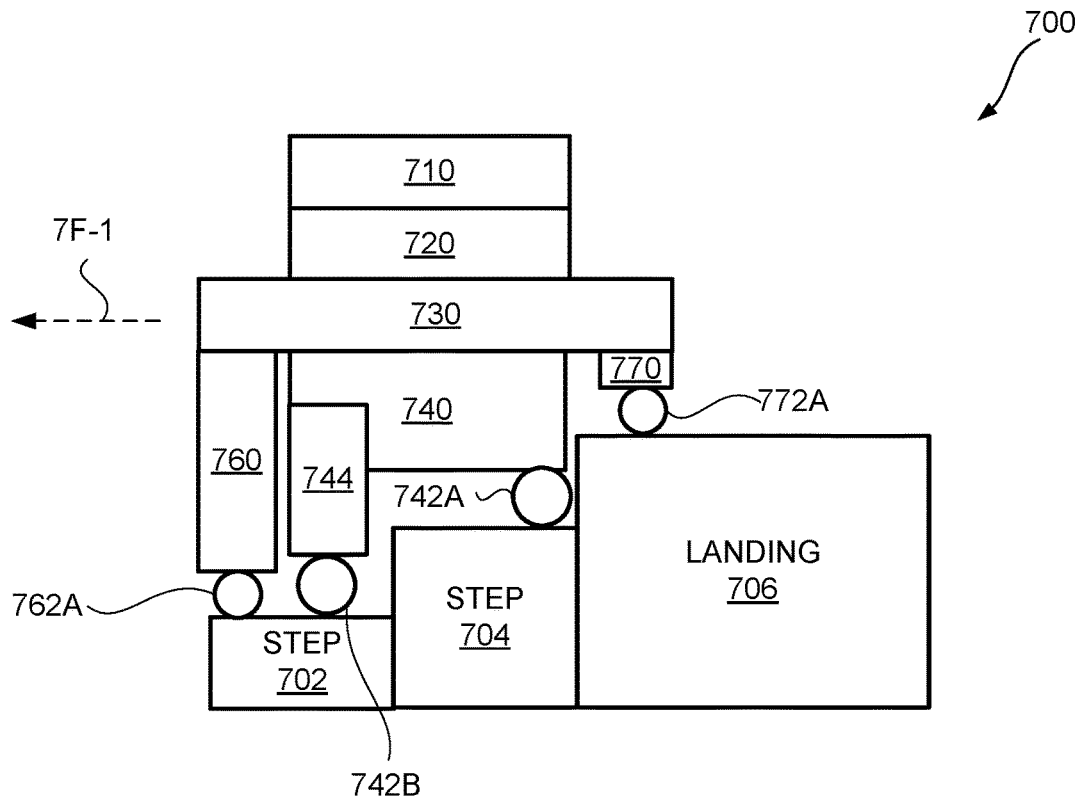
FIG. 7F is a schematic diagram showing still yet another operational step of the self-elevating platform cart of FIG. 7A in accordance with certain examples of the disclosed technology.
Figure 7G:
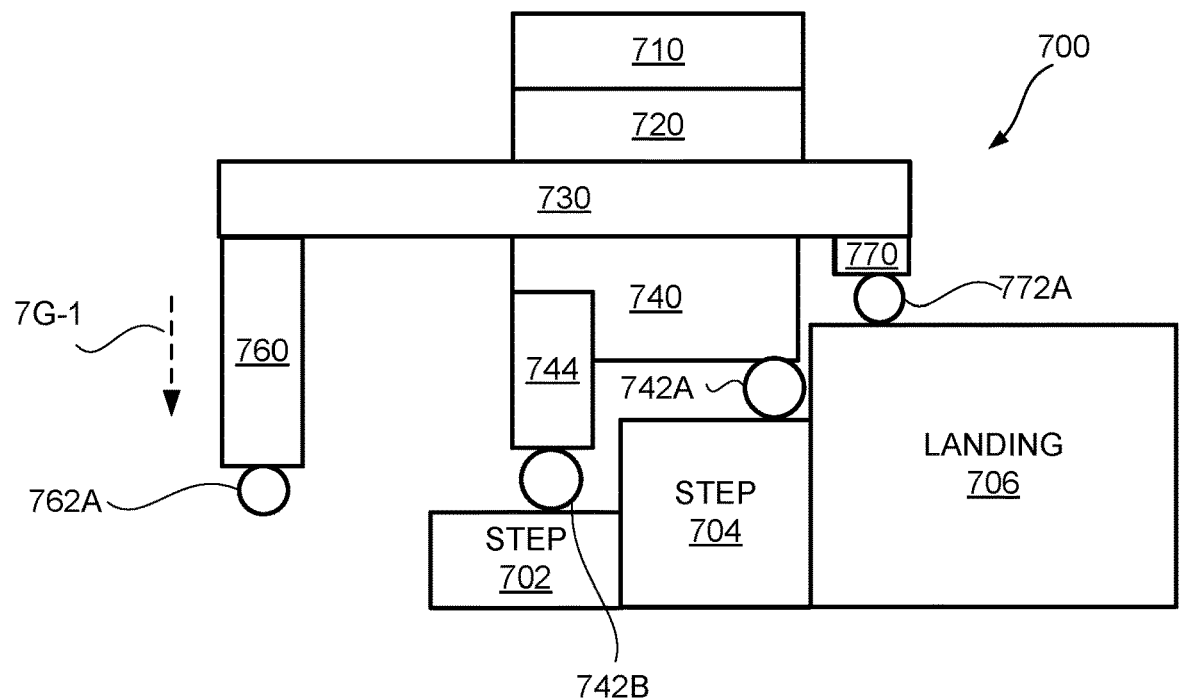
FIG. 7G is a schematic diagram showing another operational step of the self-elevating platform cart of FIG. 7A in accordance with certain examples of the disclosed technology.
Figure 7H:
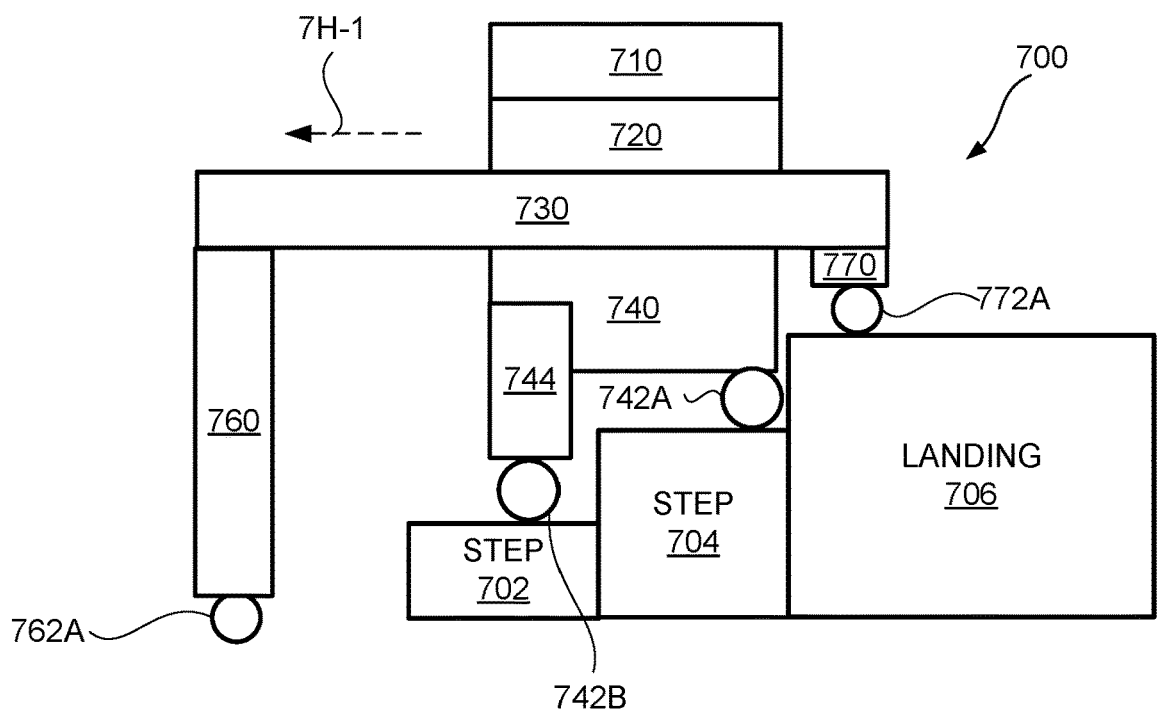
FIG. 7H is a schematic diagram showing another operational step of the self-elevating platform cart of FIG. 7A in accordance with certain examples of the disclosed technology.
Figure 7I:
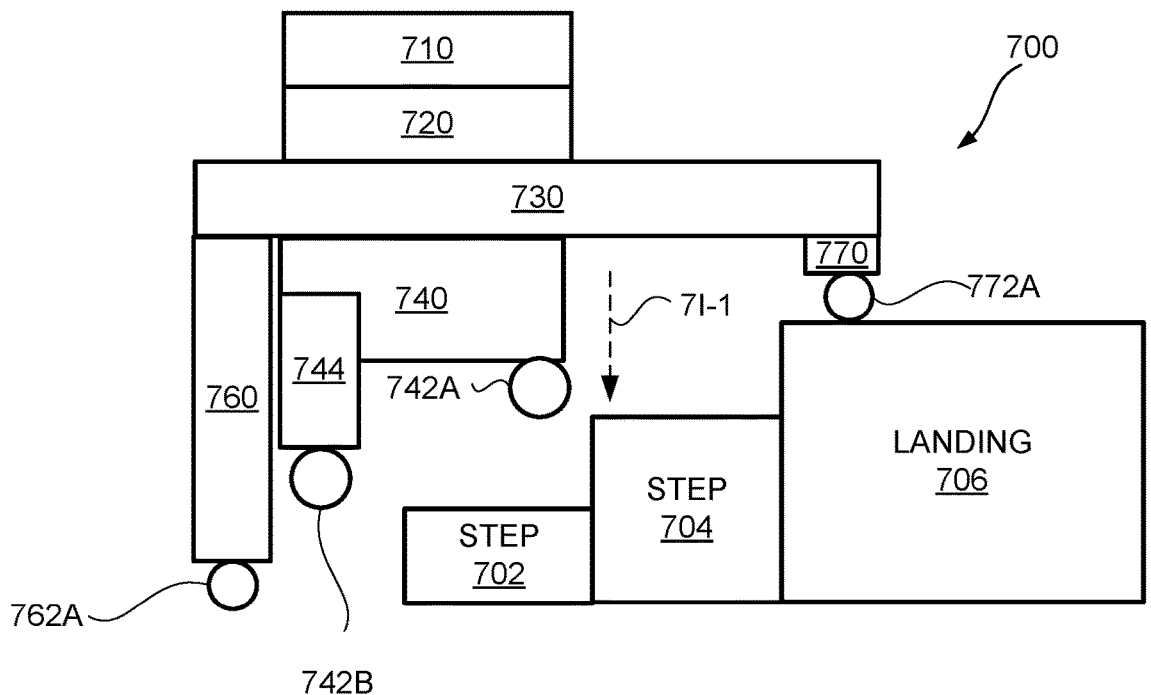
FIG. 7I is a schematic diagram showing another operational step of the self-elevating platform cart of FIG. 7A in accordance with certain examples of the disclosed technology.
Figure 7J:
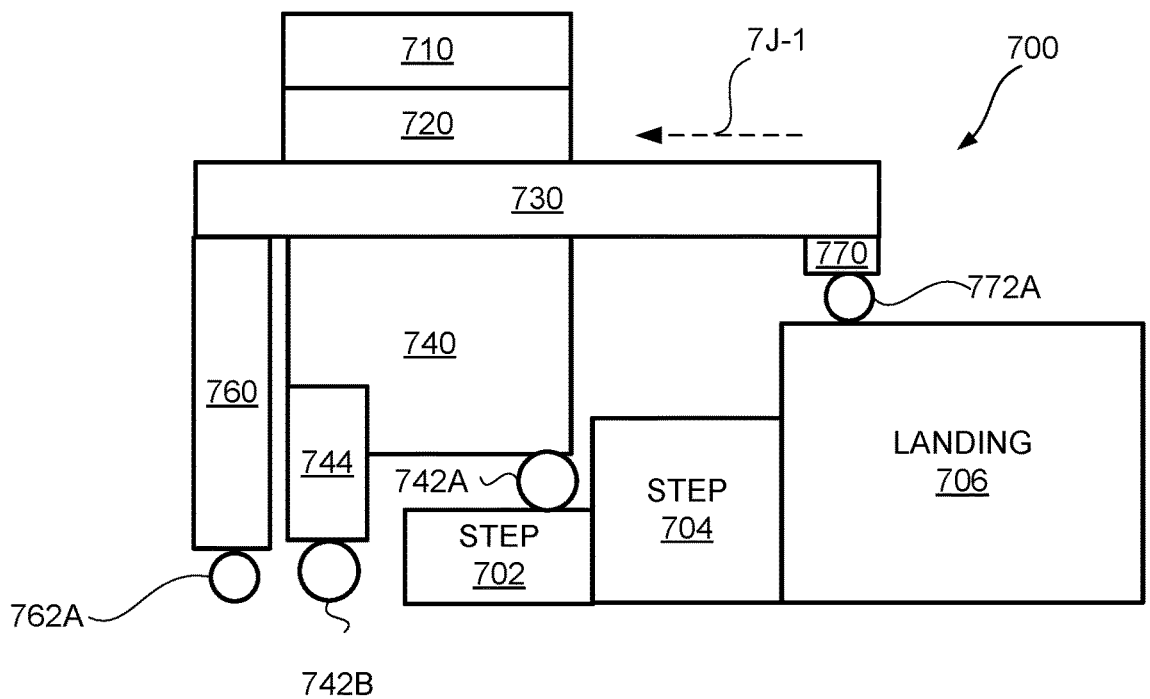
FIG. 7J is a schematic diagram showing another operational step of the self-elevating platform cart of FIG. 7A in accordance with certain examples of the disclosed technology.
Figure 7K:
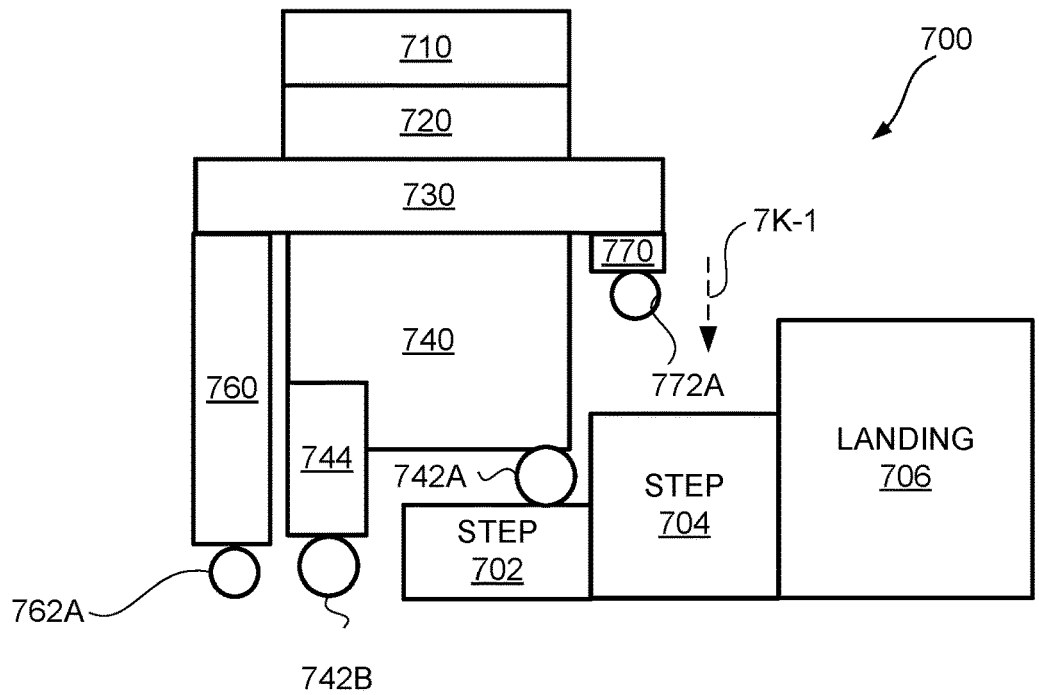
FIG. 7K is a schematic diagram showing another operational step of the self-elevating platform cart of FIG. 7A in accordance with certain examples of the disclosed technology.
Figure 7L:
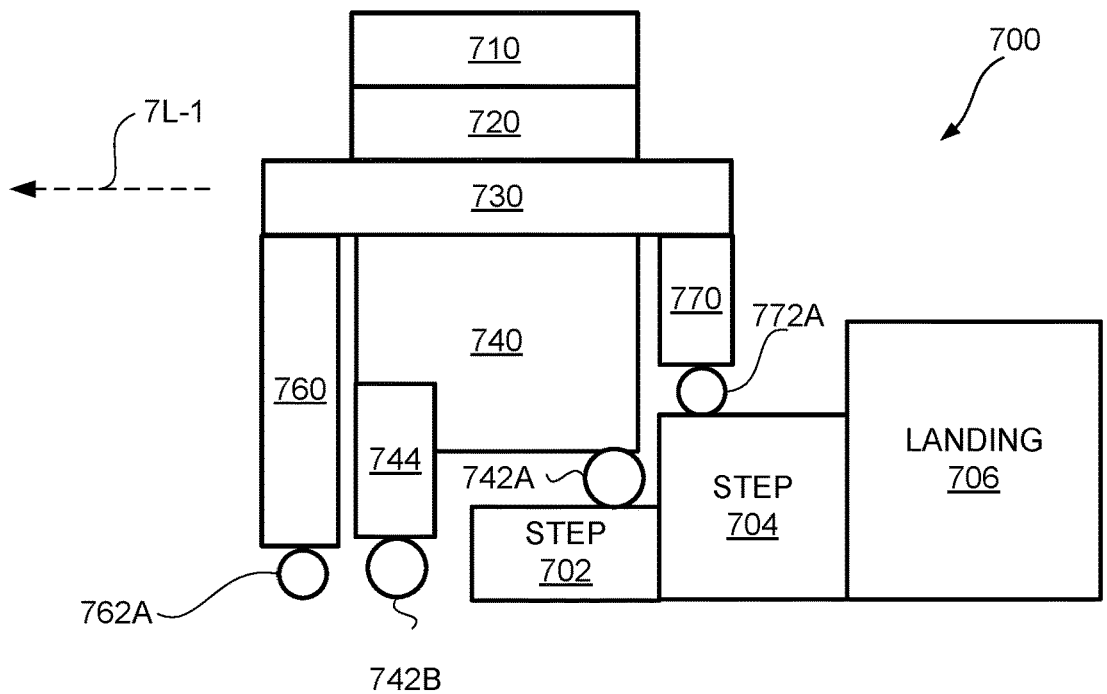
FIG. 7L is a schematic diagram showing still more operational steps of the self-elevating platform cart of FIG. 7A in accordance with certain examples of the disclosed technology.
Figure 7M:
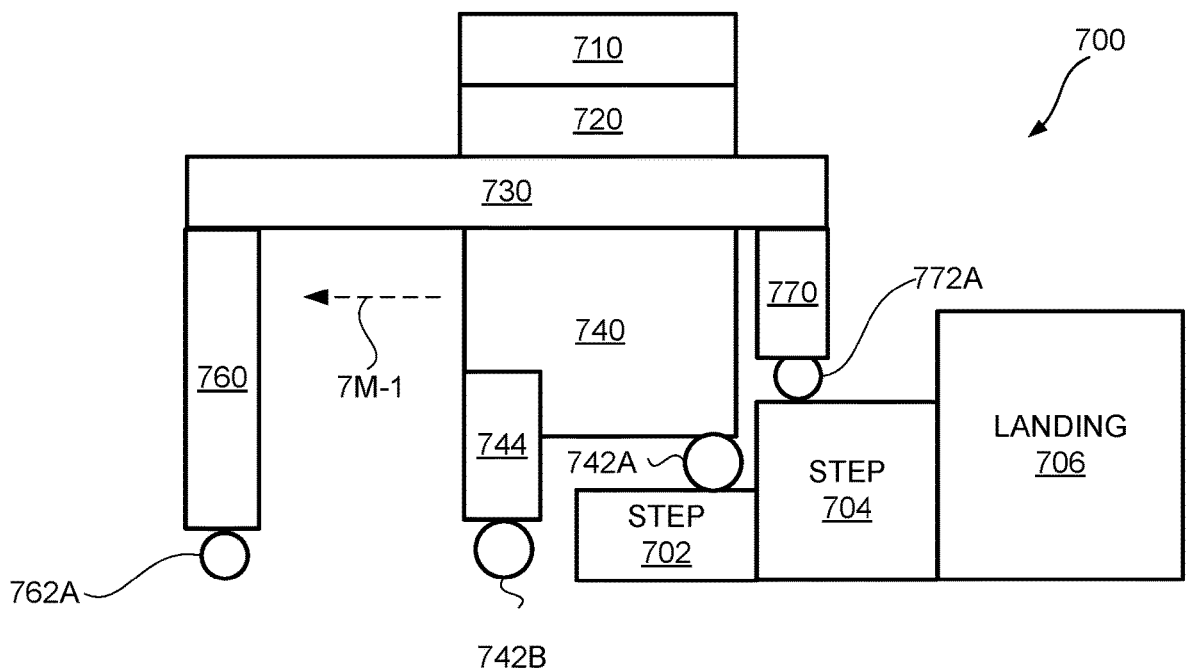
FIG. 7M is a schematic diagram showing another operational step of the self-elevating platform cart of FIG. 7A in accordance with certain examples of the disclosed technology.
Figure 7N:
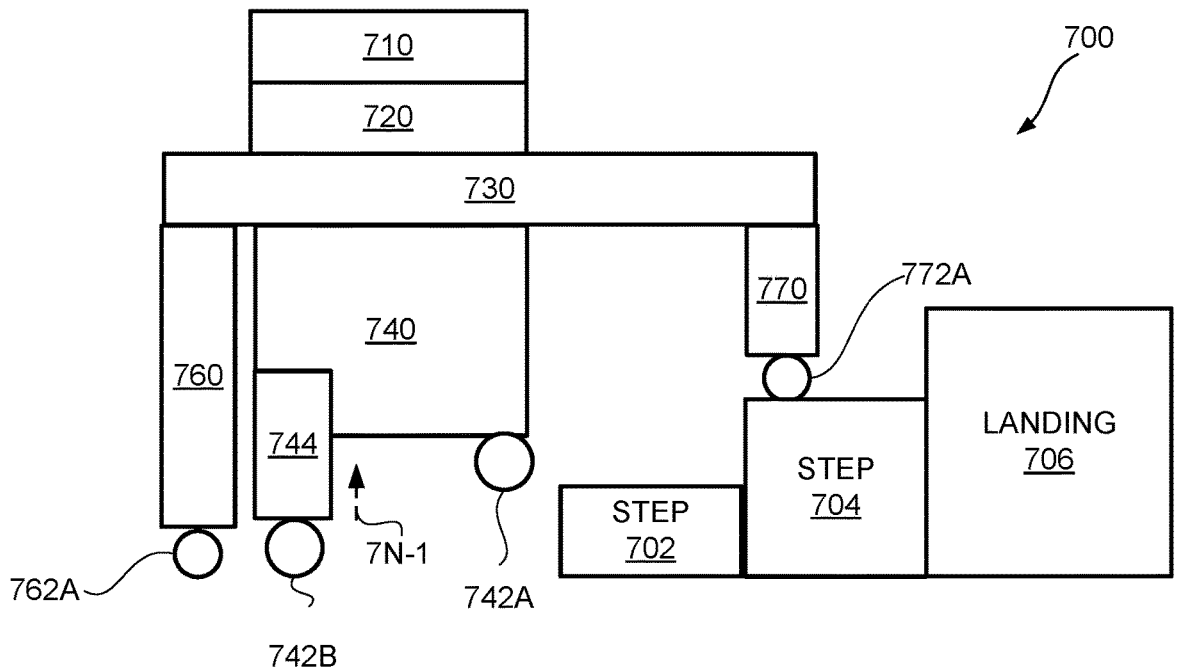
FIG. 7N is a schematic diagram showing more operational steps of the self-elevating platform cart of FIG. 7A in accordance with certain examples of the disclosed technology.
Figure 7O:
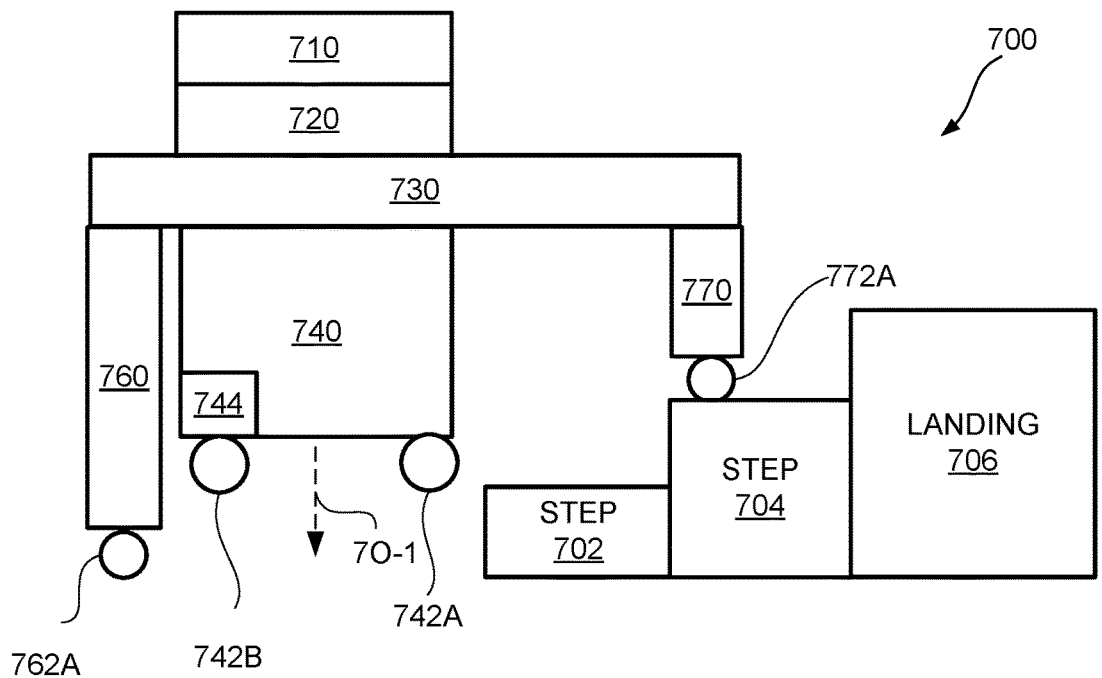
FIG. 7O is a schematic diagram showing another operational step of the self-elevating platform cart of FIG. 7A in accordance with certain examples of the disclosed technology.
Figure 7P:
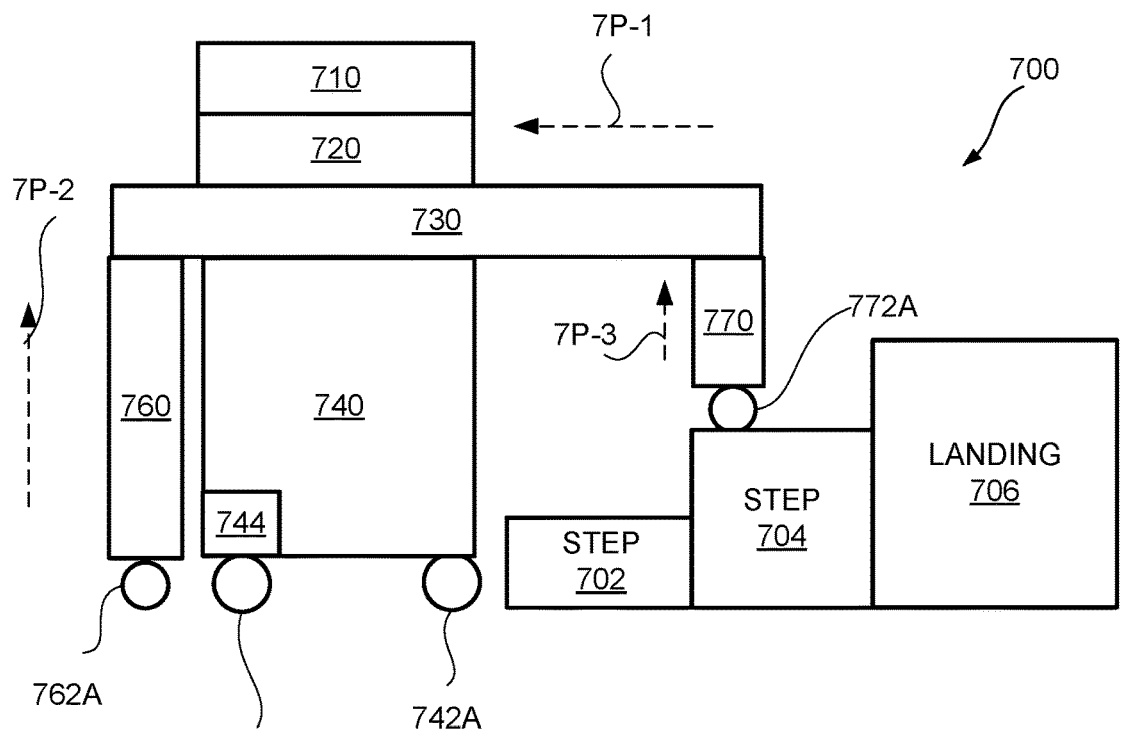
FIG. 7P is a schematic diagram showing more operational steps of the self-elevating platform cart of FIG. 7A in accordance with certain examples of the disclosed technology.

The steps of FIGS. 6A-R can essentially be inverted in order to descend multiple steps as illustrated in FIGS. 7A-P. FIGS. 7A-P are schematic diagrams showing a side view of another example a self-elevating platform cart 700, such as a cart, configured to descend multiple steps in accordance with certain examples of the disclosed technology. Cart 700 is similar to previous example 600 wherein vertical stabilizer 744 can be extended and retracted to stabilize the main lift 740 and cart 700 on intermediate steps of a stairway, for example.

FIG. 7A shows an operational step 7A-1 wherein main lift 740 is retracted to lower cart 700 toward the initial surface, e.g. a top surface of landing 706.

FIG. 7B shows operational steps 7B-1, 7B-2, 7B-3 and 7B-4. At 7B-1, extensible support beams 730 extend support 760 such that wheel 762A is position over step 702. At 7B-2, support 770 is extended until wheel 772A contacts the initial surface, e.g. the surface of landing 706. At 7B-3, support 760 is extended until wheel 772A makes contact with the surface of step 702, e.g. the tread of stair step 702. At 7B-4, extensible support beams 730 are actuated to shift main body 720 with load platform 710 and main lift 740 towards support 760 to position wheel 742B above step 702 and wheel 742A above step 704.

FIG. 7C shows operational steps 7C-1 and 7C-2. At 7C-1, main lift 740 is extended until wheel 742A contacts the surface of step 704. At 7C-2, vertical stabilizer 744 extends wheel 742B until the wheel contacts the surface of step 702.

FIG. 7D shows operational step 7D-1 wherein extensible support beams 730 retract to move support 770 towards main lift 740.

FIG. 7E shows operational steps 7E-1, 7E-2 and 7E-3. At 7E-1, support 760 is retracted and, at 7E-2, support 770 is retracted. At 7E-3, main lift 740 retracts to lower cart 700. Note that supports 760 and 770 can retract either before the main lift retracts or simultaneously.

FIG. 7F shows operational step 7F-1 wherein extensible support beams 730 extend to position height support 760 above the destination surface with sufficient horizontal spacing from step 702 to accommodate main lift 740. In certain examples, the spacing can be a width of steps 702 and 704 and horizontal movement of the height support 760 by extensible support beams 730 can be iterated.

FIG. 7G shows operational step 7G-1 wherein height support 760 is extended until wheel 762A contacts the destination surface. At this point, height supports 760 and 770 can support the weight of cart 700.

FIG. 7H shows operational step 7H-1 wherein extensible support beams 730 are actuated to shift main body 720 with load platform 710 and main lift 740 towards height support 760 to position wheel 742B over the destination surface and wheel 742A over the surface of step 702.

FIG. 7I shows operational step 7I-1 wherein main lift 740 is extended until wheel 742A contacts the surface of step 702 and the wheel 742B contacts the destination service. Vertical stabilizer 744 may extend or retract wheel 742B in order to accommodate differences in the step height between steps 702 and 704.

FIG. 7J shows operational step 7J-1 wherein extensible support beams 730 retract to move height support 770 towards main lift 740 and wheel 772A is positioned above the surface of step 704.

FIG. 7K shows operational step 7K-1 wherein height support 770 extends until wheel 772A contacts the surface of step 704.

FIG. 7L shows operational step 7L-1 wherein extensible support beams 730 extend to move height support 760 over the destination surface to a distance far enough that main lift 740 can fit between height support 760 and step 702.

FIG. 7M shows operational step 7M-1 wherein extensible support beams 730 actuate to shift main body with load platform 710 and main lift 740 towards height support 760 until wheel 742A is positioned above the destination surface.

FIG. 7N shows operational step 7N-1 wherein vertical stabilizer 744 retracts wheel 742B so that wheels 742A and 742B are at the same level.

FIG. 7O shows operational step 7O-1 wherein main lift 740 extends until wheels 742A and 742B contact the destination surface.

Figure 7Q:
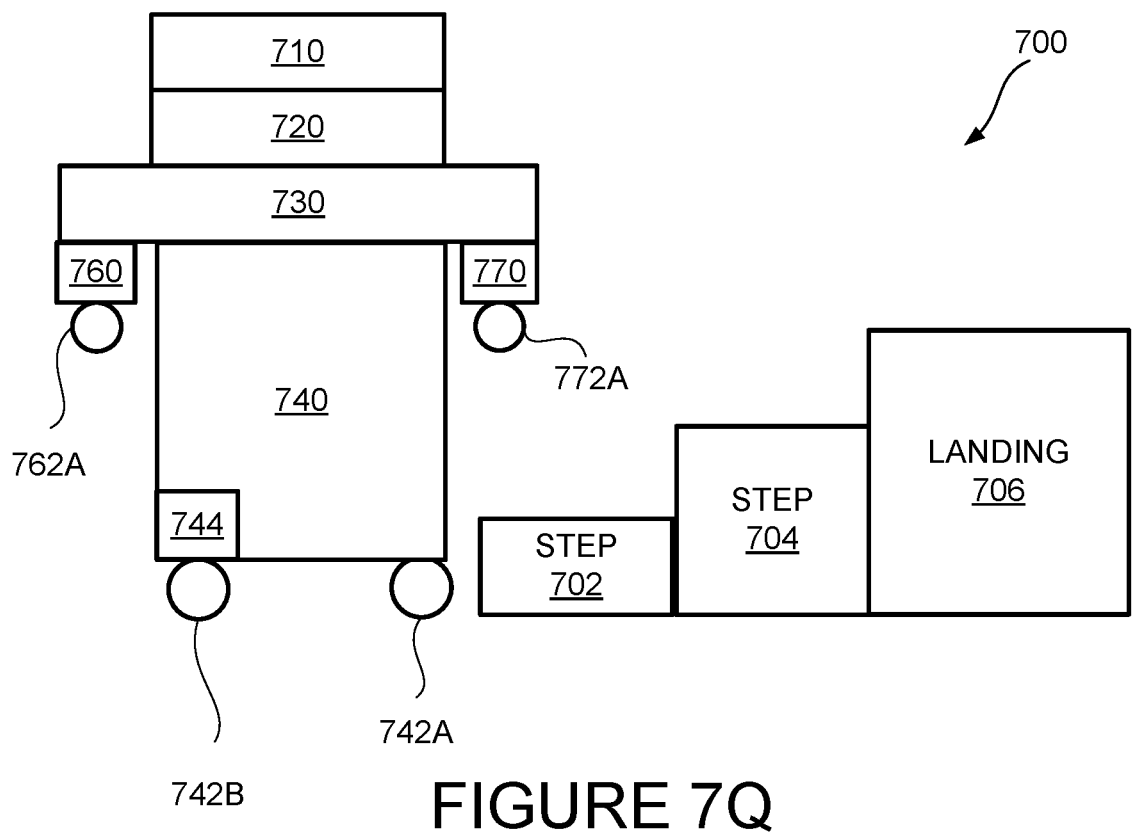
FIG. 7Q is a schematic diagram showing the self-elevating platform cart of FIG. 7A positioned on a lower target surface in accordance with certain examples of the disclosed technology.

FIG. 7P shows operational steps 7P-1, 7P-2 and 7P-3. At 7P-1, extensible support beams 730 retract to move height support 770 towards main lift 740. At 7P-2, height support 760 is retracted. At 7P-3, height support 770 is retracted. At this point, cart 700 is ready to be moved on the destination surface as illustrated in FIG. 7Q.

Figure 8A:
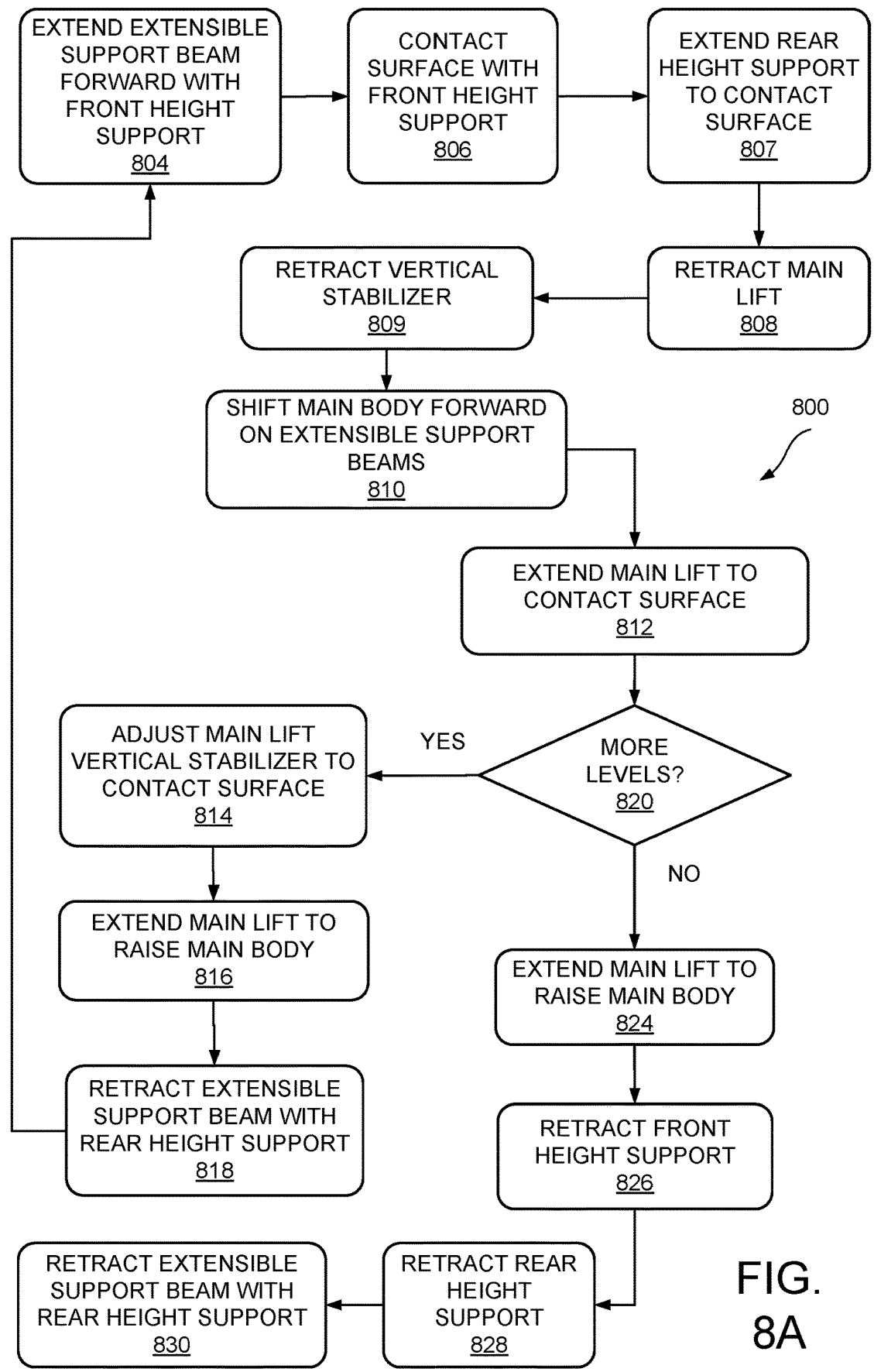
FIG. 8A is a control flow diagram showing an illustrative example of a control process for a self-elevating platform cart ascending multiple steps to a higher level in accordance with the disclosed technology.

FIG. 8A is a control flow diagram showing an illustrative example of a control process 800 for a self-elevating platform cart, e.g. system 600 of FIG. 6A, ascending multiple steps to a higher level in accordance with the disclosed technology.

At 804, an extensible support, e.g. extensible support 630, with a front height support, e.g. height support 670, is extended forward to position the front height support above a second surface, e.g. step 604, above the initial surface.

Note that, in some examples, system 600 may utilize a sensor to detect the second surface and a first surface intermediate to the first and second surface. In other examples, system 600 may be configured to extend the extensible support beams based on predetermined dimensions for the surfaces, e.g. standard sized stairs.

At 806, the front height support, e.g. height support 670, can be extended to contact the second surface. In some examples where a fixed front height support is utilized for height support 670, step 806 can be eliminated or replaced by partial retraction of the main lift to bring the front height support into contact with the second surface. At 807, a rear height support, such as rear height support 660, is extended to contact an initial surface, such as a walkway or floor surface.

At this point, the front and rear height supports can support the weight of the self-elevating platform cart and, at 808, a main lift, e.g. main lift 640, is retracted. At 809, in this example, a vertical stabilizer, e.g. vertical stabilizer 644, may be retracted to bring main lift wheels, e.g. wheels 642A and 642B, on the main lift to a shared planar level.

At 810, a main body, e.g. main body 620, is moved forward on the extensible support beams along with the main lift and a load platform, e.g. load platform 610. Also note that, in some of these examples, the main lift may be sized such that it spans two adjacent steps.

At 812, the main lift is extended to contact a surface intermediate to the first and second surfaces, e.g. step 602, such as with a wheel attached to the main lift, e.g. wheel 642A. At this point, in some examples, a determination can be made, at 820, as to whether there are more levels to climb.

For example, if wheel 642A contacts a surface and wheel 642B does not contact a surface while not extended by vertical stabilizer 644 or does contact a surface while extended, then this state can indicate that more steps remain to be climbed. In other examples, sensors, such as proximity or optical sensors, can be utilized to identify the presences of surfaces for use in determining whether more levels remain. If more levels remain, control branches to 814.

However, if both wheel 642A and wheel 642B contact a surface, then this state can indicate that the destination surface has been reached. In other examples, one or more sensors can be utilized to make a determination that the destination surface has been reached. If no more levels remain, then control branches to 822.

At 814, on a first pass through the control loop of process 800, a vertical stabilizer, e.g. vertical stabilizer 644, in the main lift is extended to contact a surface, e.g. vertical stabilizer 644 is extended until wheel 642B contacts the initial surface. On subsequent passes through process 800, the vertical stabilizer may retract or extend to adjust to variations in surfaces or to level the cart system.

At this point, the main lift is in stable contact with the first and second surfaces and, at 816, the main lift is extended to raise the main body. At 818, the extensible support is actuated to retract the rear height support towards the main lift. It some examples, the rear height support can be retracted from the surface it was in contact with. Control then branches to 804 to climb to the next level.

If the destination surface has been reached, at 820, then, at 824, the main lift is extended to raise the main body. At 826, the front height support is retracted and, at 828, the rear height support is retracted. In certain examples where the front height support is a fixed length component, step 826 can be omitted. At this point, the self-elevating platform cart is ready for movement on the destination surface.

As noted above, some of the steps of process 800 can include applying braking force to wheels of the self-elevating platform cart to prevent rolling while climbing. Also, some examples can utilize one or more of a variety of sensors to make determinations and adjust position and movement during some of the steps of process 800. In some simpler examples, the system may be configured to ascend standardized stairs and the process 800 may utilize expected standard measurements to control position and movement of components during some steps. A variety of approaches can be taken that are consistent with the disclosed technology.

Figure 8B:
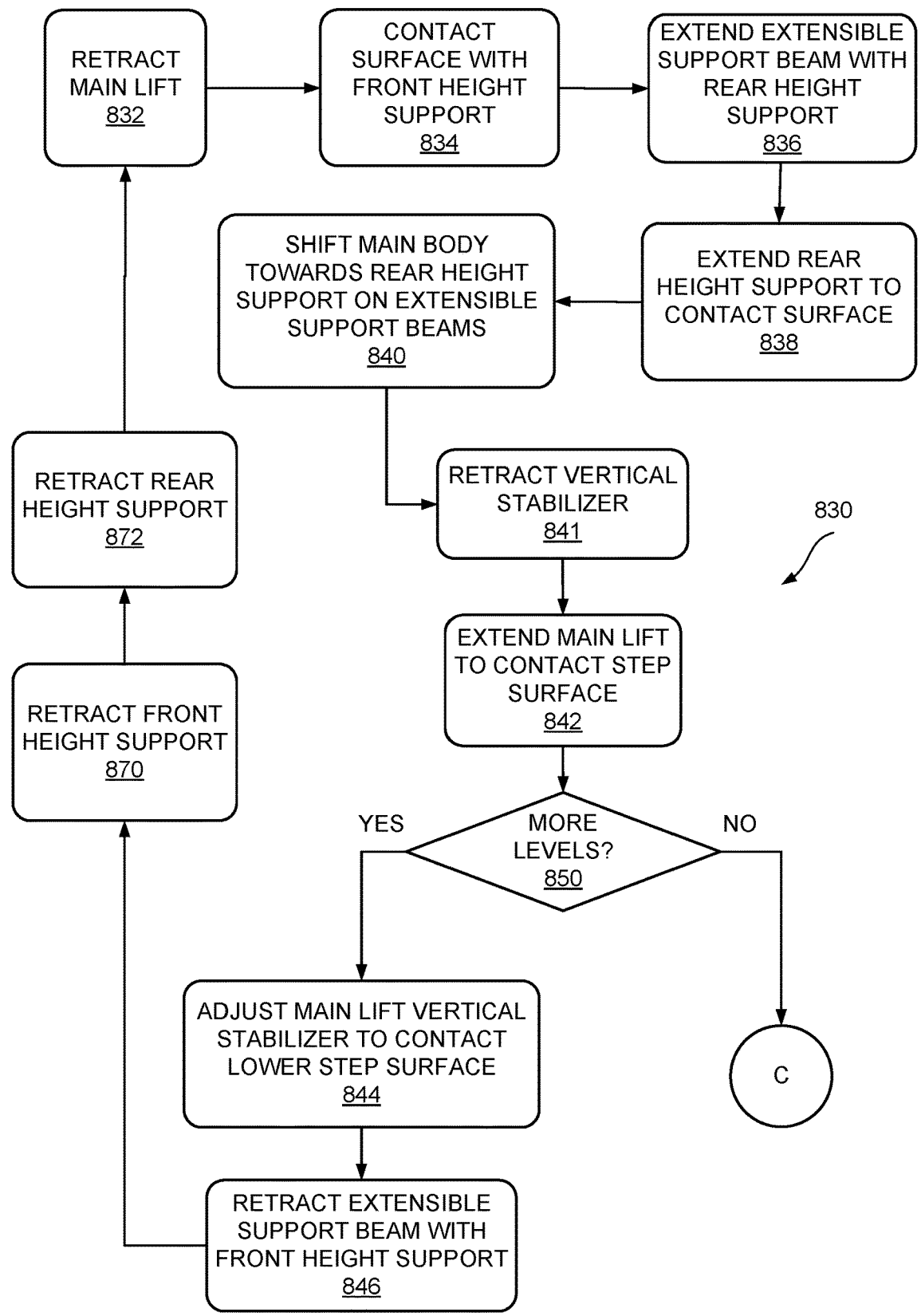
FIG. 8B is a control flow diagram showing an illustrative example of a control process for a self-elevating platform cart descending multiple steps to a lower level in accordance with the disclosed technology.

FIG. 8B is a control flow diagram showing an illustrative example of a control process 830 for a self-elevating platform cart, such as system 700 in FIG. 7A, descending multiple steps to a lower level in accordance with the disclosed technology.

At 832, a main lift, e.g. main lift 740, is retracted to lower a main body, e.g. main body 720. At 834, a front height support, e.g. height support 770, is extended to make contact with an initial surface, e.g. a top surface of landing 706. As noted above with respect to step 806, in examples wherein the front height support is a fixed length component, this step can be performed by retracting the main lift 740 to contact the top surface of landing with wheels 772 of front height support 770.

At 836, an extensible support, e.g. extensible support 730, is extended with a rear height support, e.g. height support 760, to position a wheel of the rear height support, e.g. wheel 762A, above a first surface, e.g. a top surface of step 702, that is two levels below the initial surface. At 838, the rear height support is extended until its wheel contacts the first surface.

Note that the references to front and rear height supports of system 700 as used here are utilized to be consistent with the components of system 600. This approach is utilized because the rear height support, e.g. height support 660 and 760, may be configured to have a greater range of motion than the front height support, e.g. height support 670 and 770, which may lower cost and complexity in some examples. In this example, the system 600 can be viewed as moving backwards while descending. In other examples, system 600 can include additional or different height supports to provide for different motion orientations while descending.

At 840, the main body is moved forward on the extensible support beams toward the rear height support. At 841, a vertical stabilizer, e.g. vertical stabilizer 744, may be retracted to bring main lift wheels, e.g. wheels 742A and 742B, on a main lift, e.g. main lift 740, to a shared planar level. At 842, the main lift is extended to contact an intermediate surface, e.g. wheel 742A contacts a top surface of step 704. At this point, in some examples, a determination can be made, at 850, as to whether there are more levels to descend.

For example, if wheel 742A contacts a surface and wheel 742B does not contact a surface, then this state can indicate that more steps remain to be climbed. In other examples, sensors, such as proximity or optical sensors, can be utilized to identify the presences of surfaces for use in determining whether more levels remain. If more levels remain, control branches to 844.

However, if both wheel 742A and wheel 742B contact a surface, then this state can indicate that the destination surface has been reached. In other examples, one or more sensors can be utilized to make a determination that the destination surface has been reached. If no more levels remain, then control branches to 852.

At 844, on a first pass through the control loop of process 830, the vertical stabilizer, e.g. vertical stabilizer 744, in the main lift is extended to contact the first surface, e.g. vertical stabilizer 744 is extended until wheel 742B contacts the first surface.

At this point, the main lift is in stable contact with the first and second surfaces. At 846, the extensible support is actuated to retract the front height support towards the main lift. In some examples, at 870, the front height support can be retracted and, at 872, the rear height support can be retracted. As noted above, in examples wherein the front height support is a fixed length component, step 870 can be omitted. Control continues to 832 to retract the main lift to descend to the next level.

Figure 8C:
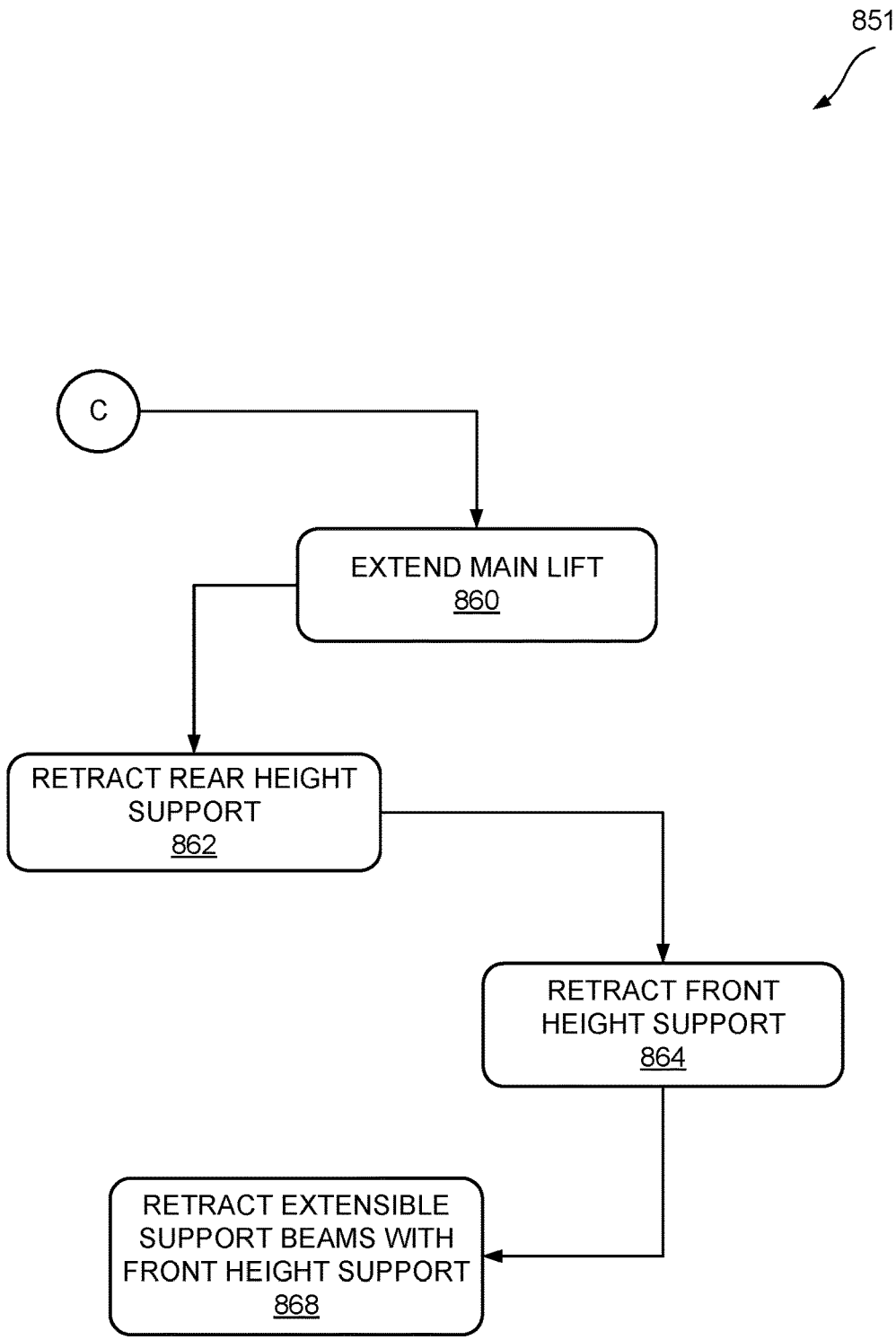
FIG. 8C control flow diagram showing additional operations of the illustrative example of a control process of FIG. 8B in accordance with the disclosed technology.

If the destination surface has been reached, at 850, then control branches to 860 in FIG. 8C. At 860, the main lift is extended to make contact with the destination surface. At 862, the rear height support is retracted and, at 864, the front height support is retracted. At 868, the extensible support beams are retracted towards the main lift. At this point, the self-elevating platform cart is ready for movement on the destination surface.

FIGS. 9A-I are schematic diagrams showing a side view of another example of a self-elevating platform cart 900 configured to traverse a raised 902A or recessed 902B obstacle. The example 900 is similar to the examples illustrated above. However, in this example, the initial surface is on one side of the obstacle 902 and the destination surface is at approximately the same level, but on the other side of obstacle 902. Examples of obstacles can include speed bumps, curbs, gutters or ditches.

FIG. 9A is a schematic diagram showing a side view of self-elevating platform cart 900 configured to traverse a barrier 902 in accordance with certain aspects of the disclosed technology. System 900 stands on an initial surface on one side of barrier 902.

Figure 9B:
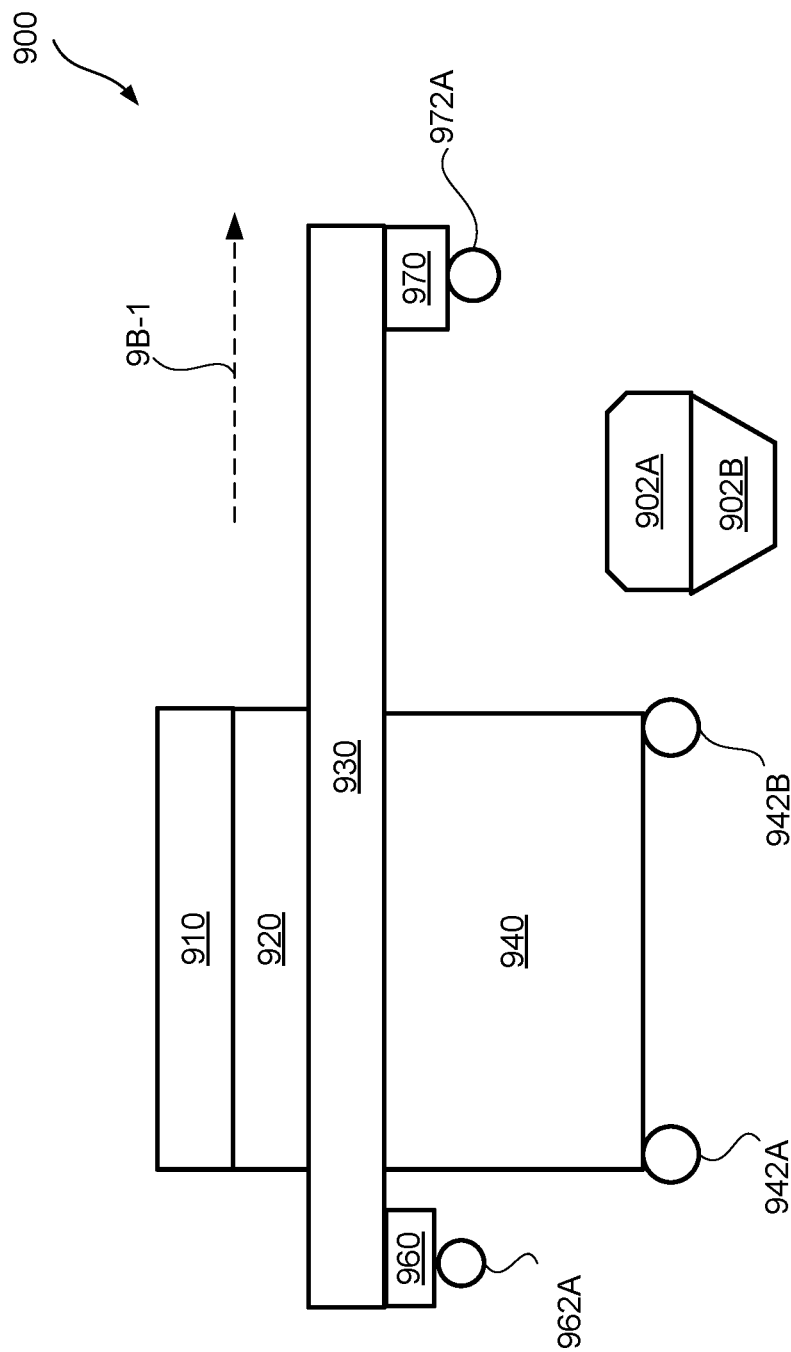
FIG. 9B is a schematic diagram showing an operational step of the self-elevating platform cart of FIG. 9A in accordance with certain examples of the disclosed technology.

FIG. 9B is a schematic diagram showing an operational step 9B-1of the self-elevating platform cart 900 wherein extensible height support 930 is extended so that wheel 972A of front height support 970 is positioned above the destination surface on the other side of barrier 902 from the initial surface.

Figure 9C:
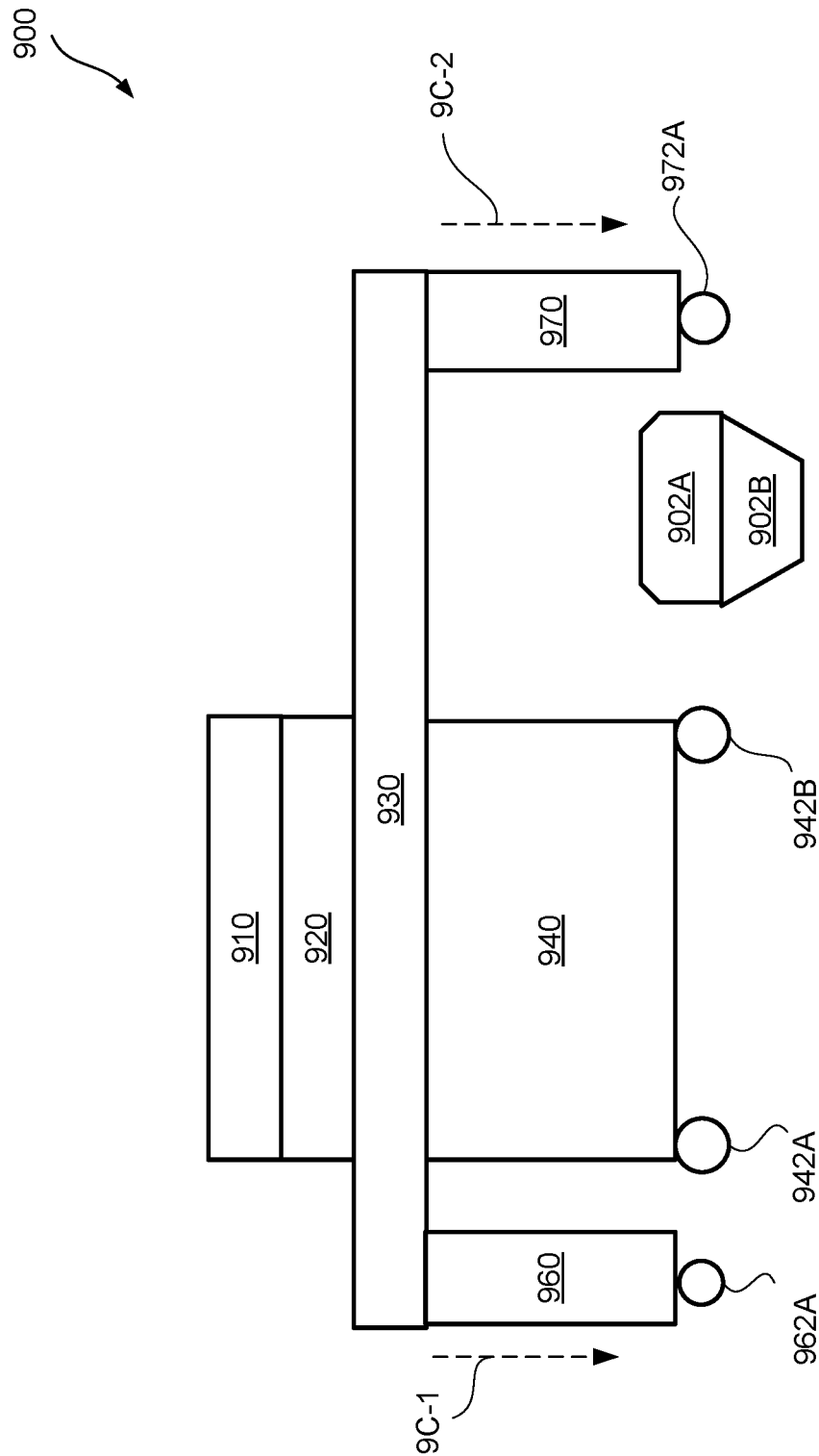
FIG. 9C is a schematic diagram showing another operational step of the self-elevating platform cart of FIG. 9A in accordance with certain examples of the disclosed technology.

FIG. 9C is a schematic diagram showing other operational steps of the self-elevating platform cart 900. At 9C-1, rear height support 960 is extended until wheel 962A contacts the initial surface. At 9C-2, height support 970 is extended until wheel 972A contacts the destination surface.

Figure 9D:
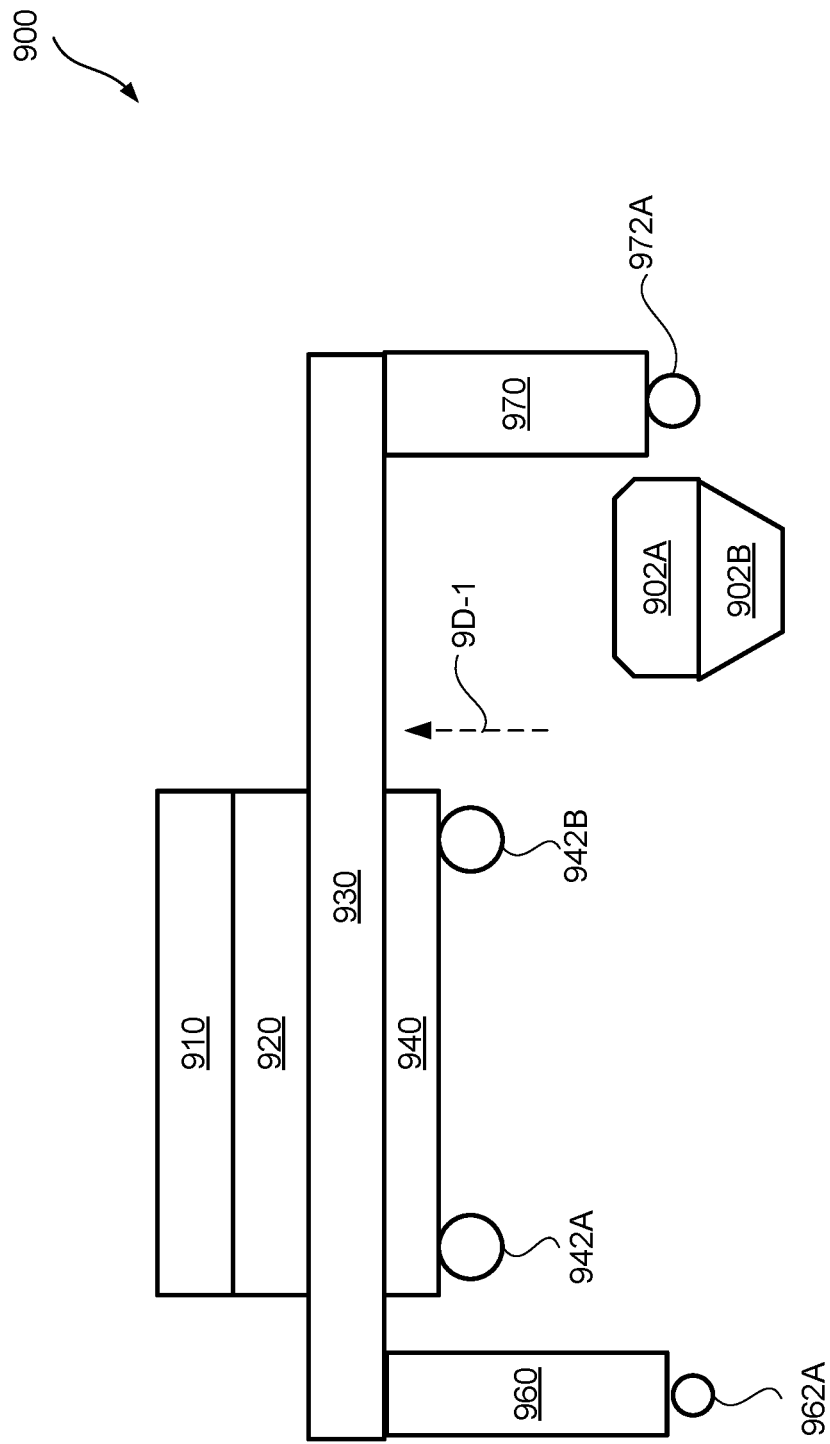
FIG. 9D is a schematic diagram showing still another operational step of the self-elevating platform cart of FIG. 9A in accordance with certain examples of the disclosed technology.

At this point, supports 960 and 970 can support the weight of system 900. FIG. 9D is a schematic diagram showing operational step 9D-1 of the self-elevating platform cart 900 wherein main lift 940 is retracted.

Figure 9E:
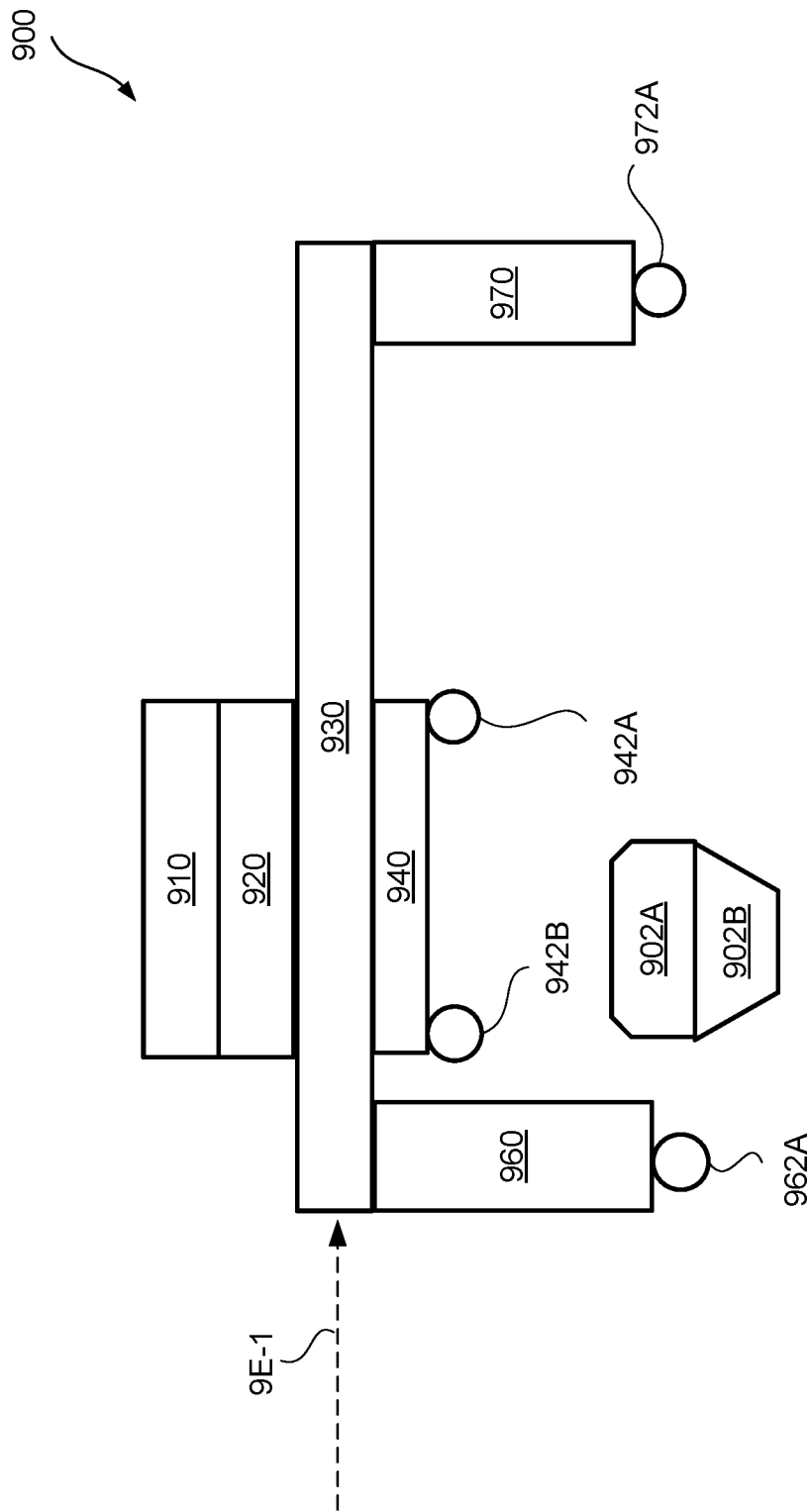
FIG. 9E is a schematic diagram showing still yet another operational step of the self-elevating platform cart of FIG. 9A in accordance with certain examples of the disclosed technology.

FIG. 9E is a schematic diagram showing step 9E-1 of the self-elevating platform cart 900 moving forward in the direction of height support 970 such that a distance between barrier 902 and height support 970 can accommodate main lift 940. In some examples, the motion of step 9E-1 can be performed by actuating motors on one or more of wheels 962 and 972. In simplified examples, system 900 can be moved manually.

Figure 9F:
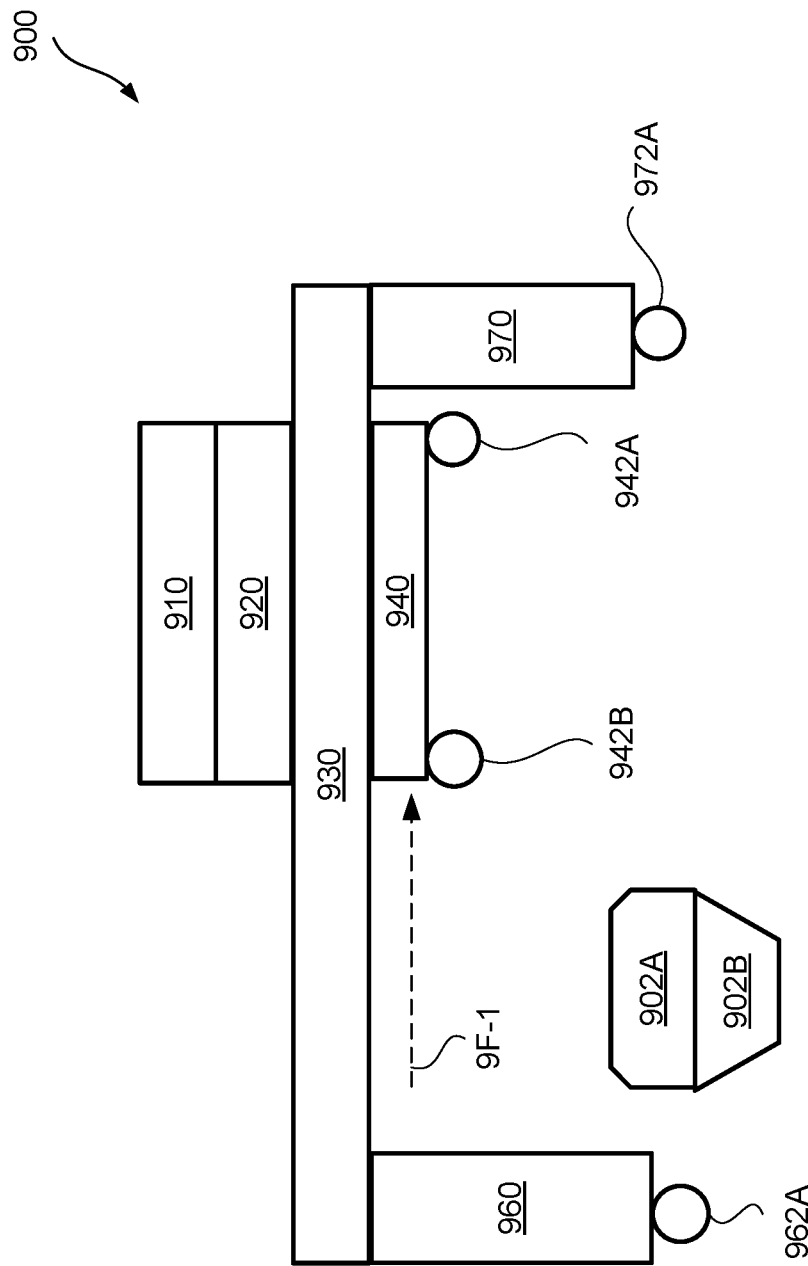
FIG. 9F is a schematic diagram showing still yet another operational step of the self-elevating platform cart of FIG. 9A in accordance with certain examples of the disclosed technology.

FIG. 9F is a schematic diagram showing still operational step 9F-9 of the self-elevating platform cart 900 wherein extensible support 930 is actuated to shift main body 920 along with load platform 910 and main lift 940 toward height support 970 and clear of barrier 902.

Figure 9G:
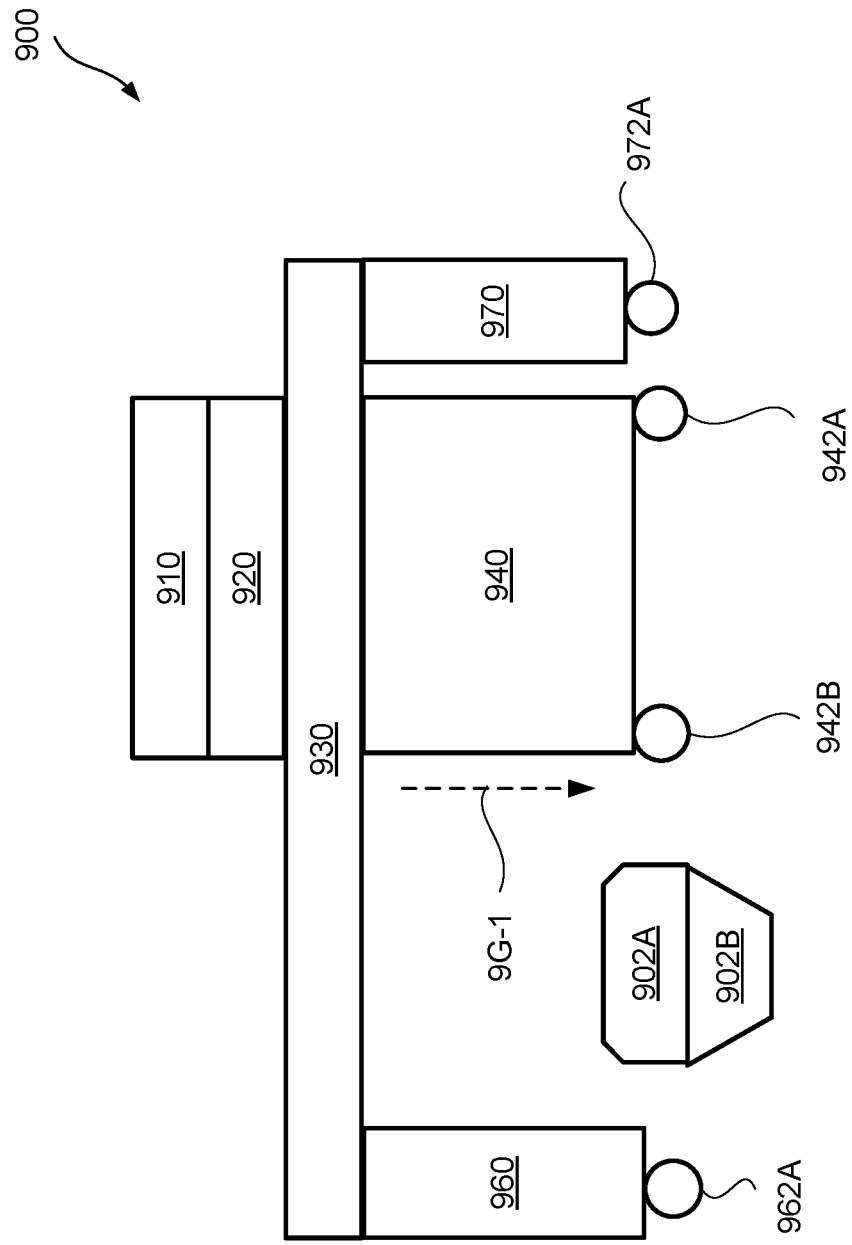
FIG. 9G is a schematic diagram showing another operational step of the self-elevating platform cart of FIG. 9A in accordance with certain examples of the disclosed technology.

FIG. 9G is a schematic diagram showing operational step 9G-1 of the self-elevating platform cart 900 wherein main lift 940 is extended until wheels 942 contact the destination surface.

Figure 9H:
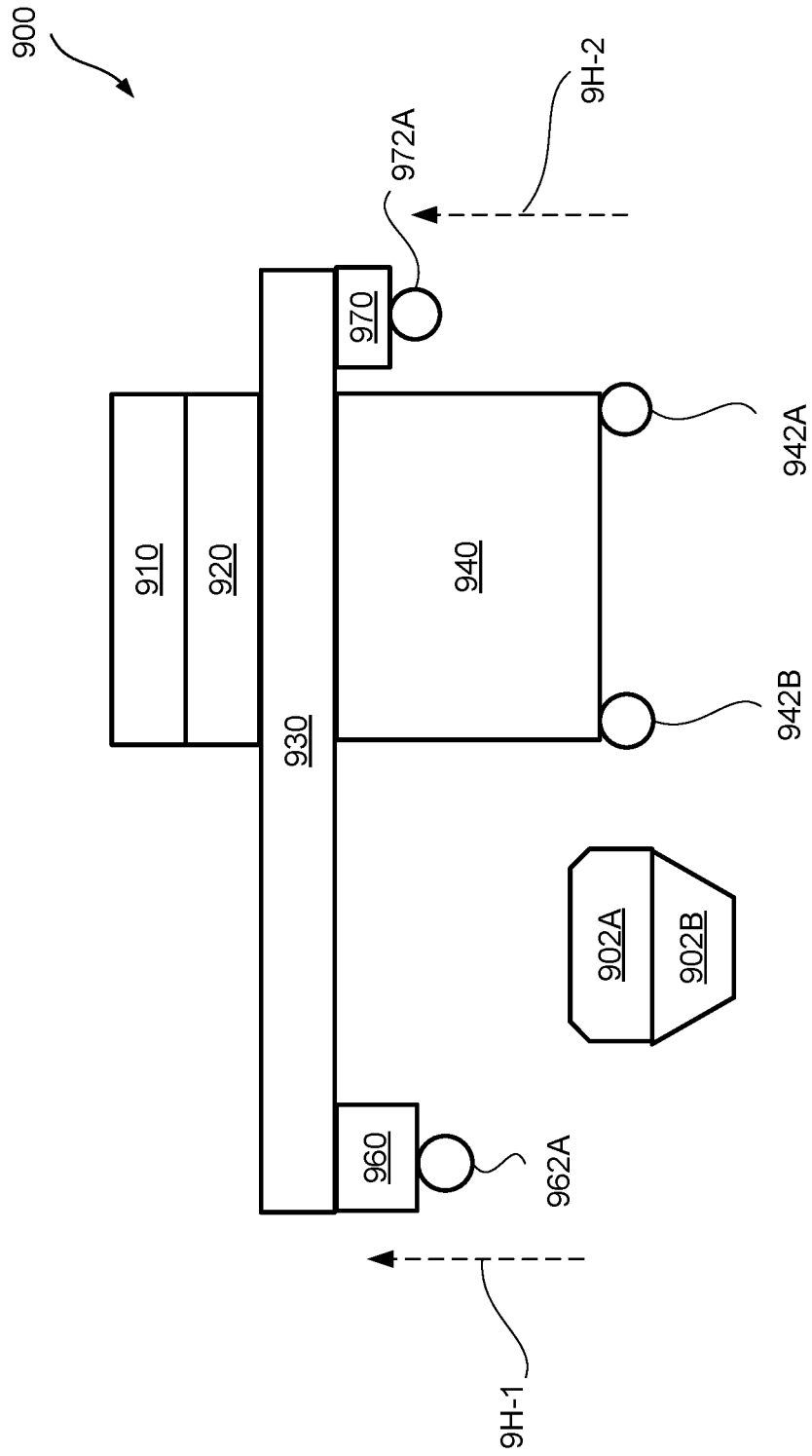
FIG. 9H is a schematic diagram showing another operational step of the self-elevating platform cart of FIG. 9A in accordance with certain examples of the disclosed technology.
Figure 9I:
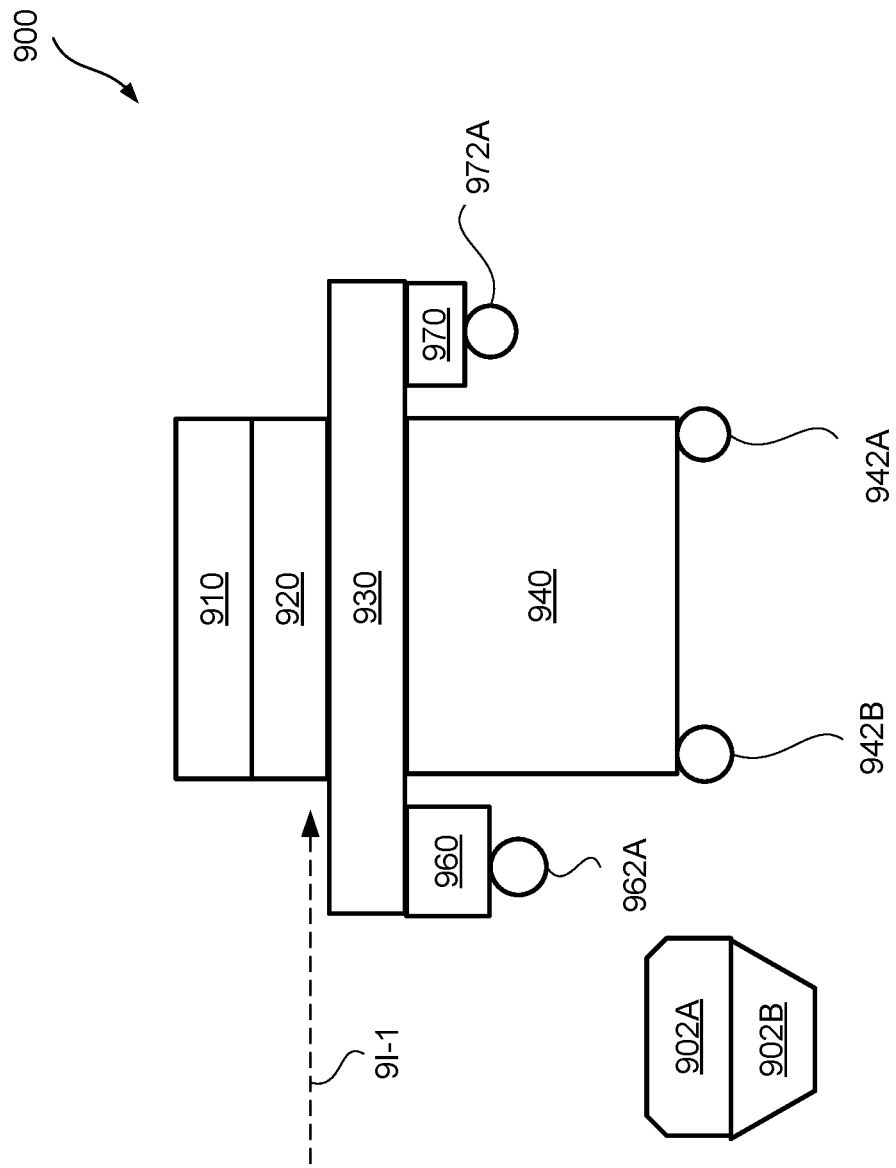
FIG. 9I is a schematic diagram showing another operational step of the self-elevating platform cart of FIG. 9A in accordance with certain examples of the disclosed technology.

FIG. 9H is a schematic diagram showing operational steps 9H-1 and 9H-2 of the self-elevating platform cart 900. At 9H-1, height support 960 is retracted and, at 9H-2, height support 970 is retracted. FIG. 9I is a schematic diagram showing operational step 9I-1 of the self-elevating platform cart 900, wherein extensible support 930 is retracted. At this point, system 900 is ready for movement on the destination surface side of barrier 902.

Figure 10:
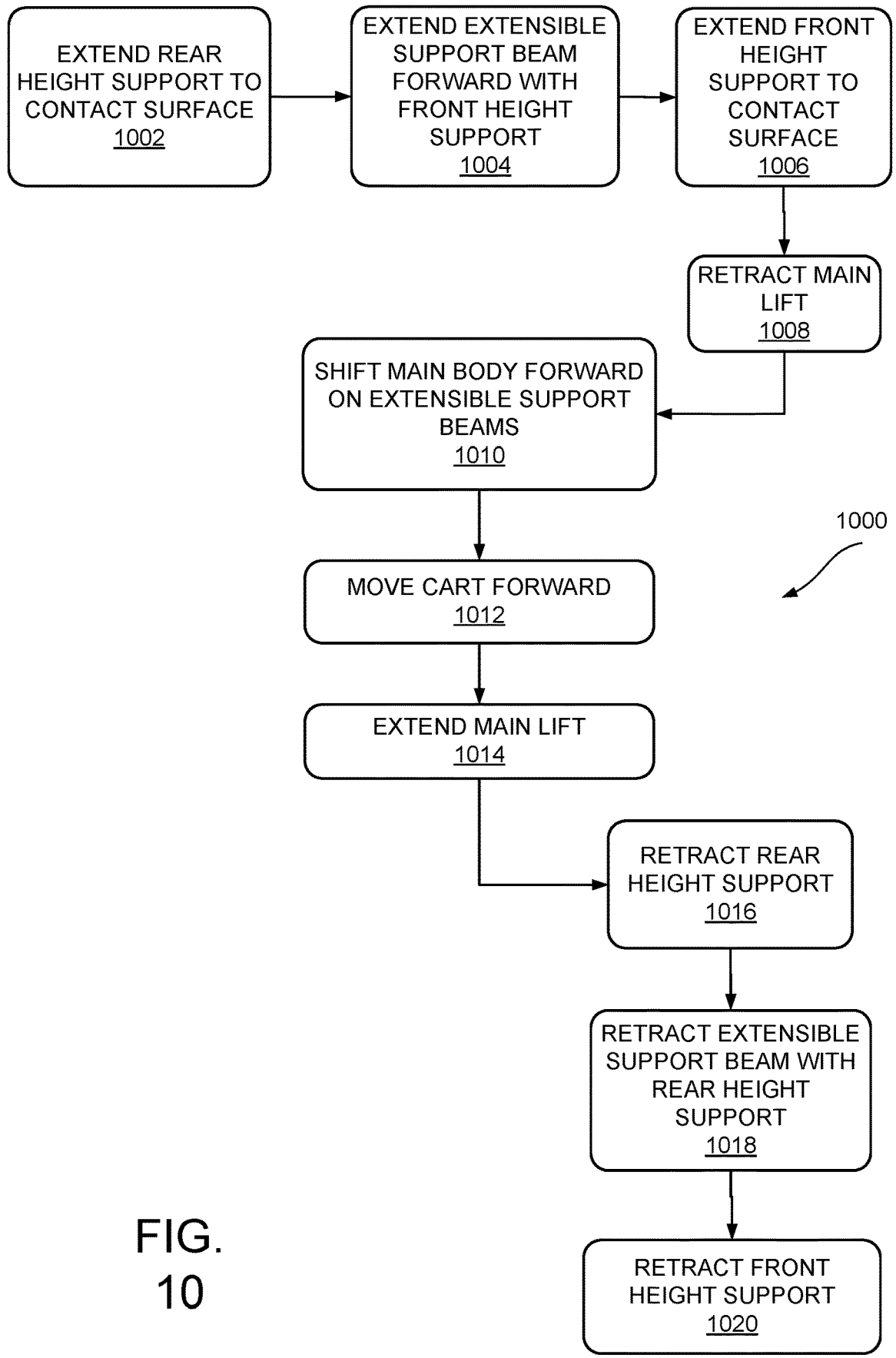
FIG. 10 is a control flow diagram showing an illustrative example of a control process for a self-elevating platform cart traversing a raised or recessed barrier in accordance with the disclosed technology.

FIG. 10 is a control flow diagram showing an illustrative example of a control process 1000 for self-elevating platform cart 900 to traverse barrier 902 in accordance with the disclosed technology.

At 1002, a rear height support, e.g. height support 960, is extended to contact the initial surface. At 1004, an extensible support, e.g. extensible support 930, is extended with a front height support, e.g. height support 970. At 1006, the front height support is extended until contact is made with a destination surface, e.g. height support 970 is extended until wheel 972 contacts the destination surface.

At 1008, the main lift is retracted to a height sufficient to clear barrier 902. At 1010, extensible support beams are actuated to move the system forward, e.g. extensible support beams are actuated to shift main body 920 forward along with load platform 910 and main lift 940.

At 1012, the cart 900 is moved forward to clear the barrier, e.g. movement 9E-1 in the direction of height support 970 such that a distance between barrier 902 and height support 970 can accommodate main lift 940. In some examples, the movement operation at 1012 can be performed by actuating motors on one or more of wheels, e.g. wheels 962 and 972.

At 1014, the main lift is extended to contact the destination surface, e.g. main lift 940 is extended until wheels 942 contact the destination surface. At 1016, the rear height support is retracted. At 1018, the extensible support is retracted with the rear height support. At 1020, the front height support is retracted. At this point, system 900 is ready for movement on the destination surface.

FIGS. 11A-E are schematic diagrams showing a side view of another example a self-elevating platform cart 1100, such as a cart, configured to climb onto a vehicle platform 1102, such as a vehicle trunk or truck bed, in accordance with certain examples of the disclosed technology. Cart 1100 is similar to the previous examples, but is simplified such that support beam 1130 is not an extensible support to which are attached height supports 1160 and 1170.

Height supports 1160 and 1170 are also fixed devices that do not extend or contract in this example. The dimensions of supports 1160 and 1170 are selected to accommodate the height of the vehicle platform 1102 and permit main lift 1140 to retract sufficiently to clear a top surface of platform 1102. In other words, a length of front height support 1170 is selected in order to clear the top surface or vehicle platform 1102 when main lift 1140 is extended and rear height support 160 and front height support 170 can support the cart 1100 at a height that permits main lift 1140 to clear the top surface of platform 1102 when retracted.

In some examples, such as when vehicle platform 1102 is a vehicle trunk, the length of front height support 1170 and the operational range of main lift 1140 can be selected to allow the main lift 1140 to be extended to a level that allows front height support 1170 to clear a barrier, such as a back bumper of a car. Main lift 1140 can then retract to bring wheel 1172A of front height support 1170 into contact with the top surface, e.g. destination surface, of platform 1102, and bring wheel 1162A of rear height support 1160 into contact with an initial surface, e.g. a ground surface next to the vehicle.

Figure 11A:
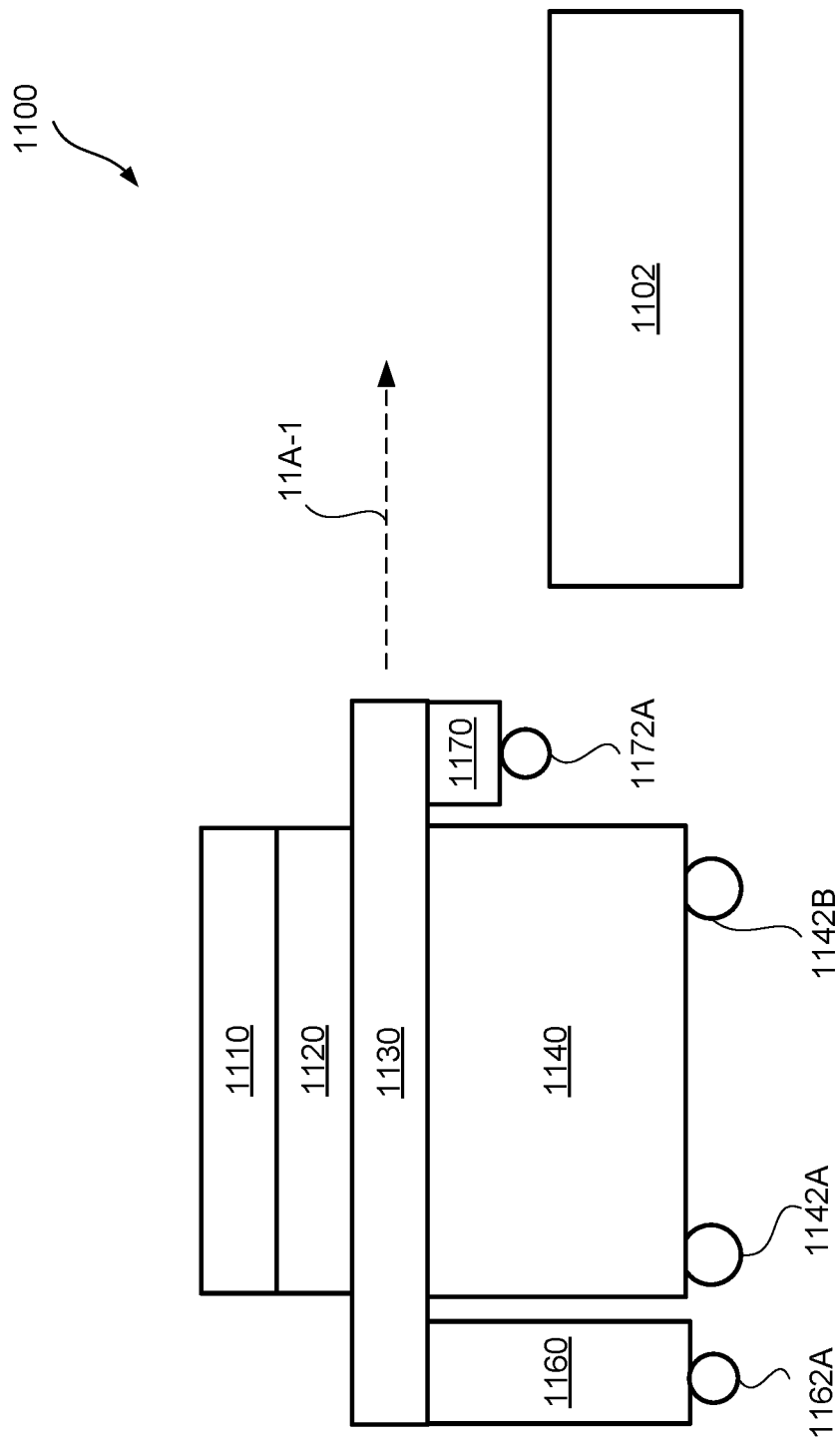
FIG. 11A is a schematic diagram showing a side view of another illustrative example a self-elevating platform cart configured to load into a vehicle platform in accordance with certain examples of the disclosed technology.

FIG. 11A shows an operational step 11A-1 wherein cart 1100 is moved forward to position front height support 1170 over the top surface of platform 1102. As noted above, in some examples, main lift 1140 may be extended before moving cart 1100 forward to provide for front height support 1170 and wheel 1172A to clear a bumper or other barrier. The movement of operational step 11A-1 can be performed by actuating motors or other drivers on one or more of wheels 1142 or 1162.

At this point, front height support 1170 with wheel 1172 is in contact with the destination surface of platform 1102 and wheel 1162 of rear height support 1160 is in contact with the initial surface. Height supports 1160 and 1170 can now bear the weight of cart 1100.

Figure 11B:
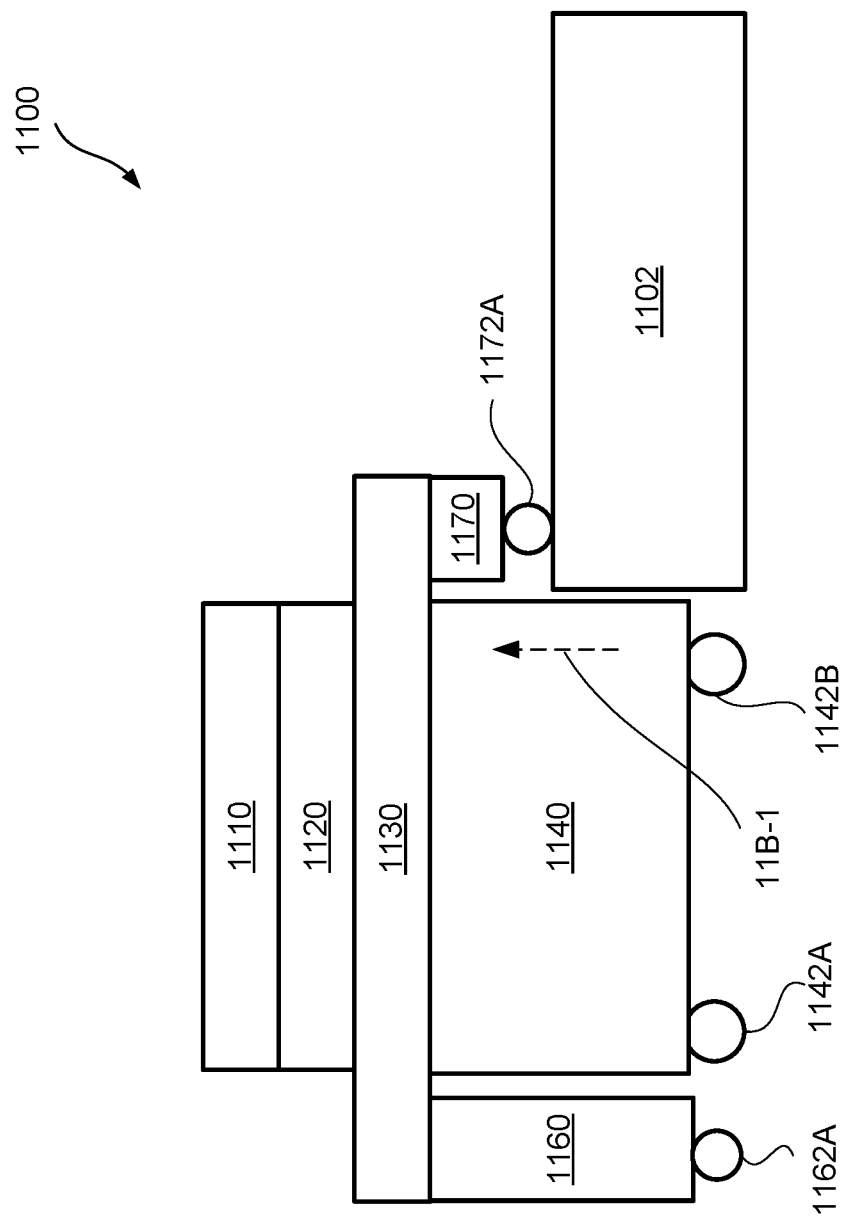
FIG. 11B is a schematic diagram showing an operational step of the self-elevating platform cart of FIG. 11A in accordance with certain examples of the disclosed technology.
Figure 11C:
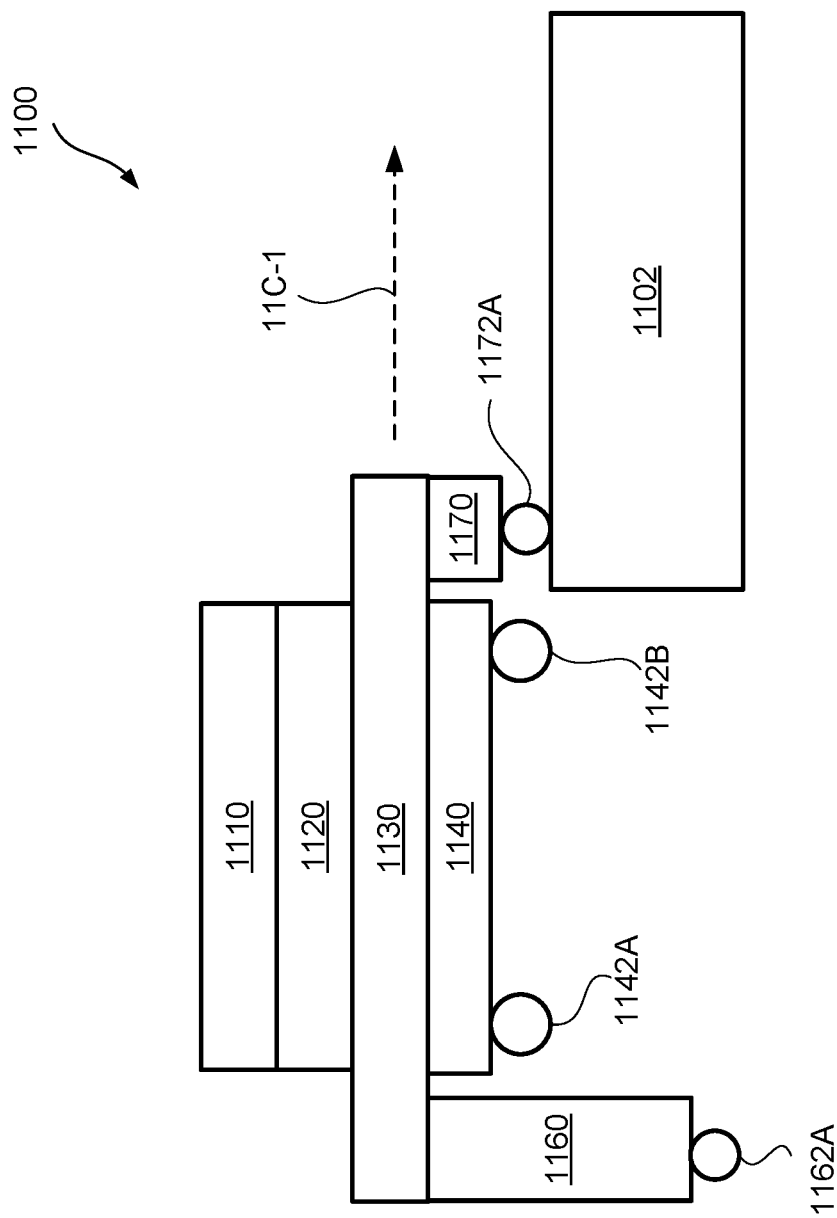
FIG. 11C is a schematic diagram showing another operational step of the self-elevating platform cart of FIG. 11A in accordance with certain examples of the disclosed technology.

FIG. 11B shows operational step 11B-1, wherein main lift 1140 is retracted to provide for main wheels 1142 to be level with the top surface of platform 1102 and front height support wheel 1172, as can be seen in FIG. 11C. At this point, cart 1100 can be moved forward over the destination surface, e.g. the top surface of platform 1102, as illustrated by operation 11C-1 in FIG. 11C. Operation 11C-1 can be performed by actuating motors or drivers in one or more of wheels 1162 or 1172.

Figure 11D:
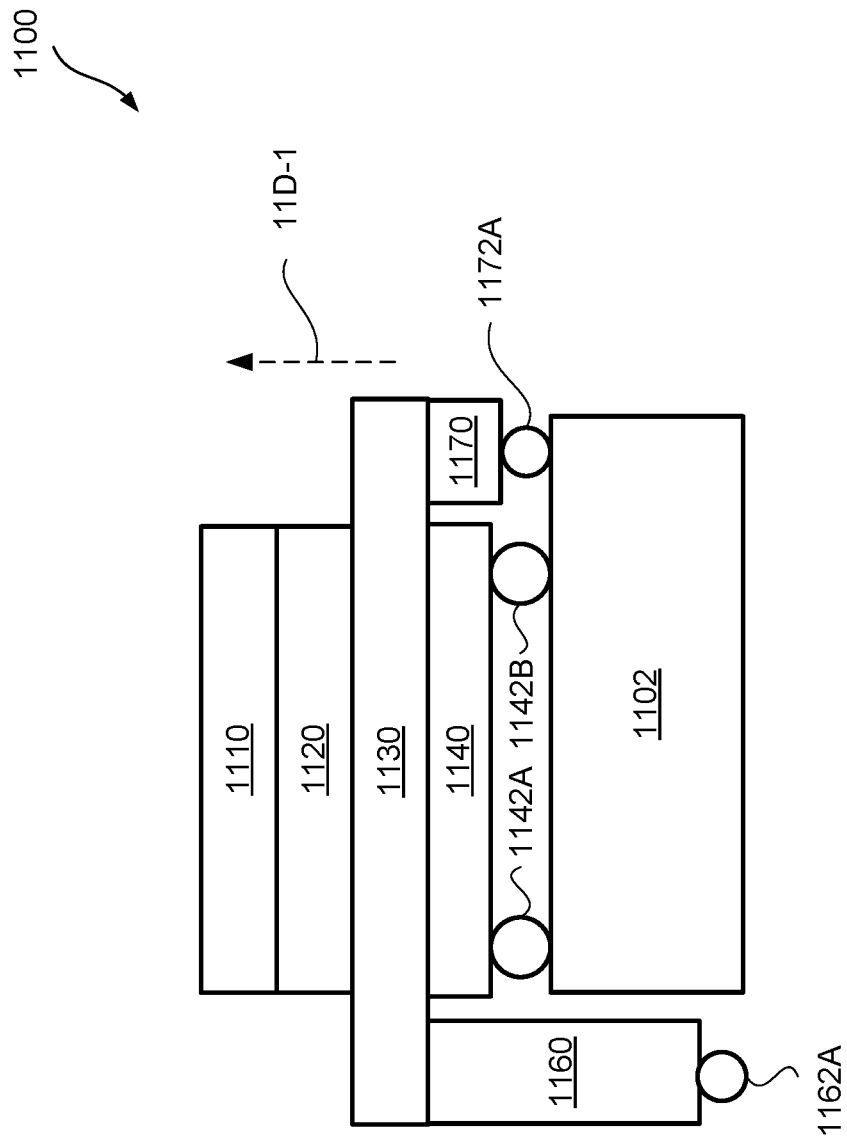
FIG. 11D is a schematic diagram showing still another operational step of the self-elevating platform cart of FIG. 11A in accordance with certain examples of the disclosed technology.
Figure 11E:
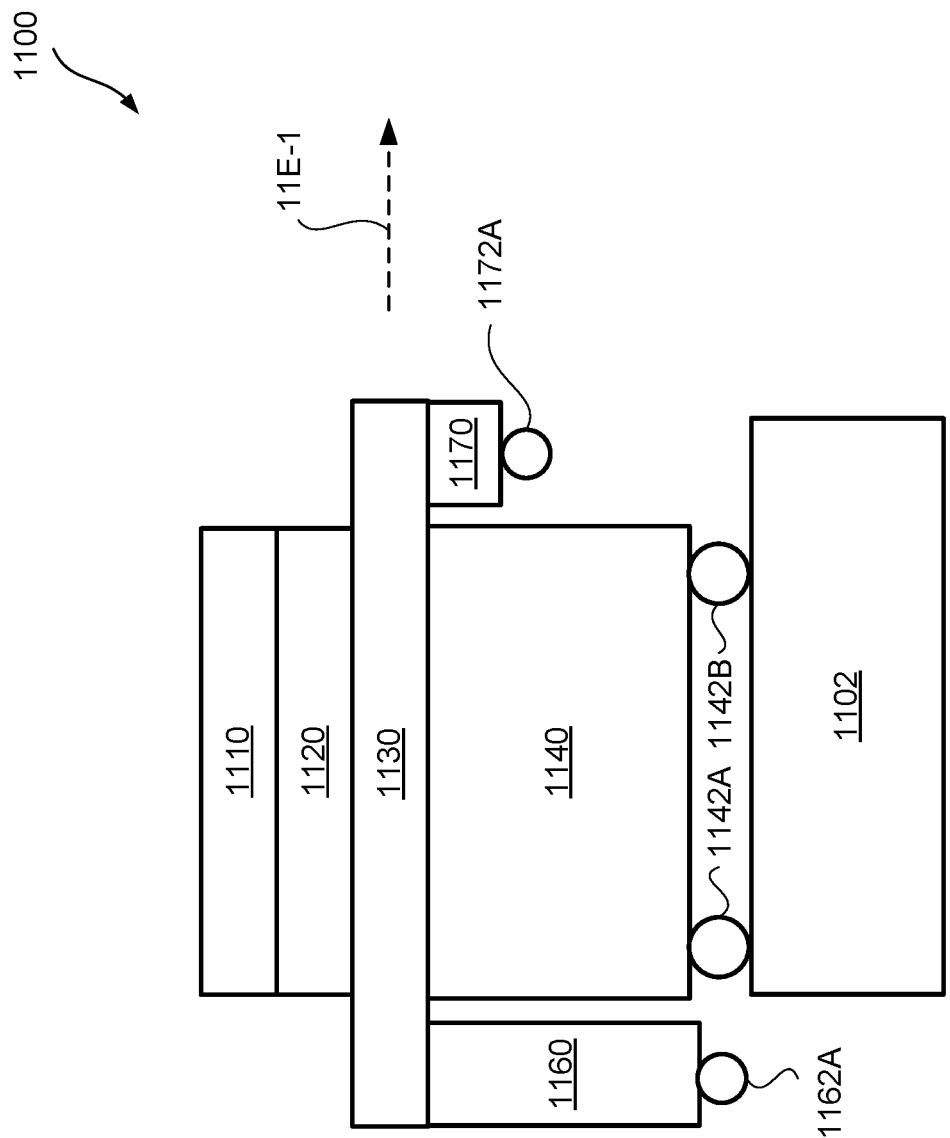
FIG. 11E is a schematic diagram showing still yet another operational step of the self-elevating platform cart of FIG. 11A in accordance with certain examples of the disclosed technology.

Once the main wheels 1142 are in contact with the destination surface, as illustrated in FIG. 11D, then the main lift 1140 can be extended at operation 11D-1. Once main lift 1140 is extended such that wheel 1162 of rear height support 1160 can clear the platform 1102 or an additional barrier associated with platform 1102, cart 1100 can be moved forward, e.g. farther into a trunk, back hatch or truck bed, at operation 11E-1.

Figure 12:
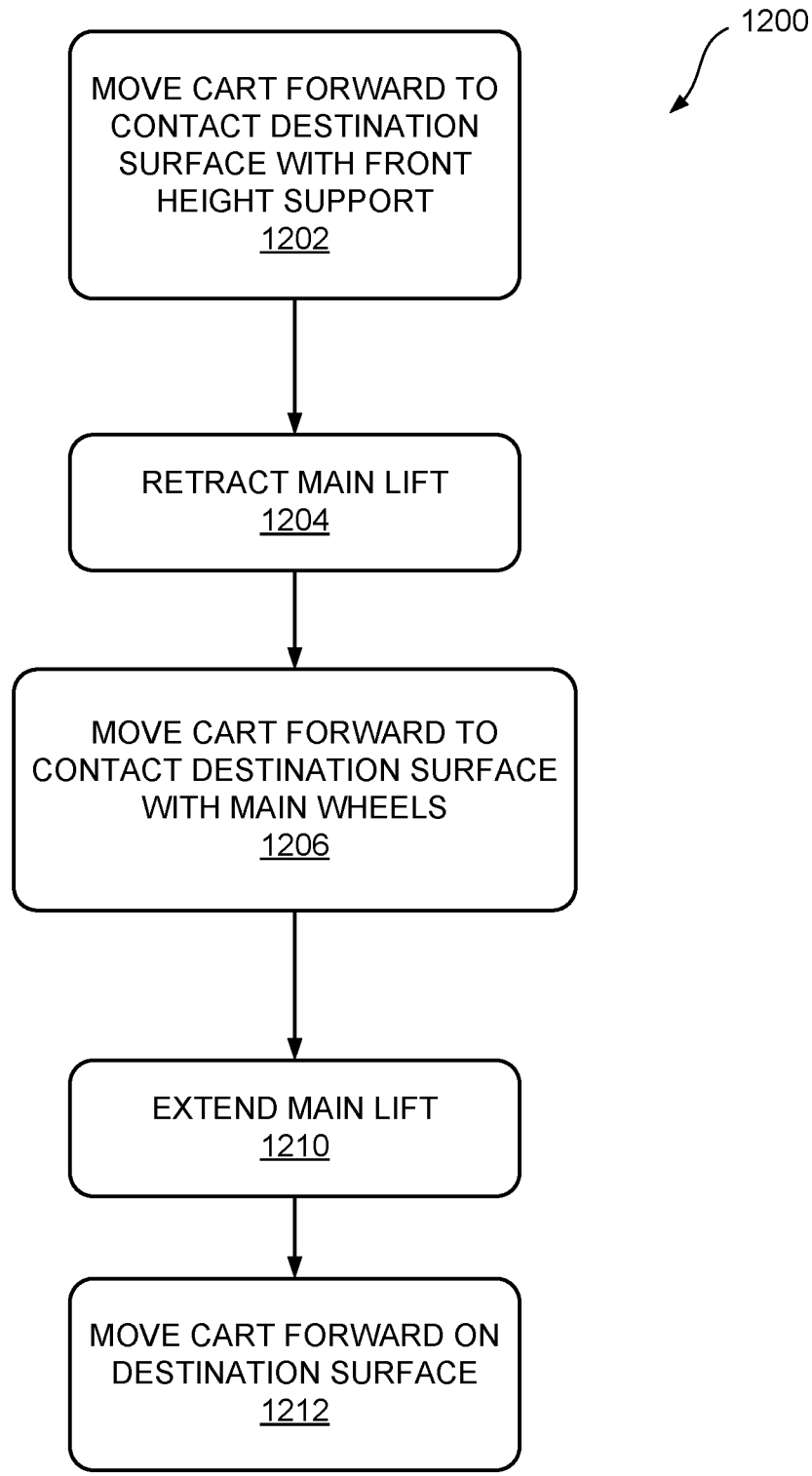
FIG. 12 is a control flow diagram showing an illustrative example of a control process for a self-elevating platform cart to load onto a vehicle platform in accordance with the disclosed technology.

FIG. 12 is a control flow diagram showing an illustrative example of a control process 1200 for self-elevating platform cart 1100 to load onto a vehicle platform 1102 in accordance with the disclosed technology.

At 1202, cart 1100 is moved forward to bring wheel 1172 into contact with the destination surface, e.g. the top surface of vehicle platform 1102. As noted above, this operation can be performed by actuating motors or other drivers in one or more of wheels 1142 or 1162.

At 1204, main lift 1140 is retracted so that it can clear the destination surface, e.g. the top surface of vehicle platform 1102. At this point, the main wheels 1142 are at a shared level with wheels 172 of front height support 1170. At 1206, cart 1100 is moved forward to bring main wheels 142 into contact with the destination surface. In some examples, operation 1206 can be performed by actuating motors or drivers in one or more of wheels 1142, 1162 and 1172.

At this point, main wheels 1142 are in contact with the destination surface. At 1210, the main lift is extended to raise cart 1100 along with rear height support 1160. At 1212, the cart can be moved forward on the destination surface.

Note that the example of FIGS. 11A-E and 12 represents a simplified system having no horizontal extensibility capability in support beam 1130 and no vertical extensibility in height supports 1160 and 1170. Other examples can include a support beam having horizontal extensibility in a single direction relative to the main body 1120. Certain examples can provide for vertical extensibility in one of the height supports. It will be readily appreciated that variations from the examples illustrated can be implemented that remain within the scope of the disclosed technology.

It will be readily appreciated that the disclosed technology enables complex and sophisticated self-elevating platform control to be configured and implemented. Many variations can be implemented that differ from the examples illustrated or go beyond the examples illustrated.

It should be appreciated that the utilization of self-elevating platform control with permissions control rules defined for a domain can provide a high degree of flexibility, complexity and variation in the configuration of implementations without departing from the teaching of the disclosed technology.

Computer Architectures for Control of Self-Elevating Carts

Note that at least parts of the processes of FIGS. 5A-F, 8A-C and 10 may be implemented in one or more servers, such as computer environment 1200 in FIG. 12, or the cloud, and data defining the results of user control input signals translated or interpreted as discussed herein may be communicated to a user device for display. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. the processes of FIGS. 5A-F, 8A-C and 10) are described herein as being implemented, at least in part, by an application, component, and/or circuit. Although the following illustration refers to the components of the processes of FIGS. 5A-F, 8A-C and 10, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the control processes of FIGS. 5A-F, 8A-C and 10 may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 13:
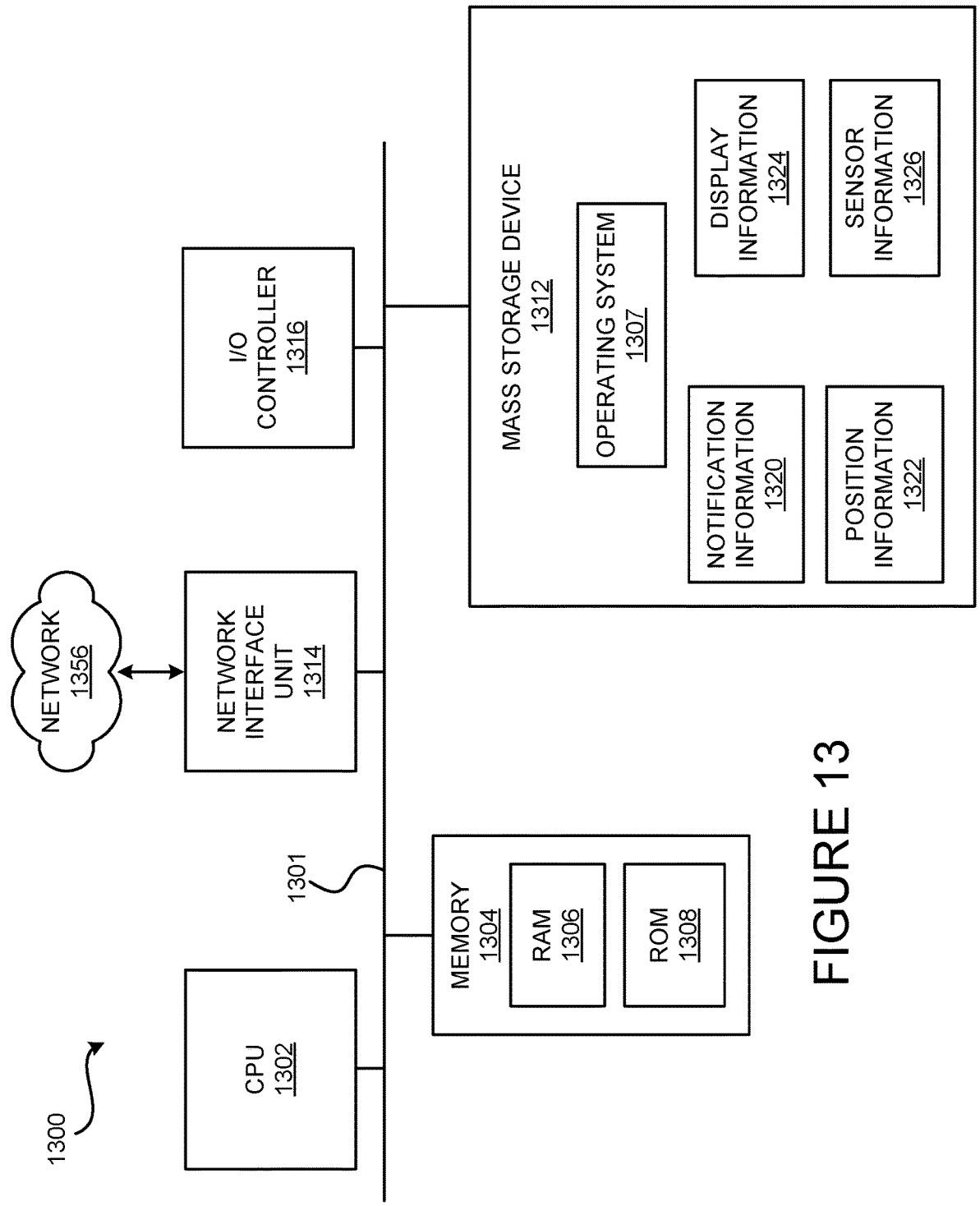
FIG. 13 is a computer architecture diagram illustrating an illustrative computer hardware and software architecture for a computing system capable of implementing aspects of the techniques and technologies presented herein.

FIG. 13 shows additional details of an example computer architecture 1300 for a computer, such as onboard computer 200 and related components in FIG. 2A, capable of executing the control processes described herein. Thus, the computer architecture 1300 illustrated in FIG. 13 illustrates an architecture for a server computer, mobile phone, a PDA, a smart phone, a desktop computer, a netbook computer, a tablet computer, an on-board computer, a game console, and/or a laptop computer. The computer architecture 1300 may be utilized to execute any aspects of the software components presented herein.

The computer architecture 1300 illustrated in FIG. 13 includes a central processing unit 1302 ("CPU"), a system memory 1304, including a random access memory 1306 ("RAM") and a read-only memory ("ROM") 1308, and a system bus 1310 that couples the memory 1304 to the CPU 1302. A basic input/output system containing the basic routines that help to transfer information between sub-elements within the computer architecture 1300, such as during startup, is stored in the ROM 1308. The computer architecture 1300 further includes a mass storage device 1312 for storing an operating system 1307, data (such as a operational and sensor data), and one or more application programs.

The mass storage device 1312 is connected to the CPU 1302 through a mass storage controller (not shown) connected to the bus 1310. The mass storage device 1312 and its associated computer-readable media provide non-volatile storage for the computer architecture 1300. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1300. For purposes the claims, the phrase "computer storage medium," "computer-readable storage medium" and variations thereof, does not include waves, signals, and/or other transitory and/or intangible communication media, per se.

According to various configurations, the computer architecture 1300 may operate in a networked environment using logical connections to remote computers through the network 1301 and/or another network (not shown). The computer architecture 1300 may connect to the network 1301 through a network interface unit 1314 connected to the bus 1310. It should be appreciated that the network interface unit 1314 also may be utilized to connect to other types of networks and remote computer systems. The computer architecture 1300 also may include an input/output controller 1316 for receiving and processing input from a number of other devices, including a keyboard, mouse, game controller, television remote or electronic stylus (not shown in FIG. 13). Similarly, the input/output controller 1316 may provide output to a display screen, a printer, or other type of output device (also not shown in FIG. 13).

It should be appreciated that the software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing devices, including hand-held computers, embedded computer systems, personal digital assistants, and other types of computing devices known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

Figure 14:
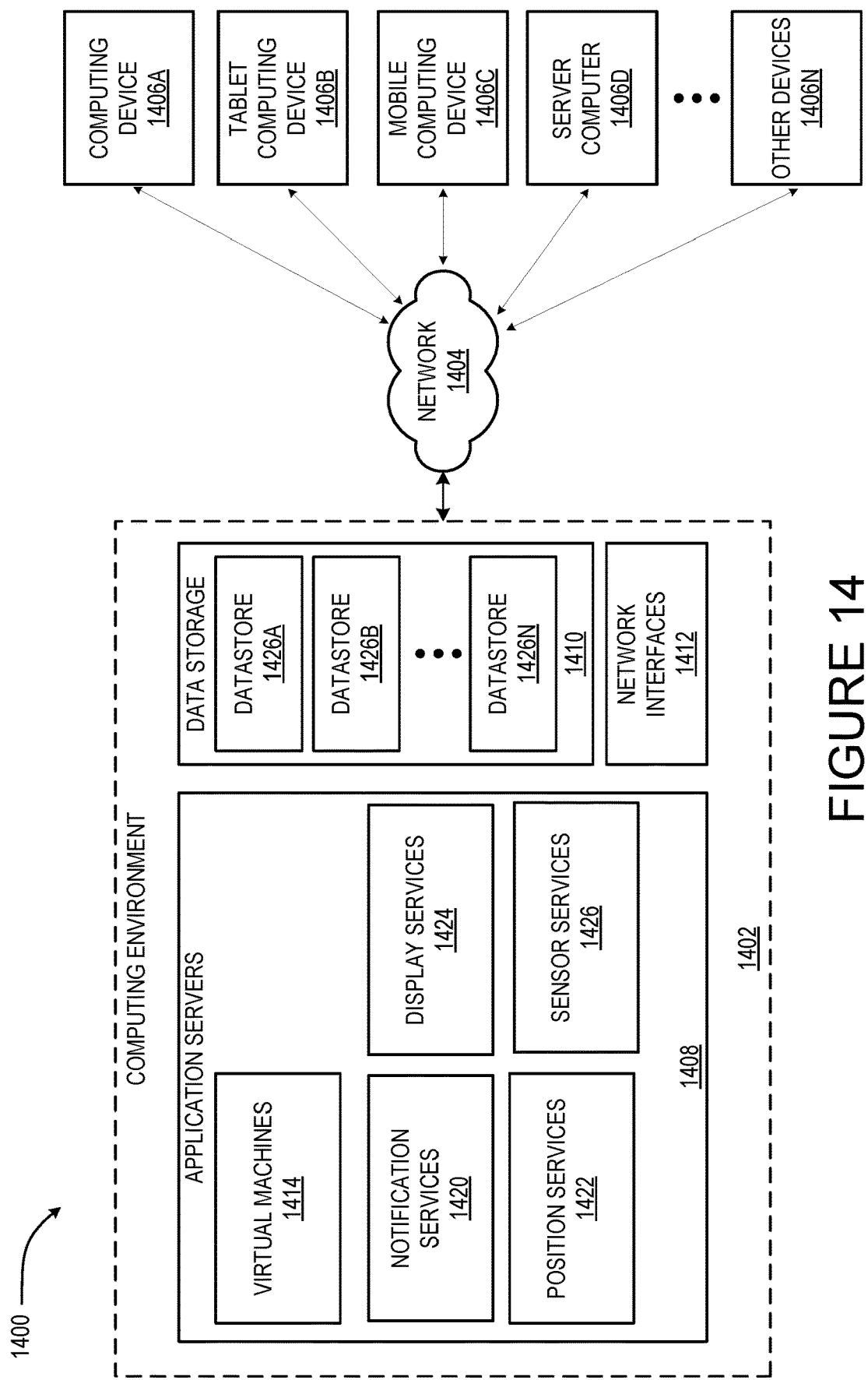
FIG. 14 is a diagram illustrating a distributed computing environment capable of implementing aspects of the techniques and technologies presented herein.

FIG. 14 depicts an illustrative distributed computing environment 1400 capable of executing the software components described herein for self-elevating platform control. Thus, the distributed computing environment 1400 illustrated in FIG. 14 can be utilized to execute many aspects of the software components presented herein. For example, the distributed computing environment 1400 can be utilized to execute one or more aspects of the software components described herein, such as optical recognition. Also, the distributed computing environment 1400 may implement components of the control processes discussed above.

According to various implementations, the distributed computing environment 1400 includes a computing environment 1402 operating on, in communication with, or as part of the network 1404. The network 1404 may be or may include the network 1456, described above. The network 1404 also can include various access networks. One or more client devices 1406A-1406N (hereinafter referred to collectively and/or generically as "clients 1406") can communicate with the computing environment 1402 via the network 1404 and/or other connections (not illustrated in FIG. 14). In one illustrated configuration, the clients 1406 include a computing device 1406A, such as a laptop computer, a desktop computer, or other computing device; a slate or tablet computing device ("tablet computing device") 1406B; a mobile computing device 1406C such as a mobile telephone, a smart phone, an on-board computer, or other mobile computing device; a server computer 1406D; and/or other devices 1406N, which can include a hardware security module. It should be understood that any number of devices 1406 can communicate with the computing environment 1402. Two example computing architectures for the devices 1406 are illustrated and described herein with reference to FIGS. 13 and 14. It should be understood that the illustrated devices 1406 and computing architectures illustrated and described herein are illustrative only and should not be construed as being limited in any way.

In the illustrated configuration, the computing environment 1402 includes application servers 1408, data storage 1410, and one or more network interfaces 1412. According to various implementations, the functionality of the application servers 1408 can be provided by one or more server computers that are executing as part of, or in communication with, the network 1404. The application servers 1408 can host various services, virtual machines, portals, and/or other resources. In the illustrated configuration, the application servers 1408 host one or more virtual machines 1414 for hosting applications or other functionality. According to various implementations, the virtual machines 1414 host one or more applications and/or software modules for control of a self-elevating platform cart. It should be understood that this configuration is illustrative only and should not be construed as being limiting in any way.

According to various implementations, the application servers 1408 also include one or more notification services 1420 and one or more position services 1422. The notification services 1420 can include services for managing and maintaining a self-elevating platform cart, such as self-elevating systems 100, 300, 400, 600, 700 and 900 described above. The display services 1424 can include services for providing status information to a user via a user interface. The sensor services 1426 can include services for monitoring, processing and communicating sensor data for use in the control processes described above.

As shown in FIG. 14, the application servers 1408 also can host other services, applications, portals, and/or other resources. The other resources can include, but are not limited to, data encryption, data sharing, or any other functionality.

As mentioned above, the computing environment 1402 can include data storage 1410. According to various implementations, the functionality of the data storage 1410 is provided by one or more databases or data stores operating on, or in communication with, the network 1404. The functionality of the data storage 1410 also can be provided by one or more server computers configured to host data for the computing environment 1402. The data storage 1410 can include, host, or provide one or more real or virtual data stores 1426A-1426N (hereinafter referred to collectively and/or generically as "datastores 1426"). The datastores 1426 are configured to host data used or created by the application servers 1408 and/or other data. Aspects of the datastores 1426 may be associated with services for a self-elevating platform control process. Although not illustrated in FIG. 14, the datastores 1426 also can host or store web page documents, word documents, presentation documents, data structures, algorithms for execution by a recommendation engine, and/or other data utilized by any application program or another module.

The computing environment 1402 can communicate with, or be accessed by, the network interfaces 1412. The network interfaces 1412 can include various types of network hardware and software for supporting communications between two or more computing devices including, but not limited to, the clients 1406 and the application servers 1408. It should be appreciated that the network interfaces 1412 also may be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1400 may provide the software functionality described herein as a service to the clients using devices 1406. It should be understood that the devices 1406 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 1400 to utilize the functionality described herein for supporting a self-elevating platform control process, among other aspects.

Turning now to FIG. 15, an illustrative computing device architecture 1500 for a computing device that is capable of executing various software components is described herein for supporting a self-elevating platform control process. The computing device architecture 1500 is applicable to computing devices that can support a self-elevating platform control process. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 1500 is applicable to supporting some of the control functions for the onboard computer 200 in FIG. 2A.

The computing device architecture 1500 illustrated in FIG. 15 includes a processor 1502, memory components 1504, network connectivity components 1506, sensor components 1508, input/output components 1510, and power components 1512. In the illustrated configuration, the processor 1502 is in communication with the memory components 1504, the network connectivity components 1506, the sensor components 1508, the input/output ("I/O") components 1510, and the power components 1512. Although no connections are shown between the individual components illustrated in FIG. 15, the components can interact to carry out device functions. In some configurations, the components are arranged so as to communicate via one or more busses (not shown).

The processor 1502 includes a central processing unit ("CPU") configured to process data, execute computer-executable instructions of one or more application programs, and communicate with other components of the computing device architecture 1500 in order to perform various functionality described herein. The processor 1502 may be utilized to execute aspects of the software components presented herein and, particularly, those that utilize, at least in part, secure data.

In some configurations, the processor 1502 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 1502 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 1502 is, or is included in, a system-on-chip ("SoC") along with one or more of the other components described herein below. For example, the SoC may include the processor 1502, a GPU, one or more of the network connectivity components 1506, and one or more of the sensor components 1508. In some configurations, the processor 1502 is fabricated, in part, utilizing a package-on-package ("PoP") integrated circuit packaging technique. The processor 1502 may be a single core or multi-core processor.

The processor 1502 may be created in accordance with an ARM architecture, available for license from ARM HOLDINGS of Cambridge, United Kingdom. Alternatively, the processor 1502 may be created in accordance with an x86 architecture, such as is available from INTEL CORPORATION of Mountain View, California and others. In some configurations, the processor 1502 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 1504 include a random access memory ("RAM") 1514, a read-only memory ("ROM") 1516, an integrated storage memory ("integrated storage") 1518, and a removable storage memory ("removable storage") 1520. In some configurations, the RAM 1514 or a portion thereof, the ROM 1516 or a portion thereof, and/or some combination of the RAM 1514 and the ROM 1516 is integrated in the processor 1502. In some configurations, the ROM 1516 is configured to store a firmware, an operating system or a portion thereof (e.g., operating system kernel), and/or a bootloader to load an operating system kernel from the integrated storage 1518 and/or the removable storage 1520.

The integrated storage 1518 can include a solid-state memory, a hard disk, or a combination of solid-state memory and a hard disk. The integrated storage 1518 may be soldered or otherwise connected to a logic board upon which the processor 1502 and other components described herein also may be connected. As such, the integrated storage 1518 is integrated in the computing device. The integrated storage 1518 is configured to store an operating system or portions thereof, application programs, data, and other software components described herein.

The removable storage 1520 can include a solid-state memory, a hard disk, or a combination of solid-state memory and a hard disk. In some configurations, the removable storage 1520 is provided in lieu of the integrated storage 1518. In other configurations, the removable storage 1520 is provided as additional optional storage. In some configurations, the removable storage 1520 is logically combined with the integrated storage 1518 such that the total available storage is made available as a total combined storage capacity. In some configurations, the total combined capacity of the integrated storage 1518 and the removable storage 1520 is shown to a user instead of separate storage capacities for the integrated storage 1518 and the removable storage 1520.

The removable storage 1520 is configured to be inserted into a removable storage memory slot (not shown) or other mechanism by which the removable storage 1520 is inserted and secured to facilitate a connection over which the removable storage 1520 can communicate with other components of the computing device, such as the processor 1502. The removable storage 1520 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1504 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Washington or AWS from Amazon Corporation of Seattle, Washington The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California Other operating systems are contemplated.

The network connectivity components 1506 include a wireless wide area network component ("WWAN component") 1522, a wireless local area network component ("WLAN component") 1524, and a wireless personal area network component ("WPAN component") 1526. The network connectivity components 1506 facilitate communications to and from the network 1556 or another network, which may be a WWAN, a WLAN, or a WPAN. Although only the network 1556 is illustrated, the network connectivity components 1506 may facilitate simultaneous communication with multiple networks, including the network 1556 of FIG. 15. For example, the network connectivity components 1506 may facilitate simultaneous communications with multiple networks via one or more of a WWAN, a WLAN, or a WPAN.

The network 1556 may be or may include a WWAN, such as a mobile telecommunications network utilizing one or more mobile telecommunications technologies to provide voice and/or data services to a computing device utilizing the computing device architecture 1500 via the WWAN component 1522. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1556 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1556 may be configured to provide voice and/or data communications with any combination of the above technologies. The network 1556 may be configured to or be adapted to provide voice and/or data communications in accordance with future generation technologies.

In some configurations, the WWAN component 1522 is configured to provide dual-multi-mode connectivity to the network 1556. For example, the WWAN component 1522 may be configured to provide connectivity to the network 1556, wherein the network 1556 provides service via GSM and UMTS technologies, or via some other combination of technologies. Alternatively, multiple WWAN components 1522 may be utilized to perform such functionality, and/or provide additional functionality to support other non-compatible technologies (i.e., incapable of being supported by a single WWAN component). The WWAN component 1522 may facilitate similar connectivity to multiple networks (e.g., a UMTS network and an LTE network).

The network 1556 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1524 is configured to connect to the network 1556 via the WI-FI access points. Such connections may be secured via various encryption technologies including, but not limited to, WI-FI Protected Access ("WPA"), WPA2, Wired Equivalent Privacy ("WEP"), and the like.

The network 1556 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1526 is configured to facilitate communications with other devices, such as peripherals, computers, or other computing devices via the WPAN.

The sensor components 1508 include a magnetometer 1528, an ambient light sensor 1530, a proximity sensor 1532, an accelerometer 1534, a gyroscope 1536, and a Global Positioning System sensor ("GPS sensor") 1538. It is contemplated that other sensors, such as, but not limited to, temperature sensors or shock detection sensors, also may be incorporated in the computing device architecture 1500.

The I/O components 1510 include a display 1540, a touchscreen 1542, a data I/O interface component ("data I/O") 1544, an audio I/O interface component ("audio I/O") 1546, a video I/O interface component ("video I/O") 1548, and a camera 1550. In some configurations, the display 1540 and the touchscreen 1542 are combined. In some configurations two or more of the data I/O component 1544, the audio I/O component 1546, and the video I/O component 1548 are combined. The I/O components 1510 may include discrete processors configured to support the various interfaces described below or may include processing functionality built-in to the processor 1502.

The illustrated power components 1512 include one or more batteries 1552, which can be connected to a battery gauge 1554. The batteries 1552 may be rechargeable or disposable. Rechargeable battery types include, but are not limited to, lithium polymer, lithium ion, nickel cadmium, and nickel metal hydride. Each of the batteries 1552 may be made of one or more cells.

The power components 1512 may also include a power connector, which may be combined with one or more of the aforementioned I/O components 1510. The power components 1512 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Although some of the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A self-elevating platform system, the system comprising:
    a main body structure;
    a payload platform for carrying a payload coupled to the main body;
    a main lift coupled to the main body and configured to be actuated to retract and extend, where the main lift includes a plurality of main wheels;
    extensible support beams coupled to the main body and configured to be actuated to extend in first and second directions that are lateral to the main body, where the first direction is opposite to the second direction, and the extensible support beams are configured to support a weight of the system;
    a first height support coupled to the extensible support beams such that the first height support can be extended in the first direction by the extensible support beams, the first height support having a plurality of first wheels;
    a second height support coupled to the extensible support beams such that the second height support can be extended in the second direction by the extensible support beams, the second height support having a plurality of second wheels and the second height support is configured to be actuated to vertically extend and retract the second wheels; and a controller module having one or more processors and one or more memory devices in communication with the one or more processors, the controller being configured to actuate the main lift, the extensible support beams and the second height support, and the memory devices having computer-readable instructions stored thereupon that, when executed by the processors, cause the processors to perform a method for self-elevating platform control comprising, when a destination surface is at a higher level than an initial surface:
extending the extensible support beams in the first direction to position the first wheels over the destination surface,
extending the second height support until the second wheels contact the initial surface,
retracting the main lift,
shifting the main body in the first direction on the extensible support beams,
extending the main lift after the system has been moved in the first direction until the main wheels contact the destination surface,
retracting the second height support, and
retracting the extensible support beams.

2. The system of claim 1, where:
one or more of the first wheels and second wheels is configured to be actuated to move the system in the first direction;
the controller module is further configured to actuate the one or more of the first wheels and second wheels; and
the method for self-elevating platform control includes:
automatically moving the system in the first direction until the main wheels are positioned above the destination surface.

3. The system of claim 1, where:
the first height support is further configured to be actuated to vertically extend and retract the first wheels; and
the method for self-elevating platform control includes:
extending the first height support until the first wheels contact the destination surface.

4. The system of claim 1, where the method for self-elevating platform control comprising, when the destination surface is at a lower level than the initial surface:
extending the extensible support beams in the second direction to position the second wheels over the destination surface,
retracting the main lift,
extending the second height support until the second wheels contact the destination surface,
shifting the main body in the second direction on the extensible support beams,
extending the main lift until the main wheels contact the destination surface after the system has been moved in the second direction until the main wheels are positioned above the destination surface,
retracting the second height support, and
retracting the extensible support beams.

5. The system of claim 1, where the extensible support beams comprise:
a first set of extensible support beams coupled to the first height support, the first set of extensible support beams being slidably coupled to the main body to permit lateral motion in the first and second directions and vertical support;
a first actuator coupled between the first height support and the main body and configured to apply force in at least one of the first and second lateral directions;

a second set of extensible support beams coupled to the second height support, the second set of support beams being slidably coupled to the main body to permit lateral motion in the first and second directions and vertical support; and
a second actuator coupled between the second height support and the main body and configured to apply force in at least one of the first and second lateral directions.

6. The system of claim 5, wherein:
the main body comprises first and second side frames and first and second end frames, where the first and second end frames are coupled between the first and second side frames;
a first one of the first set of support beams is slidably coupled to the first side frame with a first linear guide;
a second one of the first set of support beams is slidably coupled to the second side frame with a second linear guide;
a first one of the second set of support beams is slidably coupled to the first side frame with a third linear guide;
a second one of the second set of support beams is slidably coupled to the second side frame with a fourth linear guide;
the first actuator is coupled to the first end frame; and
the second actuator is coupled to the second end frame.

7. The system of claim 1, where the load platform comprises one of a cargo box, a platform, a person carrier, and a cargo box having at least one side configured to be lowered to facilitate removal of items.

8. The system of claim 1, wherein the main lift includes a power actuator capable of lifting and lowering the weight of the system and the first and second height supports are configured to maintain height support of the weight of the system.

9. A system for self-elevating platform control, the system comprising:
a main body structure;
a payload platform for carrying a payload coupled to the main body;
a main lift coupled to the main body and configured to be actuated to retract and extend, where the main lift includes:
a first set of main wheels attached to the main lift,
a second set of main wheels,
a vertical stabilizer attached to the main lift and configured to be actuated to vertically extend and retract the second set of main wheels;
extensible support beams coupled to the main body and configured to be actuated to extend in first and second directions that are lateral to the main body, where the first direction is opposite to the second direction, and the extensible support beams are configured to support a weight of the system;
a first height support coupled to the extensible support beams such that the first height support can be extended in the first direction by the extensible support beams, the first height support having a plurality of first wheels;
a second height support coupled to the extensible support beams such that the second height support can be extended in the second direction by the extensible support beams, the second height support having a plurality of second wheels and the second height support is configured to be actuated to vertically extend and retract the second wheels; and a controller module having one or more processors and one or more memory devices in communication with the one or more processors, the controller being configured to actuate the main lift, the extensible support beams, the second height support, and the vertical stabilizer, and the memory devices having computer-readable instructions stored thereupon that, when executed by the processors, cause the processors to perform a method for self-elevating platform control comprising, when the system is positioned on an initial surface with at least first, second and third step surfaces, where the first step surface is higher than the initial surface, the second step surface is higher than the first step surface, and the third step surface is higher than the second step surface:

extending the extensible support beams in the first direction to position the first wheels over the second step surface, contacting the second step surface with the first wheels of the first height support, extending the second height support until the second wheels contact the initial surface, retracting the main lift, shifting the main body in the first direction on the extensible support beams until the first set of main wheels are above the first step surface and the second set of main wheels are above the initial surface, extending the main lift until the first set of main wheels contacts the first step surface, adjusting the vertical stabilizer until the second set of main wheels contacts the initial surface, extending the main lift to raise the main body up from the first step surface, retracting the extensible support beams to move the second height support in the first direction until the second height support is adjacent to the main lift, and extending the extensible support beams in the first direction to position the first wheels over the third step surface, contacting the third step surface with the first height support, extending the second height support until the second wheels contact the initial surface, retracting the main lift, retracting the vertical stabilizer, shifting the main body in the first direction on the extensible support beams until the first set of main wheels are above the first step surface and the second set of main wheels are above the second step surface, extending the main lift until the first set of main wheels contacts the second step surface, if the second set of mains wheels is not in contact with the first step surface, adjusting the vertical stabilizer until the second set of main wheels contacts the first step surface, extending the main lift to raise the main body up from the second step surface, retracting the extensible support beams to move the second height support in the first direction until the second height support is adjacent to the main lift and above the first step surface, extending the second height support until the second wheels contact the first step surface.

10. The system of claim 9, wherein:
the first height support is further configured to be actuated to vertically extend and retract the first wheels;
the controller is further configured to actuate the first height support;

the step of contacting the second step surface with the first wheels of the first height support comprises extending the first height support to until the first wheels contact the second step surface; and the step of contacting the third step surface with the first wheels of the first height support comprises extending the first height support until the first wheels contact the third step surface; and the method includes retracting the first height support.

11. The system of claim 10, wherein the method for self-elevating platform control includes:
extending the first height support until the first wheels make surface contact;
determining whether the contacted surface is the third step surface;
if the third step surface is determined to be the contacted surface, then:
retracting the main lift,
retracting the vertical stabilizer to retract the second set of main wheels,
shifting the main body in the first direction on the extensible support beams until the first and second sets of main wheels are above the third step surface,
extending the main lift to raise the main body up from the third step surface,
retracting the first height support to an inactive position of the first height support,
retracting the second height support to an inactive position of the second height support, and
retracting the extensible support beams to move the second height support in the first direction until the second height support is adjacent to the main lift.

12. The system of claim 11, where:
the system includes one or more sensors configured to sense surfaces proximate to the system, and
the step of determining whether the contacted surface is the third step surface comprises using sensor data from the one or more sensors to determine whether the contacted surface is the third step surface.

13. The system of claim 10, where the method for self-elevating platform control includes, when the system is positioned on the initial surface, the first step surface is lower than the initial surface, the second step surface is lower than the first step surface, and the third step surface is lower than the second step surface:
retracting the main lift to lower the main body towards the initial surface;
extending the first height support until the first wheels contact the initial surface;
extending the extensible support beams with the second height support;
extending the second height support until the second wheels contact the second step surface;
shifting the main body in the second direction on the extensible support beams until the first set of main wheels are above the first step surface and the second set of main wheels are above the second step surface;
a first retracting of the vertical stabilizer;
extending the main lift until the first set of main wheels contacts the first step surface;
adjusting the vertical stabilizer until the second set of main wheels contact the second step surface;
retracting the extensible support beams with the first height support until the first height support is adjacent to the main lift;

retracting the first height support;
retracting the second height support;
retracting the main lift;
extending the first height support until the first wheels contact the first step surface;
extending the extensible support beams with the second height support;
extending the second height support until the second wheels contact the third step surface;
shifting the main body in the second direction on the extensible support beams until the first set of main wheels are above the second step surface and the second set of main wheels are above the third step surface;
a second retracting of the vertical stabilizer; and
extending the main lift until the first set of main wheels contacts the second step surface.

14. The system of claim 13 wherein the method for self-elevating platform control includes:
determining whether the third step surface is the destination surface;
if the third step surface is determined to be the destination surface, then:
extending the main lift to contact the third step surface,
retracting the second height support to the inactive position of the second height support,
retracting the first height support to the inactive position of the first height support, and
retracting the extensible support beams to move the first height support in the first direction until the first height support is adjacent to the main lift.

15. The system of claim 9, where the extensible support beams comprise:
a first set of support beams coupled to the first height support, the first set of support beams being slidably coupled to the main body to permit lateral motion in the first and second directions and vertical support;
a first actuator coupled between the first height support and the main body and configured to apply force in at least one of the first and second lateral directions;
a second set of support beams coupled to the second height support, the second set of support beams being slidably coupled to the main body to permit lateral motion in the first and second directions and vertical support; and
a second actuator coupled between the second height support and the main body and configured to apply force in at least one of the first and second lateral directions.

16. The system of claim 15, wherein:
the main body comprises first and second side frames and first and second end frames, where the first and second end frames are coupled between the first and second side frames;
a first one of the first set of support beams is slidably coupled to the first side frame with a first linear guide;
a second one of the first set of support beams is slidably coupled to the second side frame with a second linear guide;
a first one of the second set of support beams is slidably coupled to the first side frame with a third linear guide;
a second one of the second set of support beams is slidably coupled to the second side frame with a fourth linear guide;
the first actuator is coupled to the first end frame; and
the second actuator is coupled to the second end frame.

17. The system of claim 9, wherein the main lift includes a power actuator capable of lifting and lowering the weight of the system and the first and second height supports are configured to maintain support of the weight of the system.

18. The system of claim 9, wherein the method for self-elevating platform control includes:
if the first wheels of the first height support have contacted the third step surface, then:
extending the main lift to raise the main body up from the third step surface,
retracting the first height support to the inactive position of the first height support, and
retracting the second height support to the inactive position of the second height support, and
retracting the extensible support beams to move the second height support in the first direction until the second height support is adjacent to the main lift.

19. The system of claim 9, where the method for self-elevating platform control includes, when the system is positioned on the initial surface, the first step surface is lower than the initial surface, the second step surface is lower than the first step surface, and the third step surface is lower than the second step surface:
retracting the main lift until the first wheels of the first height support contact the initial surface;
extending the extensible support beams with the second height support;
extending the second height support until the second wheels contact the second step surface;
shifting the main body in the second direction on the extensible support beams until the first set of main wheels are above the first step surface and the second set of main wheels are above the second step surface;
a first retracting of the vertical stabilizer;
extending the main lift until the first set of main wheels contacts the first step surface;
adjusting the vertical stabilizer until the second set of main wheels contact the second step surface;
retracting the extensible support beams with the first height support until the first height support is adjacent to the main lift;
retracting the second height support to an inactive position;
retracting the main lift until the first wheels of the first height support contact the second step surface;
extending the extensible support beams with the second height support;
extending the second height support until the second wheels contact the third step surface;
shifting the main body in the second direction on the extensible support beams until the first set of main wheels are above the second step surface and the second set of main wheels are above the third step surface;
a second retracting of the vertical stabilizer;
extending the main lift until the first set of main wheels contacts the second step surface;
adjusting the vertical stabilizer until the second set of main wheels contact the third step surface;
extending the extensible support beams with the second height support;
shifting the main body in the second direction on the extensible support beams until the first and second sets of main wheels are above the third step surface;
a third retracting of the vertical stabilizer;
extending the main lift until the first and second sets of main wheels contact the third step surface; and retracting the extensible support beams with the first height support until the first height support is adjacent to the main lift.

20. A self-elevating platform cart system, the system comprising:
a main body structure;
a payload platform for carrying a payload coupled to the main body;
a main lift coupled to the main body and configured to be actuated to retract and extend, where the main lift includes a plurality of main wheels;
extensible support beams coupled to the main body and configured to be actuated to extend in first and second directions that are lateral to the main body, where the first direction is opposite to the second direction, and the extensible support beams are configured to support a weight of the system;
a first height support coupled to the extensible support beams such that the first height support can be extended in the first direction by the extensible support beams, the first height support having a plurality of first wheels;
a second height support coupled to the extensible support beams such that the second height support can be extended in the second direction by the extensible support beams, the second height support having a plurality of second wheels and the second height support is configured to be actuated to vertically extend and retract the second wheels; and
a controller module having one or more processors and one or more memory devices in communication with the one or more processors, the controller being configured to actuate the main lift, the extensible support beams and the second height support, and the memory devices having computer-readable instructions stored thereupon that, when executed by the processors, cause the processors to perform a method for self-elevating platform control comprising, when an initial surface is on one side of a raised or recessed barrier and a destination surface is on another side of the barrier:
extending the extensible support beams in the first direction to position the first wheels over the destination surface,
extending the first height support until the first wheels contact the initial surface,
extending the second height support until the second wheels contact the initial surface,
retracting the main lift,
shifting the main body in the first direction on the extensible support beams,
extending the main lift after the system has been moved in the first direction until the main wheels are positioned above the destination surface,
retracting the second height support,
retracting the extensible support beams with the second height support until the second height support is adjacent to the main lift, and
retracting the first height support.

21. The system of claim 20, where:
one or more of the first wheels and second wheels is configured to be actuated to move the system in the first direction;
the controller module is further configured to actuate the one or more of the first wheels and second wheels; and
the method for self-elevating platform control includes:
automatically moving the system in the first direction until the main wheels are positioned above the destination surface.

22. The system of claim 20, where:
the first height support is further configured to be actuated to vertically extend and retract the first wheels; and
the method for self-elevating platform control includes:
extending the first height support until the first wheels contact the destination surface.

23. The system of claim 20, where the load platform comprises one of a cargo box, a platform and a person carrier.

24. A self-elevating platform cart for transporting onto a raised platform, the system comprising:
a main body structure;
a payload platform for carrying a payload coupled to the main body;
a main lift coupled to the main body and configured to be actuated to retract and extend, where the main lift includes a plurality of main wheels;
a fixed support beam coupled to the main body and configured to support a weight of the system;
a first height support coupled to a first end of the fixed support beam, the first height support having a plurality of first wheels, wherein a combined vertical height of the fixed support beam, the main lift and the first height support is configured to be greater than an anticipated height of a top surface of the raised platform and a combined vertical length of the first wheels and the first height support is configured such that the main lift can retract the main wheels to at least the anticipated height of the top surface of the raised platform;
a second height support coupled to a second end of the fixed support beam and having a plurality of second wheels, where the second height support is configured to support the system at a height such that the main lift can retract the main wheels to at least the anticipated height of the top surface of the raised platform; and
a controller module having one or more processors and one or more memory devices in communication with the one or more processors, the controller being configured to actuate the main lift, and the memory devices having computer-readable instructions stored thereupon that, when executed by the processors, cause the processors to perform a method for self-elevating platform control comprising, when an initial surface is adjacent to a raised platform and a destination surface is a top surface of the raised platform:
when the first wheels of the first height support contact the destination surface, retracting the main lift; and
when the main wheels are positioned over the destination surface, extending the main lift.

25. The system of claim 24, where:
one or more of the first wheels and second wheels is configured to be actuated to move the system in a first direction towards the first height support;
the controller module is further configured to actuate the one or more of the first wheels and second wheels; and
the method for self-elevating platform control includes:
automatically moving the system in the first direction until the main wheels are positioned above the destination surface.

26. The system of claim 25, where:
the main lift is configured to extend to lift the first and second wheels above the initial surface; and
the method for self-elevating platform control includes:
 extending the main lift to lift the first and second wheels above the initial surface; and
 retract the main lift until the first wheels contact the destination surface and the second wheels contact the initial surface.

27. The system of claim 25, where:
one or more of the main wheels is configured to be actuated to move the system in the first direction;
the controller module is further configured to actuate the one or more of the main wheels; and
the method for self-elevating platform control includes:
 automatically moving the system in the first direction until the first wheels of the first height support are positioned above the destination surface.

\* \* \* \* \*